United States Patent
Takahashi et al.

(10) Patent No.: US 6,329,465 B1
(45) Date of Patent: Dec. 11, 2001

(54) ETHYLENE COPOLYMER COMPOSITION AND USES THEREOF

(75) Inventors: Mamoru Takahashi; Takashi Nakagawa; Kenji Sugimura; Ken Yoshitsugu, all of Yamaguchi (JP)

(73) Assignee: Mitsui Chemical INC, Tokyo (JP)

( * ) Notice: Subject to any disclaimer, the term of this patent is extended or adjusted under 35 U.S.C. 154(b) by 0 days.

(21) Appl. No.: 09/423,393

(22) PCT Filed: Mar. 10, 1999

(86) PCT No.: PCT/JP99/01144

§ 371 Date: Nov. 8, 1999

§ 102(e) Date: Nov. 8, 1999

(87) PCT Pub. No.: WO99/46325

PCT Pub. Date: Sep. 16, 1999

(30) Foreign Application Priority Data

Mar. 10, 1998 (JP) .................................................. 10-58636

(51) Int. Cl.$^7$ .............................. C08F 8/00; C08L 23/00; C08L 23/04
(52) U.S. Cl. ............................................ 525/191; 525/240
(58) Field of Search ...................................... 525/191, 240

(56) References Cited

U.S. PATENT DOCUMENTS

| | | |
|---|---|---|
| 3,183,144 | 5/1965 | Caviglia . |
| 3,300,072 | 1/1967 | Caviglia . |
| 3,414,938 | 12/1968 | Caviglia . |
| 3,493,453 | 2/1970 | Ceresa et al. . |
| 3,616,365 | 10/1971 | Stastny et al. . |
| 3,645,992 | 2/1972 | Elston . |
| 3,779,965 | 12/1973 | Lefforge et al. . |
| 3,786,954 | 1/1974 | Shull . |
| 4,085,186 | 4/1978 | Rainer . |
| 4,503,102 | 3/1985 | Mollison . |
| 4,521,437 | 6/1985 | Storms . |
| 4,599,392 | 7/1986 | McKinney et al. . |
| 4,619,848 | 10/1986 | Knight et al. . |
| 4,632,801 | 12/1986 | Dowd . |
| 4,717,034 | 1/1988 | Mumford . |
| 4,835,194 | 5/1989 | Bright et al. . |
| 4,886,690 | 12/1989 | Davis et al. . |
| 4,937,299 | 6/1990 | Ewen et al. . |
| 4,939,859 | 7/1990 | Bradt . |
| 4,957,790 | 9/1990 | Warren . |
| 4,981,231 | 1/1991 | Knight . |
| 4,981,747 | 1/1991 | Morman . |
| 4,984,703 | 1/1991 | Bruzynski . |
| 5,000,992 | 3/1991 | Kelch . |
| 5,032,463 | 7/1991 | Smith . |
| 5,089,321 | 2/1992 | Chum et al. . |
| 5,104,710 | 4/1992 | Knight . |
| 5,137,164 | 8/1992 | Bayer . |
| 5,215,587 | 6/1993 | McConnellogue et al. . |
| 5,594,071 | 1/1997 | Takahashi et al. . |
| 5,663,236 | 9/1997 | Takahashi et al. . |
| 5,674,945 | 10/1997 | Takahashi et al. . |
| 6,184,297 | * 2/2001 | Takahashi et al. .................... 525/240 |

OTHER PUBLICATIONS

Patent Abstract of Japan, Publ. No. 6–065442 dated Mar. 8, 1994.
Patent Abstract of Japan, Publ. No. 6–136193 dated May 17, 1994.
Patent Abstract of Japan, Publ. No. 6–207056 dated Jul. 26, 1994.
Patent Abstract of Japan, Publ. No. 7–309982 dated Nov. 28, 1995.
Patent Abstract of Japan, Publ. No. 7–309981 dated Nov. 28, 1995.

* cited by examiner

Primary Examiner—Nathan M. Nutter

(57) ABSTRACT

The present invention is intended to obtain an ethylene copolymer composition having excellent transparency, mechanical strength and moldability. The ethylene copolymer composition comprises an ethylene/α-olefin copolymer and high-pressure radical process low-density polyethylene. The ethylene/α-olefin copolymer is a copolymer of ethylene and an α-olefin of 6 to 8 carbon atoms and has the following properties: the melt tension (MT) and the melt flow rate (MFR) satisfy the relation $9.0 \times MFR^{-0.65} > MT > 2.2 \times MFR^{-0.84}$; the activation energy $((E_a) \times 10^{-4}$ J/molK) of flow, the carbon atom number (C) of the α-olefin in the copolymer and the α-olefin content (x mol %) in the copolymer satisfy the relation $(0.039Ln(C-2)+0.0096) \times x+2.87 < Ea \times 10^{-4} \leq (0.039Ln(C-2)+0.1660) \times x+2.87$; and the haze of an inflation film produced from said copolymer satisfies a specific relation. This ethylene copolymer composition can be used for producing molded products such as films, sheets, packaging materials, injection molded products, expansion molded products and fibers. These molded products are excellent in mechanical strength, heat resistance or transparency.

12 Claims, No Drawings

ETHYLENE COPOLYMER COMPOSITION AND USES THEREOF

CROSS-REFERENCE TO RELATED APPLICATION

This application is the National Phase entry under 35 USC 371 of PCT/JP99/01144, filed Mar. 10, 1999.

FIELD OF THE INVENTION

The present invention relates to an ethylene copolymer composition and uses thereof. The invention further relates to uses of the ethylene copolymer composition.

BACKGROUND OF THE INVENTION

Ethylene copolymers are molded by various molding methods and used in many fields. The properties required for the ethylene copolymers differ from each other according to the molding methods and the uses of the copolymers. For example, in molding of an inflation film at a high-speed, an ethylene copolymer having high melt tension for its molecular weight must be selected in order to stably perform high-speed molding free from occurrence of bubble swing or bubble break. The similar properties are required to prevent sag or break in a blow molding method or to lower reduction of width to the minimum in a T-die molding method.

In Japanese Patent Laid-Open Publication No. 90810/1981 or No. 106806/1985, a method of increasing melt tension or swell ratio (die swell ratio) of ethylene polymers obtained by the use of Ziegler catalysts, particularly titanium catalysts, to improve moldability of the polymers is reported. In general, the ethylene polymers obtained by the use of the titanium catalysts, particularly low-density ethylene copolymers, however, have a wide composition distribution and contain components which cause tackiness when the polymers are used as molded products such as films. Therefore, more decrease of the components causing tackiness has been demanded.

Of the ethylene polymers produced by the use of Ziegler catalysts, those obtained by the use of chromium catalysts have relatively high melt tension, but further improvement in the heat stability has been demanded.

A great number of ethylene copolymers obtained by the use of olefin polymerization catalysts containing transition metal metallocene compounds have high melt tension and excellent heat stability, so that they are expected as copolymers satisfying the above demands. In the ethylene copolymers obtained by the use of the metallocene catalysts, however, the melt tension (MT) is generally proportional to the flow activation energy (Ea).

Polymers having high melt tension have excellent moldability because they have excellent bubble stability as mentioned above. They, however, have high flow activation energy (Ea), and this means that the molding conditions thereof have great dependence on the temperature. Therefore, if the molding conditions are not controlled very strictly and uniformly, the resulting molded products suffer unevenness. For example, films may have low transparency.

When the flow activation energy (Ea) is low, occurrence of unevenness in the molded products can be inhibited, but because of low melt tension, unstable bubble is produced and hence moldability is lowered.

The present invention has been made under such circumstances as described above, and it is an object of the invention to provide an ethylene copolymer composition having excellent moldability and capable of producing films and molded products of excellent transparency and mechanical strength. It is another object of the invention to provide uses of this ethylene copolymer composition.

DISCLOSURE OF THE INVENTION

The ethylene copolymer composition (A) according to the invention comprises (A) an ethylene/α-olefin copolymer and (E) high-pressure radical process low-density polyethylene, wherein the ethylene/α-olefin copolymer (A) is a copolymer of ethylene and an α-olefin of 6 to 8 carbon atoms and has the following properties:

(A-i) the melt tension (MT) at 190° C. and the melt flow rate (MFR) satisfy the following relation $$9.0 \times MFR^{-0.65} > MT > 2.2 \times MFR^{-0.84},$$

(A-ii) the activation energy ($(E_a) \times 10^{-4}$ J/molK) of flow determined from a shift factor of time-temperature superposition of the flow curve, the carbon atom number (C) of the α-olefin in the copolymer and the α-olefin content (x mol %) in the copolymer satisfy the following relation $$(0.039 \ln (C-2) + 0.0096) \times x + 2.87 < Ea \times 10^{-4} < (0.039 \ln (C-2) + 0.1660) \times x + 2.87,$$

and (A-iii) the haze of a film having a thickness of 30 μm produced by inflation molding of the copolymer satisfies the following relation, when the flow index (FI), which is defined by a shear rate at which the shear stress at 190° C. reaches $2.4 \times 10^6$ dyne/cm$^2$, and the melt flow rate (MFR) satisfy the relation FI≧100×MFR, in the case of the carbon atom number (C) of the α-olefin being 6, $$Haze < 0.45/(1-d) \times \log(3 \times MT^{1.4}) \times (C-3)^{0.1},$$

in the case of the carbon atom number (C) of the α-olefin being 7 or 8, $$Haze < 0.50/(1-d) \times \log(3 \times MT^{1.4}),$$

and when the flow index (FI) defined by a shear rate at which the shear stress at 190° C. reaches $2.4 \times 10^6$ dyne/cm$^2$ and the melt flow rate (MFR) satisfy the relation FI<100×MFR, in the case of the carbon atom number (C) of the α-olefin being 6, $$Haze < 0.25/(1-d) \times \log(3 \times MT^{1.4}) \times (C-3)^{0.1},$$

in the case of the carbon atom number (C) of the α-olefin being 7 or 8, $$Haze < 0.50/(1-d) \times \log(3 \times MT^{1.4});$$

wherein d represents a density (g/cm$^3$) and MT represents a melt tension (g), and the high-pressure radical process low-density polyethylene (E) has the following properties:

(E-i) the melt flow rate, as measured at 190° C. under a load of 2.16 kg, is in the range of 0.1 to 50 g/10 min, and (E-ii) the molecular weight distribution (Mw/Mn, Mw: weight-average molecular weight, Mn: number-average molecular weight), as measured by gel permeation chromatography, and the melt flow rate (MFR) satisfy the following relation $$7.5 \times \log(MFR) - 1.2 \leq Mw/Mn \leq 7.5 \times \log(MFR) + 12.5.$$

The ethylene/α-olefin copolymer (A) is obtained by copolymerizing ethylene and an α-olefin of 6 to 8 carbon atoms in the presence of, for example, an olefin polymerization catalyst comprising:
(a) an organoaluminum oxy-compound,
(b-1) at least one transition metal compound selected from transition metal compounds represented by the following formula (I):

$$ML^1_x \qquad (I)$$

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms and the ligand $L^1$ other than the substituted cyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M, and (b-II) at least one transition metal compound selected from transition metal compounds represented by the following formula (II):

$$ML^2_x \qquad (II)$$

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

In the olefin polymerization catalyst, the organoaluminum oxy-compound (a), the transition metal compound (b-I) and the transition metal compound (b-II) are preferably supported on a carrier (c).

Another embodiment of the present invention is an ethylene copolymer composition (A') comprising (B) an ethylene/α-olefin copolymer, (C) an ethylene/α-olefin copolymer and (E) high-pressure radical process low-density polyethylene, wherein the ethylene/α-olefin copolymer (B) is a copolymer of ethylene and an α-olefin of 6 to 8 carbon atoms and has the following properties:
(B-i) the density is in the range of 0.880 to 0.970 g/cm³,
(B-ii) the melt flow rate (MFR) at 190° C. under a load of 2.16 kg is in the range of 0.02 to 200 g/10 min,
(B-iii) the decane-soluble component fraction (W) at room temperature and the density (d) satisfy the following relation
in the case of MFR≦10 g/10 min $$W < 80 \times \exp(-100(d-0.88)) + 0.1,$$

in the case of MFR>10 g/10 min $$W < 80 \times (MFR-9)^{0.26} \times \exp(-100(d-0.88)) + 0.1,$$

(B-iv) the temperature (Tm) at the maximum peak position in an endothermic curve of the copolymer, as measured by a differential scanning calorimeter (DSC), and the density (d) satisfy the following relation $$Tm < 400 \times d - 248,$$

(B-v) the melt tension (MT) at 190° C. and the melt flow rate (MFR) satisfy the following relation $$9.0 \times MFR^{-0.65} > MT > 2.2 \times MFR^{-0.84},$$

(B-vi) the activation energy $((E_a) \times 10^{-4}$ J/molK) of flow determined from a shift factor of time-temperature superposition of the flow curve, the carbon atom number (C) of the α-olefin in the copolymer and the α-olefin content (x mol %) in the copolymer satisfy the following relation $$(0.039 \, Ln \, (C-2) + 0.0096) \times x + 2.87 < Ea \times 10^{-4} < (0.039 \, Ln \, (C-2) + 0.1660) \times x + 2.87,$$

and (B-vii) the ratio (Mw/Mn) of the weight-average molecular weight (Mw) determined by GPC to the number-average molecular weight (Mn) determined by GPC is a number satisfying the following condition $$2.2 < Mw/Mn < 3.5;$$

the ethylene/α-olefin copolymer (C) is a copolymer of ethylene and an α-olefin of 6 to 8 carbon atoms and has the following properties:
(C-i) the density is in the range of 0.880 to 0.970 g/cm³,
(C-ii) the melt flow rate (MFR) at 190° C. under a load of 2.16 kg is in the range of 0.02 to 200 g/10 min,
(C-iii) the decane-soluble component fraction (W) at room temperature and the density (d) satisfy the following relation
in the case of MFR≦10 g/10 min $$W < 80 \times \exp(-100(d-0.88)) + 0.1,$$

in the case of MFR>10 g/10 min $$W < 80 \times (MFR-9)^{0.26} \times \exp(-100(d-0.88)) + 0.1,$$

(C-iv) the temperature (Tm) at the maximum peak position in an endothermic curve of the copolymer, as measured by a differential scanning calorimeter (DSC), and the density (d) satisfy the following relation $$Tm < 400 \times d - 248,$$

and (C-v) the melt tension (MT) at 190° C. and the melt flow rate (MFR) satisfy the following relation $$MT \leq 2.2 \times MFR^{-0.84};$$

the high-pressure radical process low-density polyethylene (E) has the following properties:
(E-i) the melt flow rate, as measured at 190° C. under a load of 2.16 kg, is in the range of 0.1 to 50 g/10 min, and
(E-ii) the molecular weight distribution (Mw/Mn, Mw: weight-average molecular weight, Mn: number-average molecular weight), as measured by gel permeation chromatography, and the melt flow rate (MFR) satisfy the following relation $$7.5 \times \log(MFR) - 1.2 \leq Mw/Mn \leq 7.5 \times \log(MFR) + 12.5;$$

and the ratio of the melt flow rate (MFR(C)) of the copolymer (C) to the melt flow rate (MFR(B)) of the copolymer (B) satisfies the following condition $$1 < MFR(C)/MFR(B) \leq 20.$$

A composition comprising the ethylene/α-olefin copolymer (B) and the ethylene/α-olefin copolymer (C) has substantially the same components and component ratio as those of the ethylene/α-olefin copolymer (A) and has substantially the same usefulness as that of the copolymer (A).

In the ethylene copolymer composition (A'), it is preferable that the ethylene/α-olefin copolymers (B) and (C) are each an ethylene/1-hexene copolymer and that a composition comprising the ethylene/α-olefin copolymers (B) and (C) has the following properties:

(A'-i) the melt tension (MT) at 190° C. and the melt flow rate (MFR) satisfy the following relation $$9.0 \times MFR^{-0.65} > MT > 2.2 \times MFR^{-0.84},$$

(A'-ii) the activation energy (($E_a$)×10$^{-4}$ J/molK) of flow determined from a shift factor of time-temperature superposition of the flow curve, the carbon atom number (C) of 1-hexene in the copolymers (B) and (C) and the 1-hexene content (x mol %) in the copolymers (B) and (C) satisfy the following relation $$(0.039 \ln(C-2) + 0.0096) \times x + 2.87 < E_a \times 10^{-4} \leq (0.039 \ln(C-2) + 0.1660) \times x + 2.87,$$

and (A'-iii) the haze of a film having a thickness of 30 μm produced by inflation molding of said composition satisfies the following relation.

When the flow index (FI), which is defined as a shear rate at which the shear stress of said composition at 190° C. reaches 2.4×10$^6$ dyne/cm$^2$, and the melt flow rate (MFR) satisfy the relation FI≧100×MFR, $$Haze < 0.45/(1-d) \times \log(3 \times MT^{1.4}) \times (C-3)^{0.1},$$

and when the flow index (FI), which is defined as a shear rate at which the shear stress of said composition at 190° C. reaches 2.4×10$^6$ dyne/cm$^2$, and the melt flow rate (MFR) satisfy the relation FI<100×MFR, $$Haze < 0.25/(1-d) \times \log(3 \times MT^{1.4}) \times (C-3)^{0.1}$$

wherein d represents a density (g/cm$^3$), MT represents a melt tension (g) and C is the carbon atom number of 1-hexene, namely, 6.

In the ethylene copolymer composition (A'), the composition comprising the ethylene/α-olefin copolymers (B) and (C) preferably further has, in addition to the properties (A'-i) to (A'-iii), the following property:

(A'-iv) the ratio (Mw/Mn) of the weight-average molecular weight (Mw) determined by GPC to the number-average molecular weight (Mn) determined by GPC satisfies the following condition $$2.0 \leq Mw/Mn \leq 2.5.$$

To the ethylene copolymer composition (A) or the ethylene copolymer composition (A') can be added:

(D) an ethylene/α-olefin copolymer which is obtained by copolymerizing ethylene and an α-olefin of 3 to 20 carbon atoms in the presence of an olefin polymerization catalyst comprising (a) an organoaluminum oxy-compound and (b-III) a compound of a transition metal of Group 4 of the periodic table containing a ligand having a cyclopentadienyl skeleton and having the following properties:

(D-i) the density is in the range of 0.850 to 0.980 g/cm$^3$, and (D-ii) the intrinsic viscosity (η), as measured in decalin at 135° C., is in the range of 0.4 to 8 dl/g, to prepare a composition (ethylene copolymer composition (A")) comprising the composition (A) of the ethylene/α-olefin copolymer (A) and the high-pressure radical process low-density polyethylene (E) and the ethylene/α-olefin copolymer (D) or composition (ethylene copolymer composition (A'")) comprising the ethylene copolymer composition (A') and the ethylene/α-olefin copolymer (D).

In the above compositions, however, the ethylene/α-olefin copolymer (A) is not identical with the ethylene/α-olefin copolymer (D), and each of the ethylene/α-olefin copolymers (B) and (C) is not identical with the ethylene/α-olefin copolymer (D).

The molded product according to the invention, such as a single-layer film or sheet, a multi-layer film or sheet, an injection molded product, an extrusion molded product, a fiber, an expansion molded product or an electric wire sheath, is formed from any of the above-mentioned ethylene copolymer compositions.

BEST MODE FOR CARRYING OUT THE INVENTION

The ethylene copolymer composition according to the invention and uses thereof are described hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

First, the ethylene/α-olefin copolymer (A), the ethylene/α-olefin copolymer (B), the ethylene/α-olefin copolymer (C) and the high-pressure radical process low-density polyethylene (E) for forming the ethylene copolymer composition (A) of the invention are described.

Ethylene/α-olefin Copolymer (A)

The ethylene/α-olefin copolymer (A) is a random copolymer of ethylene and an α-olefin of 6 to 8 carbon atoms. Examples of the α-olefins of 6 to 8 carbon atoms used in the copolymerization with ethylene include straight-chain α-olefins having no branch, such as 1-hexene, 1-heptene and 1-octene. Of these, 1-hexene is particularly preferably employed.

The ethylene/α-olefin copolymer (A) has the following properties (A-i) to (A-iii).

(A-i) The melt tension (MT (g)) and the melt flow rate (MFR (g/10 min)) satisfy the following relation:

$$9.0 \times MFR^{-0.65} > MT > 2.2 \times MFR^{-0.84},$$

preferably $9.0 \times MFR^{-0.65} > MT > 2.3 \times MFR^{-0.84}$, more preferably $8.5 \times MFR^{-0.65} > MT > 2.5 \times MFR^{-0.84}$.

The ethylene/α-olefin copolymer having the above property has high melt tension, so that it has excellent moldability.

The MFR is measured under the conditions of a temperature of 190° C. and a load of 2.16 kg in accordance with the method of ASTM D1238-65T.

The melt tension (MT) is determined by measuring a stress given when a molten polymer is stretched at a constant rate. That is, the produced polymer powder was melted and pelletized in a conventional manner to give a measuring sample, and the melt tension of the sample was measured by a MT measuring machine manufactured by Toyo Seiki Seisakusho K.K. under the conditions of a resin temperature of 190° C., an extrusion rate of 15 mm/min, a take-up rate of 10 to 20 m/min, a nozzle diameter of 2.09 mmØ and a nozzle length of 8 mm. Prior to pelletizing, the ethylene/α-olefin copolymer was blended with 0.05% by weight of tri(2,4-di-t-butylphenyl)phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorber.

(A-ii) The flow activation energy (($E_a$)×10$^{-4}$ J/molK) determined from a shift factor of time-temperature superposition of the flow curve, the carbon atom number (C) of the α-olefin in the copolymer and the α-olefin content (x mol %) in the copolymer satisfy the following relation (0.039 Ln (C−2)+0.0096)×x+2.87<$E_a$×10$^{-4}$≦(0.039 Ln (C−2)+ 0.1660)×x+2.87, preferably (0.039 Ln (C−2)+0.0096)×x+2.87<$E_a$×10$^{-4}$≦(0.039 Ln (C−2)+ 0.1500)×x+2.87, more preferably (0.039 Ln (C−2)+0.0096)×x+2.87<$E_a$×10$^{-4}$≦(0.039 Ln (C−2)+ 0.1300)×x+2.87.

In order to improve film moldability, the melt tension needs to be improved, and to improve the melt tension, introduction of long-chain branch is known as an effective method. $E_a$ of the ethylene/α-olefin copolymer having no long-chain branch is expressed by the equation:

$E_a$×10$^{-4}$=(0.039 Ln (C−2)+0.0096)×x+2.87.

When the long-chain branch is present, the value of $E_a$ increases, so that in the case of $E_a$×10$^{-4}$>(0.039Ln(C−2)+ 0.0096)×x+2.87, a long-chain branch is presumed to be present, and the film moldability and the transparency are improved. In the case of $E_a$×10$^{-4}$>(0.039Ln(C−2)+0.1660)× x+2.87, though the moldability is good, film strength and film transparency are lowered, so that such a case is unfavorable.

Measurement of the flow activation energy ($E_a$) is described in, for example, "Polymer Experimental Science, Vol. 9, Thermodynamic Properties I" (edited by Polymer Experimental Science Editorial Committee of Polymer Society, Kyoritsu Publishing K.K., pp. 25–28), and the flow activation energy ($E_a$) is determined from a shift factor of time-temperature superposition of the flow curve by measuring dependence of viscoelasticity on frequency. A graph showing a relation between storage elastic modulus (ordinate) and angular velocity (abscissa) measured at a certain base temperature is fixed. Then, data measured at a different measuring temperature are moved in parallel with the abscissa, and as a result they overlap the data obtained at the base temperature (thermal Theological simplicity). The shift Log(aT), by which the data obtained at the measuring temperature overlap the data obtained at the base temperature, is plotted against a reciprocal number 1/T of the measuring temperature (absolute temperature) to obtain linear incline. The linear incline is multiplied by 2.303R (R: gas constant), whereby the activation energy is obtained as a temperature-independent constant.

Specifically, $E_a$ is measured in the following manner.

Dispersion of the storage elastic modulus (G' (dyne/cm$^2$)) at the angular velocity (ω(rad/sec)) was measured with a Rheometer RDS-II manufactured by Rheometrix Co. A parallel plate having a diameter of 25 mmØ was used as a sample holder. The thickness of the sample was about 2 mm. The measuring temperatures were 130, 170, 200 and 230° C., and at each temperature, G' was measured in the range of 0.04≦ω≦400. For example, in the measurement at 130° C., the sample was heated to 150° C. to completely melt the crystals and then cooled to 130° C. The strain was properly selected from the range of 2 to 25% so that the torque was detectable in the measuring range and did not become too much. After the measurement, flow curves obtained under the four temperature conditions were superposed taking 130° C. as the base temperature, and from the Arrhenius type plot of the shift factor, $E_a$ value was calculated. The calculation was performed using analytical software RHIOS attached to RDS-II.

(A-iii) The haze of a film having a thickness of 30 μm produced from the ethylene/α-olefin copolymer by inflation molding satisfies the following conditions:
when the flow index (FI) defined by a shear rate at which a shear stress at 190° C. reaches 2.4×10$^6$ dyne/cm$^2$ and the melt flow rate (MFR) satisfy the relation FI≧100×MFR,
in the case of the carbon atom number (C) of the α-olefin being 6, Haze<0.45/(1−d)×log $(3 \times MT^{1.4}) \times (C−3)^{0.1}$, in the case of the carbon atom number (C) of the α-olefin being 7 or 8, Haze<0.50/(1−d)×log$(3 \times MT^{1.4})$, and when the flow index (FI) defined by a shear rate at which a shear stress at 190° C. reaches 2.4×10$^6$ dyne/cm$^2$ and the melt flow rate (MFR) satisfy the relation FI<100>MFR,
in the case of the carbon atom number (C) of the α-olefin being 6, Haze<0.25/(1−d)×log $(3 \times MT^{1.4}) \times (C−3)^{0.1}$, in the case of the carbon atom number (C) of the α-olefin being 7 or 8, Haze<0.50/(1−d)×log $(3 \times MT^{1.4})$ wherein d represents density (g/cm$^3$) and MT represents melt tension (g).

The ethylene/α-olefin copolymer satisfying the above conditions has excellent moldability and can produce films having excellent transparency.

The flow index (FI) is determined by extruding a resin through a capillary with varying a shear rate and finding a shear rate corresponding to the prescribed stress. That is, using the same sample as in the measurement of MT, the flow index is measured by a capillary flow property tester manufactured by Toyo Seiki Seisakusho K.K. under the conditions of a resin temperature of 190° C. and a shear stress of about from $5 \times 10^4$ to $3 \times 10^6$ dyne/cm$^2$.

In this measurement, the diameter of nozzle was varied as follows according to the MFR (g/10 min) of the resin to be measured.

MFR>20: 0.5 mm
20≧MFR>3: 1.0 mm
3≧MFR>0.8: 2.0 mm
0.8≧MFR: 3.0 mm

The density (d) is measured in the following manner. Strands obtained in the measurement of melt flow rate (MFR) at 190° C. under a load of 2.16 kg are heated at 120° C. for 1 hour, then slowly cooled to room temperature over a period of 1 hour, and the density of the strands was measured by a density gradient tube.

The ethylene/α-olefin copolymer (A), further, preferably has the following properties in addition to the above-mentioned properties.

In the ethylene/α-olefin copolymer (A), the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The composition of an ethylene/α-olefin copolymer is generally determined in the following manner. About 200 mg of the copolymer is homogeneously dissolved in 1 ml of hexachlorobutadiene in a sample tube having a diameter of 10 mmØ to prepare a sample, and a $^{13}$C-NMR spectrum of the sample is measured under the measuring conditions of a measuring temperature of 120° C., a measuring frequency of 25.05 MHz, a spectral width of 1,500 Hz, a pulse repetition time of 4.2 sec and a pulse width of 6 μsec.

The ethylene/α-olefin copolymer (A) has a density (d) of 0.880 to 0.970 g/cm$^3$, preferably 0.880 to 0.960 g/cm$^3$, more preferably 0.890 to 0.935 g/cm$^3$, most preferably 0.905 to 0.930 g/cm$^3$.

The ethylene/α-olefin copolymer (A) has a melt flow rate (MFR) of 0.02 to 200 g/10 min, preferably 0.05 to 50 g/10 min, more preferably 0.1 to 10 g/10 min.

It is desirable that the n-decane-soluble component fraction (W wt %) in the ethylene/α-olefin copolymer (A) at 23° C. and the density (d g/cm$^3$) satisfy the following relation:

in the case of MFR≦10 g/10 min,

|  |  |
|---|---|
|  | W < 80 × exp (−100 (d − 0.88)) + 0.1, |
| preferably, | W < 60 × exp (−100 (d − 0.88)) + 0.1, |
| more preferably, | W < 40 × exp (−100 (d − 0.88)) + 0.1, | in the case of MFR>10 g/10 min, $W < 80 \times (MFR-9)^{0.26} \times \exp(-100(d-0.88)) + 0.1$.

The n-decane-soluble component fraction (W) in an ethylene/α-olefin copolymer is measured in the following manner (the copolymer has a narrower composition distribution according as it has a lower soluble component fraction). About 3 g of the copolymer is added to 450 ml of n-decane, dissolved therein at 145° C. and cooled to 23° C. Then, the n-decane-insoluble portion is removed by filtration, and the n-decane-soluble portion is recovered from the filtrate.

The temperature (Tm, (° C.)) at the maximum peak position of an endothermic curve of the ethylene/α-olefin copolymer (A) as measured by a differential scanning calorimeter (DSC) and the density (d (g/cm$^3$)) preferably satisfy the following relation:

|  |  |
|---|---|
|  | Tm < 400 × d − 248, |
| preferably | Tm < 450 × d − 296, |
| more preferably | Tm < 500 × d − 343, |
| particularly preferably | Tm < 550 × d − 392. |

The temperature (Tm) at the maximum peak position of an endothermic curve of the ethylene/α-olefin copolymer as measured by a differential scanning calorimeter (DSC) is found from an endothermic curve which is obtained by heating a sample of about 5 mg up to 200° C. at a rate of 10° C./min in an aluminum pan, maintaining the sample at 200° C. for 5 minutes, cooling it to room temperature at a rate of 10° C./min and heating it at a rate of 10° C./min. The measurement is carried out with an apparatus of DSC-7 model manufactured by Perkin-Elmer Co.

The ethylene/α-olefin copolymer having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) has a narrow composition distribution.

The ethylene/α-olefin copolymers (A) mentioned above may be used in combination of two or more kinds.

The ethylene/α-olefin copolymer (A) is obtained by copolymerizing ethylene and an α-olefin of 6 to 8 carbon atoms in the presence of an olefin polymerization catalyst (Cat-1) which comprises:

(a) an organoaluminum oxy-compound,
   (b-I) at least one transition metal compound selected from transition metal compounds represented by the formula (I), and
   (b-II) at least one transition metal compound selected from transition metal compounds represented by the formula (II).

The olefin polymerization catalyst may further comprise (c) a carrier on which (a) the organoaluminum oxy-compound, (b-I) at least one transition metal compound selected from transition metal compounds represented by the formula (I), and (b-II) at least one transition metal compound selected from transition metal compounds represented by the formula (II) are supported. Such a supported catalyst is sometimes referred to as "Cat-2" hereinafter.

The components for forming the olefin polymerization catalysts (Cat-1) and (Cat-2) are described below.

(a) Organoaluminum Oxy-compound

The organoaluminum oxy-compound (a) (sometimes referred to as "component (a)" hereinafter) may be a benzene-soluble aluminoxane hitherto known or a benzene-insoluble organoaluminum oxy-compound as disclosed in Japanese Patent Laid-open Publication No.276807/1990.

The aluminoxane can be prepared by, for example, the following processes, and is generally obtained as its hydrocarbon solution.

(1) A process of adding an organoaluminum compound such as trialkylaluminum to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, and allowing to react them.

(2) A process of allowing water, ice or water vapor to directly act on an organoaluminum compound such as trialkylaluminum in a medium such as benzene, toluene, ethyl ether or tetrahydrofuran.

(3) A process of allowing an organotin oxide such as dimethyltin oxide or dibutyltin oxide to react with an organoaluminum compound such as trialkylaluminum in a medium such as decane, benzene or toluene.

The aluminoxane may contain a small amount of an organometallic component. The solvent or the unreacted organoaluminum compound is removed from the recovered solution of an aluminoxane by distillation and the remainder is redissolved in a solvent.

Examples of the organoaluminum compounds used for preparing the aluminoxane include:

trialkylaluminums, such as trimethylaluminum, triethylaluminum, tripropylaluminum, triisopropyl aluminum, tri-n-butylaluminum, triisobutylaluminum, tri-sec-butylaluminum, tri-tert-butylaluminum, tripentyl aluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, trialkylaluminums and tricycloalkyl aluminums are particularly preferable.

Also employable as the organoaluminum compound is isoprenylaluminum represented by the following formula:

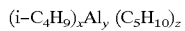

wherein x, y, z are each a positive number, and z≧2x.

The organoaluminum compounds mentioned above are used singly or in combination.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halogenated products of these aromatic, aliphatic and alicyclic hydrocarbons, such as chlorinated or brominated products thereof. Also employable are ethers, such as ethyl ether and tetrahydrofuran. Of the solvents, aromatic hydrocarbons are particularly preferable.

The benzene-insoluble organoaluminum oxy-compound contains an Al component soluble in benzene at 60° C. in an amount of not more than 10%, preferably not more than 5%, particularly preferably not more than 2%, in terms of Al atom, and is insoluble or slightly soluble in benzene.

The solubility of the organoaluminum oxy-compound in benzene is determined in the following manner. The organoaluminum oxy-compound in an amount corresponding to 100 mg.atom of Al is suspended in 100 ml of benzene, and they are mixed with stirring at 60° C. for 6 hours. Then, the mixture is subjected to hot filtration at 60° C. using a jacketed G-5 glass filter, and the solid separated on the filter is washed four times with 50 ml of benzene at 60° C. to obtain a filtrate. The amount (x mmol) of Al atom present in the whole filtrate is measured to determine the solubility (x %).

(b-I) Transition Metal Compound and
(b-II) Transition Metal Compound

The transition metal compound (b-I) is a transition metal compound represented by the following formula (I), and the transition metal compound (b-II) is a transition metal compound represented by the following formula (II).

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms, and the ligand $L^1$ other than the substituted cyclopentadienyl group is a hydrocarbon group of 1 to 12 carbon atoms, an alkoxy group, an aryloxy group, a trialkylsilyl group, a halogen atom or hydrogen; and x is a valence of the transition metal atom M.

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group, and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or hydrogen; and x is a valence of the transition metal atom M.

The transition metal compound represented by the formula (I) or (II) is described below in more detail.

In the formula (I), M is a transition metal atom selected from Group 4 of the periodic table, specifically zirconium, titanium or hafnium, preferably zirconium.

$L^1$ is a ligand coordinated to the transition metal atom M, and at least two ligands $L^1$ are each a substituted cyclopentadienyl group having at least one group selected from hydrocarbon groups of 3 to 10 carbon atoms. These ligands $L^1$ may be the same or different.

The substituted cyclopentadienyl group may have two or more substituents, and the two or more substituents may be the same or different. When the substituted cyclopentadienyl group has two or more substituents, at least one substituent is a hydrocarbon group of 3 to 10 carbon atoms, and the residual substituent is methyl, ethyl or a hydrocarbon group of 3 to 10 carbon atoms.

Examples of the hydrocarbon group of 3 to 10 carbon atoms include alkyl groups, cycloalkyl groups, aryl groups and aralkyl groups. Specific examples may include alkyl groups, such as n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups such as benzyl and neophyl.

Of these, preferable are alkyl groups, and particularly preferable are n-propyl and n-butyl. The substituted cyclopentadienyl group coordinated to the transition metal is preferably a di-substituted cyclopentadienyl group and is particularly preferably a 1,3-substituted cyclopentadienyl group.

In the formula (I), the ligand $L^1$ other than the substituted cyclopentadienyl group coordinated to the transition metal atom M is a hydrocarbon group of 1 to 12 carbon atoms, an alkoxy group, an aryloxy group, a trialkylsilyl group, a halogen atom or hydrogen.

Examples of the hydrocarbon groups of 1 to 12 carbon atoms include alkyl groups, cycloalkyl groups, aryl groups and aralkyl groups. Specific examples may include alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the trialkylsilyl groups include trimethylsilyl, triethylsilyl and triphenylsilyl.

The halogen atom is fluorine, chlorine, bromine or iodine.

Examples of the transition metal compounds represented by the formula (I) include:
bis(n-propylcyclopentadienyl)zirconium dichloride,
bis(n-butylcyclopentadienyl)zirconium dichloride,
bis(n-hexylcyclopentadienyl)zirconium dichloride,
bis(methyl-n-propylcyclopentadienyl)zirconium dichloride,
bis(methyl-n-butylcyclopentadienyl)zirconium dichloride,
bis(dimethyl-n-butylcyclopentadienyl)zirconium dichloride,
bis(n-butylcyclopentadienyl)zirconium dibromide,
bis(n-butylcyclopentadienyl)zirconium methoxychloride,
bis(n-butylcyclopentadienyl)zirconium ethoxychloride,
bis(n-butylcyclopentadienyl)zirconium butoxychloride,
bis(n-butylcyclopentadienyl)zirconium diethoxide,
bis(n-butylcyclopentadienyl)zirconium methylchloride,
bis(n-butylcyclopentadienyl)zirconium dimethyl,
bis(n-butylcyclopentadienyl)zirconium benzylchloride,
bis(n-butylcyclopentadienyl)zirconium dibenzyl,
bis(n-butylcyclopentadienyl)zirconium phenylchloride and
bis(n-butylcyclopentadienyl)zirconium hydride chloride.

In the above examples, the di-substituted cyclopentadienyl rings include 1,2- and 1,3-substituted cyclopentadienyl rings, and the tri-substituted cyclopentadienyl rings include 1,2,3- and 1,2,4-substituted cyclopentadienyl rings.

Also employable in the invention are transition metal compounds obtainable by replacing a zirconium metal with a titanium metal or a hafnium metal in the above-mentioned zirconium compounds.

Of the transition metal compounds represented by the formula (I), particularly preferable are bis(n-propylcyclopentadienyl)zirconium dichloride, bis(n-butylcyclopentadienyl)zirconium dichloride, bis(1-methyl-3-n-propylcyclopentadienyl)zirconium dichloride and bis(1-methyl-3-n-butylcyclopentadienyl)zirconium dichloride.

In the formula (II), M is a transition metal atom selected from Group 4 of the periodic table, specifically zirconium, titanium or hafnium, preferably zirconium.

$L^2$ is a ligand coordinated to the transition metal atom M, and at least two ligands $L^2$ are each a methylcyclopentadienyl group or an ethylcyclopentadienyl group. These ligands $L^2$ may be the same or different.

In the formula (II), the ligand $L^2$ other than the methylcyclopentadienyl group or the ethyl cyclopentadienyl group is a hydrocarbon group of 1 to 12 carbon atoms, an alkoxy group, an aryloxy group, a trialkylsilyl group, a halogen atom or hydrogen, each of which is the same group or atom as indicated by $L^1$ in the formula (I).

Examples of the transition metal compounds represented by the formula (II) include
bis(methylcyclopentadienyl)zirconium dichloride,
bis(ethylcyclopentadienyl)zirconium dichloride,
bis(methylcyclopentadienyl)zirconium dibromide,
bis(ethylcyclopentadienyl)zirconium dibromide,
bis(methylcyclopentadienyl)zirconium methoxychloride,
bis(ethylcyclopentadienyl)zirconium methoxychloride,
bis(methylcyclopentadienyl)zirconium ethoxychloride,
bis(ethylcyclopentadienyl)zirconium ethoxychloride,
bis(methylcyclopentadienyl)zirconium diethoxide,
bis(ethylcyclopentadienyl)zirconium diethoxide,
bis(methylcyclopentadienyl)zirconium methylchloride,
bis(ethylcyclopentadienyl)zirconium methylchloride,
bis(methylcyclopentadienyl)zirconium dimethyl,
bis(ethylcyclopentadienyl)zirconium dimethyl,
bis(methylcyclopentadienyl)zirconium benzylchloride,
bis(ethylcyclopentadienyl)zirconium benzylchloride,
bis(methylcyclopentadienyl)zirconium dibenzyl,
bis(ethylcyclopentadienyl)zirconium dibenzyl,
bis(methylcyclopentadienyl)zirconium phenylchoride,
bis(ethylcyclopentadienyl)zirconium phenylchloride,
bis(methylcyclopentadienyl)zirconium hydride chloride
and bis(ethylcyclopentadienyl)zirconium hydride chloride.

Also employable in the invention are transition metal compounds obtainable by replacing a zirconium metal with a titanium metal or a hafnium metal in the above-mentioned zirconium compounds.

Of the transition metal compounds represented by the formula (II), particularly preferable are bis(methylcyclopentadienyl)zirconium dichloride and bis(ethylcyclopentadienyl)zirconium dichloride.

In the present invention, at least one transition metal compound selected from the transition metal compounds represented by the formula (I) and at least one transition metal compound selected from the transition metal compounds represented by the formula (II) are used in combination as the transition metal compound. It is preferable to make a combination of the transition metal compounds such that the ratio of the MFR (MFR(I)) of an olefin polymer obtained by the use of a catalyst component containing only the transition metal compound of the formula (I) as the transition metal compound component to the MFR (MFR (II)) of an olefin polymer obtained by the use of a catalyst component containing only the transition metal compound of the formula (II) as the transition metal compound component under the same polymerization conditions (MFR(I)/MFR(II)) satisfies the formula of MFR(I)/MFR(II)≦20.

Examples of the combinations include a combination of bis(1,3-n-butylmethylcyclopentadienyl)zirconium dichloride and bis(methylcyclopentadienyl)zirconium dichloride, a combination of bis(1,3-n-propylmethyl cyclopentadienyl) zirconium dichloride and bis(methyl cyclopentadienyl) zirconium dichloride, and a combination of bis(n-butylcyclopentadienyl)zirconium dichloride and bis(methylcyclopentadienyl)zirconium dichloride.

The at least one transition metal compound (b-I) selected from the transition metal compounds of the formula (I) and the at least one transition metal compound (b-II) selected from the transition metal compounds of the formula (II) are preferably used in such amounts that the (b-I)/(b-II) molar ratio is from 99/1 to 40/60, preferably 95/5 to 45/55, more preferably 90/10 to 50/50, most preferably 85/15 to 55/45.

The transition metal compound catalyst component containing at least one transition metal compounds (b-I) of the formula (I) and at least one transition metal compounds (b-II) of the formula (II) is sometimes referred to as "component (b)" hereinafter.

The olefin polymerization catalyst (Cat-1) comprises the organoaluminum oxy-compound (a), the transition metal compound (b-I) and the transition metal compound (b-II) and further a catalyst (Cat-2) in which the organoaluminum oxy-compound (a), the transition metal compound (b-I) and the transition metal compound (b-II) are supported on the carrier (c), as described below, may be used.

(c) Carrier

The carrier (c) optionally used is an inorganic or organic compound of granular or particulate solid having a particle diameter of 10 to 300 μm, preferably 20 to 200 μm. The inorganic carrier is preferably a porous oxide, and examples thereof include $SiO_2$, $Al_2O_3$, MgO, $ZrO_2$, $TiO_2$, $B_2O_3$, CaO, ZnO, BaO, $ThO_2$, and mixtures thereof, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO.

Of these, preferable are those containing at least one of $SiO_2$ and $Al_2O_3$ as their major component.

The above-mentioned inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the properties of the carrier (c) vary depending upon the type and the preparation process, the carrier desirably has a specific surface area of preferably from 50 to 1,000 m²/g, more preferably 100 to 700 m²/g, and a pore volume of preferably 0.3 to 2.5 cm³/g. The carrier may be used after calcined at a temperature of 100 to 1,000° C., preferably 150 to 700° C., if necessary.

The quantity of adsorption water in the carrier (c) is preferably less than 1.0% by weight, more preferably less than 0.5% by weight, and the quantity of surface hydroxyl group therein is preferably not less than 1.0% by weight, more preferably 1.5 to 4.0% by weight, particularly preferably 2.0 to 3.5% by weight.

The quantity of adsorption water (% by weight) and the quantity of surface hydroxyl group (% by weight) are determined in the following manner.

Quantity of Adsorption Water

Percentage of loss in weight of a carrier after drying at 200° C. for 4 hours at atmospheric pressure in a stream of nitrogen to the weight before drying is taken as the quantity of adsorption water.

Quantity of Surface Hydroxyl Group

The weight of a carrier obtained by drying at 200° C. for 4 hours at atmospheric pressure in a stream of nitrogen is taken as X (g) and the weight of a calcined carrier obtained by calcining the carrier at 1000° C. for 20 hours to remove the surface hydroxyl group is taken as Y (g), and the quantity of the surface hydroxyl group is calculated from the following formula.

Quantity of surface hydroxyl group (wt %)=$\{(X-Y)/X\} \times 100$

Also employable as the carrier (c) in the invention is an organic compound of a granular or particulate solid having a particle diameter of 10 to 300 μm. Examples of the organic compounds include (co)polymers produced using an α-olefin of 2 to 14 carbon atoms such as ethylene, propylene, 1-butene or 4-methyl-1-pentene as a main component, and (co)polymers produced using vinylcyclohexane or styrene as a main component.

An organoaluminum compound (d) as described below may be optionally used as a component for forming the olefin polymerization catalysts (Cat-1) and (Cat-2).

(d) Organoaluminum Compound

The organoaluminum compound (d) (sometimes referred to as "component (d)" hereinafter) optionally used in the invention is, for example, an organoaluminum compound represented by the following formula (i):

$$R^1_n AlX_{3-n} \quad \text{(i)}$$

wherein $R^1$ is a hydrocarbon group of 1 to 12 carbon atoms, X is a halogen atom or hydrogen, and n is 1 to 3.

In the formula (i), $R^1$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of the organoaluminum compounds (d) may include: trialkylaluminums, such as trimethylaluminum, triethylaluminum, triisopropylaluminum, triisobutyl aluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula (ii):

$$R^1_n AlY_{3-n} \quad \text{(ii)}$$

wherein $R^1$ is the same as above; Y is —$OR^2$ group, —$OSiR^3_3$ group, —$OAlR^4_2$ group, —$NR^5_2$ group, —$SiR^6_3$ group or —$N(R^7)AlR^8_2$ group; n is 1 to 2; $R^2$, $R^3$, $R^4$ and R8 are each methyl, ethyl, isopropyl, isobutyl, cyclohexyl, phenyl or the like; $R^5$ is hydrogen, methyl, ethyl, isopropyl, phenyl or trimethylsilyl; and $R^6$ and $R^7$ are each methyl or ethyl.

Examples of such organoaluminum compounds include:

(1) compounds of the formula $R^1_n Al(OR^2)_{3-n}$, e.g., dimethylaluminum methoxide, diethylaluminum ethoxide and diisobutylaluminum methoxide;

(2) compounds of the formula $R^1_n Al(OSiR^3_3)_{3-n}$, e.g., $Et_2Al(OSiMe_3)$, $(iso\text{-}Bu)_2Al(OSiMe_3)$ and $(iso\text{-}Bu)_2Al(OSiEt_3)$;

(3) compounds of the formula $R^1_n Al(OAlR^4_2)_{3-n}$, e.g., $Et_2AlOAlEt_2$ and $(iso\text{-}Bu)_2AlOAl(iso\text{-}Bu)_2$;

(4) compounds of the formula $R^1_n Al(NR^5_2)_{3-n}$, e.g., $Me_2AlNEt_2$, $Et_2AlNHMe$, $Me_2AlNHEt$, $Et_2AlN(SiMe_3)_2$ and $(iso\text{-}Bu)_2AlN(SiMe_3)_2$; and (5) compounds of the formula $R^1_n Al(SiR^6_3)_{3-n}$, e.g., $(iso\text{-}Bu)_2AlSiMe_3$; and (6) compounds of the formula $R^1_n Al(N(R^7)AlR^8_2)_{3-n}$, e.g., $Et_2AlN(Me)AlEt_2$ and $(iso\text{-}Bu)_2AlN(Et)Al(iso\text{-}Bu)_2$.

Of the organoaluminum compounds of the formulas (i) and (ii), preferable are compounds of the formulas $R^1_3Al$, $R^1_n Al(OR^2)_{3-n}$ and $R^1_n Al(OAlR^4_2)_{3-n}$, and particularly preferable are compounds of the formulas in which $R^1$ is an isoalkyl group and n is 2.

The olefin polymerization catalyst (Cat-1) comprises the component (a), the component (b), and if necessary, the component (d); and the olefin polymerization catalyst (Cat-2) (solid catalyst (Cat-2)) comprises a solid catalyst (component) obtainable by supporting the component (a) and the component (b) on the carrier (c), and if necessary, the component (d).

The olefin polymerization catalyst (Cat-1) is prepared by mixing and contacting the catalyst components with each other inside or outside the polymerization reactor. The solid catalyst may be prepared by previously making the component (a) to be a solid component, and then mixing and contacting with the component (b), or mixing and contacting the component (a) and the component (b) to form a solid catalyst, and then adding the solid catalyst to the polymerization system.

The olefin polymerization catalyst (Cat-1) can be formed by mixing and contacting the component (a), the component (b), and if necessary, the component (d) in an inert hydrocarbon solvent. These catalyst components may be contacted in any order, but when the component (a) is contacted with the component (b), it is preferable to add the component (b) to a suspension of the component (a). The component (b) is preferably formed in advance by mixing two or more transition metal compounds (components (b-I) and (b-II)), and then mixing and contacting with other components.

Examples of the inert hydrocarbon solvents used for preparing the olefin polymerization catalyst (Cat-1) include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

In the mixing and contacting of the component (a), the component (b), and if necessary, the component (d), the concentration of the component (a) is in the range of about 0.1 to 5 mol/liter-solvent, preferably 0.3 to 3 mol/liter-solvent, in terms of aluminum in the component (a). The atomic ratio of aluminum (Al) in the component (a) to transition metal in the component (b) (Al/transition metal) is in the range of usually 10 to 500, preferably 20 to 200. The atomic ratio of aluminum atom (Al-d) in the component (d) optionally used to aluminum atom (Al-a) in the component (a) (Al-d/Al-a) is in the range of usually 0.02 to 3, preferably 0.05 to 1.5. In the mixing and contacting of the component (a), the component (b), and if necessary, the component (d), the mixing temperature is in the range of usually $-50$ to $150°$ C., preferably $-20$ to $120°$ C., and the contact time is in the range of usually 1 minute to 50 hours, preferably 10 minutes to 25 hours.

In the olefin polymerization catalyst (Cat-1) prepared as above, the component (b) is desirably contained, based on 1 g of the catalyst, in an amount of $5\times10^{-6}$ to $5\times10^{-4}$ mol, preferably $10^{-5}$ to $2\times10^{-4}$ mol, in terms of transition metal atom; and the component (a) and the component (d) are desirably contained, based on 1 g of the catalyst, in the total amount of $10^{-2}$ to $2.5\times10^{-2}$ mol, preferably $1.5\times10^{-2}$ to $2\times10^{-2}$ mol, in terms of aluminum atom.

The solid catalyst (Cat-2) can be prepared by allowing the carrier (c) to support thereon the component (a), the component (b), and if necessary, the component (d).

Although the component (a), the component (b), the carrier (c) and the component (d) may be mixed and contacted in any order to prepare the solid catalyst (Cat-2), it is preferable that the component (a) is contacted with the carrier (c), then with the component (b), and then, if necessary, with the component (d). The component (b) is preferably formed in advance by mixing two or more transition metal compounds (components (b-I) and (b-II)) and then mixing and contacting with other components.

The contact between the component (a), the component (b), the carrier (c) and component (d) may be conducted in an inert hydrocarbon solvent, and examples of the inert hydrocarbon solvents used for preparing the catalyst are the same as those used for preparing the olefin polymerization catalyst (Cat-1) previously described.

In the mixing and contacting of the component (a), the component (b), the carrier (c), and if necessary, the component (d), the component (b) is used, based on 1 g of the carrier (c), in an amount of usually $5\times10^{-6}$ to $5\times10^{-4}$ mol, preferably $10^{-5}$ to $2\times10^{-4}$ mol, in terms of transition metal atom; and the concentration of the component (b) is in the range of about $10^{-4}$ to $2\times10^{-2}$ mol/liter-solvent, preferably $2\times10^{-4}$ to $10^{-2}$ mol/liter-solvent. The atomic ratio of aluminum (Al) in the component (a) to transition metal in the component (b) (Al/transition metal) is in the range of usually 10 to 500, preferably 20 to 200. The atomic ratio of aluminum atom (Al-d) in the component (d) optionally used to aluminum atom (Al-a) in the component (a) (Al-d/Al-a) is in the range of usually 0.02 to 3, preferably 0.05 to 1.5. In the mixing and contacting of the component (a), the component (b), the carrier (c), and if necessary, the component (d), the mixing temperature is in the range of usually $-50$ to $150°$ C., preferably $-20$ to $120°$ C., and the contact time is in the range of usually 1 minute to 50 hours, preferably 10 minutes to 25 hours.

In the solid catalyst (Cat-2) prepared as above, the component (b) is desirably supported, based on 1 g of the carrier (c), in an amount of $5\times10^{-6}$ to $5\times10^{-4}$ mol, preferably $10^{-5}$ to $2\times10^{-4}$ mol, in terms of transition metal atom; and the component (a) and the component (d) are desirably supported, based on 1 g of the carrier (c), in the total amount of $10^{-3}$ to $5\times10^{-2}$ mol, preferably $2\times10^{-3}$ to $2\times10^{-2}$ mol, in terms of aluminum atom.

The olefin polymerization catalyst (Cat-2) may be a prepolymerized catalyst in which an olefin has been prepolymerized.

The prepolymerized catalyst can be prepared by introducing an olefin into an inert hydrocarbon solvent in the presence of the component (a), the component (b) and the carrier (c) to perform prepolymerization. It is preferable that the solid catalyst component (Cat-2) is formed from the component (a), the component (b) and the carrier (c). The solid catalyst component (Cat-2) may be further blended with the component (a) and/or the component (d).

For preparing the prepolymerized catalyst, an olefin may be added to a suspension containing the produced solid catalyst (Cat-2) (solid catalyst component), or the solid catalyst (Cat-2) may be separated from a suspension containing the produced solid catalyst (Cat-2), then the solid catalyst (Cat-2) may be resuspended in an inert hydrocarbon, and an olefin may be added to the resulting suspension.

In the preparation of the prepolymerized catalyst, the component (b) is used in an amount of usually $10^{-6}$ to $2\times10^{-2}$ mol/liter-solvent, preferably $5\times10^{-5}$ to $10^{-2}$ mol/liter-solvent, in terms of transition metal atom in the component (b); and the component (b) is used, based on 1 g of the carrier (c), in an amount of $5\times10^{-6}$ to $5\times10^{-4}$ mol, preferably $10^{-5}$ to $2\times10^{-4}$ mol, in terms of transition metal atom in the component (b). The atomic ratio of aluminum (Al) in the component (a) to transition metal in the component (b) (Al/transition metal) is usually from 10 to 500, preferably 20 to 200. The atomic ratio of aluminum atom (Al-d) in the component (d) optionally used to aluminum atom (Al-a) in the component (a) (Al-d/Al-a) is usually from 0.02 to 3, preferably 0.05 to 1.5.

The solid catalyst component is used in an amount of usually $10^{-6}$ to $2\times10^{-2}$ mol/liter-solvent, preferably $5\times10^{-5}$ to $10^{-2}$ mol/liter-solvent, in terms of transition metal in the transition metal compound.

The prepolymerization temperature is usually from $-20$ to $80°$ C., preferably 0 to $60°$ C., and the prepolymerization time is usually from 0.5 to 100 hours, preferably 1 to 50 hours.

Examples of the olefins used in the prepolymerization include ethylene; and $\alpha$-olefins of 3 to 20 carbon atoms such as propylene, 1-butene, 1-pentene, 4-methyl-1-pentene, 1-hexene, 1-octene, 1-decene, 1-dodecene and 1-tetradecene. Of these, particularly preferable is ethylene or a combination of ethylene and the $\alpha$-olefin used in the polymerization.

The prepolymerized catalyst is prepared by, for example, the following process. The carrier is suspended in an inert hydrocarbon to give a suspension. To the suspension, the organoaluminum oxy-compound (component (a)) is added, and they are reacted for a given period of time. Then, the supernatant liquid is removed, and the resulting solid is resuspended in an inert hydrocarbon. To the system, the transition metal compound (component (b)) is added, and they are reacted for a given period of time. Then, the supernatant liquid is removed to obtain a solid catalyst component. Subsequently, to an inert hydrocarbon containing the organoaluminum compound (component (d)), the solid catalyst component is added and an olefin is further introduced. Thus, a prepolymerized catalyst is prepared.

In the prepolymerization, an olefin polymer is desirably produced in an amount of 0.1 to 500 g, preferably 0.2 to 300 g, more preferably 0.5 to 200 g, based on 1 g of the carrier (c).

In the prepolymerized catalyst, the component (b) is desirably supported, based on 1 g of the carrier (c), in an amount of about from $5\times10^{-6}$ to $5\times10^{-4}$ mol, preferably $10^{-5}$ to $2\times10^{-4}$ mol, in terms of transition metal atom; and the component (a) and the component (d) are desirably supported in such amounts that the molar ratio of aluminum atom (Al) in the components (a) and (d) to transition metal atom (M) in the component (b) (Al/M) becomes 5 to 200, preferably 10 to 150.

The prepolymerization may be carried out by any of batchwise and continuous processes, and may be carried out under reduced pressure, at atmospheric pressure or under pressure. In the prepolymerization, hydrogen is desirably allowed to be present in the system to produce a prepolymer having an intrinsic viscosity ($\eta$), as measured in decalin at $135°$ C., of 0.2 to 7 dl/g, preferably 0.5 to 5 dl/g.

The copolymerization of ethylene and an $\alpha$-olefin is carried out in the presence of the above-mentioned olefin polymerization catalyst in a gas phase or a liquid phase of slurry, preferably in a gas phase. In the slurry polymerization, an inert hydrocarbon may be used as the solvent, or the olefin itself may be used as the solvent.

Examples of the inert hydrocarbon solvents used in the slurry polymerization include aliphatic hydrocarbons, such as propane, butane, isobutane, pentane, hexane, octane, decane, dodecane, hexadecane and octadecane; alicyclic hydrocarbons, such as cyclopentane, methyl cyclopentane, cyclohexane and cyclooctane; aromatic hydrocarbons, such as benzene, toluene and xylene; and petroleum fractions, such as gasoline, kerosine and gas oil. Of the inert hydrocarbon solvents, preferable are aliphatic hydrocarbons, alicyclic hydrocarbons and petroleum fractions.

When the copolymerization is carried out by slurry polymerization or gas phase polymerization, the catalyst is desirably used in an amount of usually $10^{-8}$ to $10^{-3}$ mol/liter, preferably $10^{-7}$ to $10^{-4}$ mol/liter, in terms of a concentration of transition metal atom in the polymerization reaction system.

In the olefin polymerization catalyst formed from the component (a), the component (b) and optionally the component (d), the atomic ratio of aluminum atom (Al) in the component (d) to transition metal atom (M) in the transition metal compound (b) (Al/M) is in the range of 5 to 300, preferably 10 to 200, more preferably 15 to 150.

In the polymerization using the olefin polymerization catalyst formed from the component (a), the component (b), the carrier (c) and optionally the component (d), an organoaluminum oxy-compound which is not supported on the carrier may be used in addition to the organoaluminum oxy-compound (component (a)) which is supported on the carrier. In this case, the atomic ratio of aluminum atom (Al) in the organoaluminum oxy-compound which is not supported on the carrier to transition metal atom (M) in the transition metal compound (b) (Al/M) is in the range of 5 to 300, preferably 10 to 200, more preferably 15 to 150. The component (d) optionally used may be supported on the carrier (c), or may be added during the polymerization. The component (d) having been beforehand supported on the carrier (c) may be added during the polymerization. The component (d) having been supported on the carrier and the component (d) to be added during the polymerization may be the same or different. The atomic ratio of aluminum atom (Al) in the component (d) optionally used to transition metal atom (M) in the transition metal compound (b) (Al/M) is in the range of 5 to 300, preferably 10 to 200, more preferably 15 to 150.

When the slurry polymerization is carried out, the polymerization temperature is in the range of usually $-50$ to $100°$ C., preferably 0 to $90°$ C. When the gas phase polymerization is carried out, the polymerization temperature is in the range of usually 0 to $120°$ C., preferably 20 to $100°$ C.

The polymerization pressure is usually atmospheric pressure to 100 kg/cm$^2$, preferably 2 to 50 kg/cm$^2$. The polymerization can be carried out by any of batchwise, semi-continuous and continuous processes.

The polymerization can be conducted in two or more stages under different reaction conditions. The olefin polymerization catalyst may further contain other components useful for olefin polymerization in addition to the above components.

Examples of the olefins which can be polymerized by the use of the olefin polymerization catalyst include ethylene; $\alpha$-olefins of 6 to 8 carbon atoms; other $\alpha$-olefins, such as propylene, 1-butene, 1-pentene, 4-methyl-1-pentene, 1-decene, 1-dodecene, 1-tetradecene, 1-hexadecene and 1-octadecene and 1-eicosene; and cycloolefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene. Also employable are styrene, vinylcyclohexane and dienes.

In the ethylene/$\alpha$-olefin copolymer obtained by the olefin polymerization process, the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, most preferably 4 to 30% by weight.

The ethylene/α-olefin copolymer thus obtained has the properties (A-i) to (A-iii), so that it has excellent moldability and can produce films of excellent transparency and mechanical strength.

Ethylene/α-olefin Copolymer (B)

The ethylene/α-olefin copolymer (B) is a random copolymer of ethylene and an α-olefin of 6 to 8 carbon atoms. Examples of the α-olefins of 6 to 8 carbon atoms include the same olefins as previously described.

In the ethylene/α-olefin copolymer (B), the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The ethylene/α-olefin copolymer (B) preferably has the following properties (B-i) to (B-vii) and particularly preferably has the following properties (B-i) to (B-viii).

(B-i) The density (d) is in the range of 0.880 to 0.970 g/cm$^3$, preferably 0.880 to 0.960 g/cm$^3$, more preferably 0.890 to 0.935 g/cm$^3$, most preferably 0.905 to 0.930 g/cm$^3$.

(B-ii) The melt flow rate (MFR) is in the range of 0.02 to 200 g/10 min, preferably 0.05 to 50 g/10 min, more preferably 0.1 to 10 g/10 min.

(B-iii) The n-decane-soluble component fraction (W (wt %)) at 23° C. and the density (d (g/cm$^3$)) satisfy the following relation:
in the case of MFR$\leq$10 g/10 min, $$W<80\times\exp(-100(d-0.88))+0.1,$$

preferably $W<60\times\exp(-100(d-0.88))+0.1$,
more preferably $W<40\times\exp(-100(d-0.88))+0.1$, in the case of MFR>10 g/10 min, $$W<80\times(MFR-9)^{0.26}\times\exp(-100(d-0.88))+0.1.$$

(B-iv) The temperature (Tm (° C.)) at the maximum peak position of an endothermic curve of the copolymer as measured by a differential scanning calorimeter (DSC) and the density (d (g/cm$^3$)) satisfy the following relation:

$$Tm<400\times d-248,$$

preferably $Tm<450\times d-296$,
more preferably $Tm<500\times d-343$,
particularly preferably $Tm<550\times d-392$.

The ethylene/α-olefin copolymer (B) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) has a narrow composition distribution.

(B-v) The melt tension (MT (g)) and the melt flow rate (MFR (g/10 min)) satisfy the following relation:

$$9.0\times MFR^{-0.65}>MT>2.2\times MFR^{-0.84},$$

preferably $9.0\times MFR^{-0.65}>MT>2.3\times MFR^{-0.84}$,
more preferably $8.5\times MFR^{-0.65}>MT>2.5\times MFR^{-0.84}$.

The ethylene/α-olefin copolymer having the above property has high melt tension (MT), so that it has excellent moldability.

(B-vi) The flow activation energy (($E_a$)×10$^{-4}$ J/molK) determined from a shift factor of time-temperature superposition of the flow curve, the carbon atom number (C) of the α-olefin in the copolymer and the α-olefin content (x mol %) in the copolymer satisfy the following relation:

$$(0.039\ Ln\ (C-2)+0.0096)\times x+2.87<E_a\times 10^{-4}\leq(0.039\ Ln\ (C-2)+0.1660)\times x+2.87,$$

preferably, $(0.039Ln(C-2)+0.0096)\times x+2.87<E_a\times 10^{-4}\leq(0.039Ln(C-2)+0.1500)\times x+2.87$,
more preferably, $(0.039Ln(C-2)+0.0096)\times x+2.87<E_a\times 10^{-4}\leq(0.039Ln(C-2)+0.1300)\times x+2.87$.

(B-vii) The molecular weight distribution (Mw/Mn, Mw: weight-average molecular weight, Mn: number-average molecular weight), as determined by GPC, satisfies the following condition:

$$2.2<Mw/Mn<3.5,$$

preferably $2.4<Mw/Mn<3.0$.

The molecular weight distribution (Mw/Mn) was measured by the following manner using GPC-150C manufactured by Milipore Co.

A column of TSK-GNH-HT having a diameter of 72 mm and a length of 600 mm was used, and the column temperature was 140° C. In the column, 500 microliters of a sample (concentration: 0.1% by weight) was moved using o-dichlorobenzene (available from Wako Junyaku Kogyo K.K.) as a mobile phase and 0.025% by weight of BHT (available from Takeda Chemical Industries, Ltd.) as an antioxidant. As a detector, a differential refractometer was used. As standard polystyrene, polystyrenes of Mw<1,000 and Mw>4×10$^6$ available from TOHSO K.K. and polystyrene of 1000$\leq$Mw$\leq$4×10$^6$ available from Pressure Chemical Co. were used.

(B-viii) The number of unsaturated bonds present in the molecules of the copolymer is not more than 0.5 based on 1,000 carbon atoms and is less than 1 based on one molecule of the copolymer.

The quantitative determination of the unsaturated bonds is made by finding an area intensity of signals not assigned to double bonds, i.e., signals within the range of 10 to 50 ppm, and an area intensity of signals assigned to double bonds, i.e., signals within the range of 105 to 150 ppm, from the integration curve using $^{13}$C-NMR and calculating a ratio between the intensities.

The ethylene/α-olefin copolymer (B) is obtained by copolymerizing ethylene and an α-olefin of 6 to 8 carbon atoms in the presence of an olefin polymerization catalyst which comprises for example, (a) an organoaluminum oxy-compound and (b-II) a transition metal compound of the formula (II).

The organoaluminum oxy-compound (a) and the transition metal compound (b-II) are the same as those previously described in the process for preparing the ethylene/α-olefin copolymer (A). Similarly to the above case, the carrier (c) and the organoaluminum compound (d) may be also employed, and prepolymerization may be conducted. The amounts of the components, prepolymerization conditions and polymerization conditions are the same as those for preparing the ethylene/α-olefin copolymer (A).

Ethylene/α-olefin Copolymer (C)

The ethylene/α-olefin copolymer (C) is a random copolymer of ethylene and an α-olefin of 6 to 8 carbon atoms. Examples of the α-olefins of 6 to 8 carbon atoms include the same olefins as described above.

In the ethylene/α-olefin copolymer (C), the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The ethylene/α-olefin copolymer (C) preferably has the following properties (C-i) to (C-v) and particularly preferably has the following properties (C-i) to (C-vi).

(C-i) The density (d) is in the range of 0.880 to 0.970 g/cm$^3$, preferably 0.880 to 0.960 g/cm$^3$, more preferably 0.890 to 0.935 g/cm$^3$, most preferably 0.905 to 0.930 g/cm$^3$.

(C-ii) The melt flow rate (MFR) is in the range of 0.02 to 200 g/10 min, preferably 0.05 to 50 g/10 min, more preferably 0.1 to 10 g/10 min.

(C-iii) The n-decane-soluble component fraction (W (wt %)) at 23° C. and the density (d (g/cm$^3$)) satisfy the following relation:
in the case of MFR≦10 g/10 min, W<80×exp (−100(d−0.88))+0.1, preferably W<60×exp(−100(d−0.88))+0.1,
more preferably W<40×exp(−100(d−0.88))+0.1,
in the case of MFR>10 g/10 min, W<80×(MFR−9)$^{0.26}$×exp (−100(d−0.88))+0.1.

(C-iv) The temperature (Tm (° C.)) at the maximum peak position of an endothermic curve of the copolymer as measured by a differential scanning calorimeter (DSC) and the density (d (g/cm$^3$)) satisfy the following relation:

Tm<400×d−248, preferably Tm<450×d−296,
more preferably Tm<500×d−343,
particularly preferably Tm<550×d−392.

The ethylene/α-olefin copolymer (C) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) has a narrow composition distribution.

(C-v) The melt tension (MT (g)) and the melt flow rate (MFR (g/10 min)) satisfy the following relation:

MT≦2.2×MFR$^{-0.84}$.

(C-vi) The number of unsaturated bonds present in the molecules of the copolymer is not more than 0.5 based on 1,000 carbon atoms and is less than 1 based on one molecule of the copolymer.

The ethylene/α-olefin copolymer (C) is obtained by copolymerizing ethylene and an α-olefin of 6 to 8 carbon atoms in the presence of an olefin polymerization catalyst which comprises, for example, (a) an organoaluminum oxy-compound and (b-I) a transition metal compound of the formula (I). The organoaluminum oxy-compound (a) and the transition metal compound (b-I) are the same as those previously described in the process for preparing the ethylene/α-olefin copolymer (A). Similarly to the above case, the carrier (c) and the organoaluminum compound (d) may be employed, and prepolymerization may be conducted. The amounts of the components, prepolymerization conditions and polymerization conditions are the same as those for preparing the ethylene/α-olefin copolymer (A).

(E) High-pressure Radical Process Low-density Polyethylene

The high-pressure radical process low-density polyethylene is a so-called polyethylene prepared by "high-pressure radical polymerization" and having many branches including long chain branches. It is desirable that this polyethylene has MFR, as measured at 190° C. under a load of 2.16 kg in accordance with ASTM D1238-65T, of 0.1 to 50 g/10 min, preferably 0.2 to 10 g/10 min, more preferably 0.2 to 8 g/10 min.

The index of the molecular weight distribution (Mw/Mn, Mw: weight-average molecular weight, Mn: number-average molecular weight) of the high-pressure radical process low-density polyethylene, as measured by gel permeation chromatography (GPC), and the melt flow rate (MFR) of the polyethylene satisfy the following relation 7.5×log(MFR)−1.2≦Mw/Mn≦7.5×log(MFR)+12.5, preferably 7.5×log(MFR)−0.5≦Mw/Mn≦7.5×log(MFR)+12.0, more preferably 7.5×log(MFR)≦Mw/Mn≦7.5×log(MFR)+12.0.

The molecular weight distribution of the high-pressure radical process low-density polyethylene is measured in the same manner as previously described.

The density of the high-pressure radical process low-density polyethylene is desirably in the range of 0.910 to 0.930 g/cm$^3$.

The density is determined in the following manner. A strand obtained in the measurement of melt flow rate under the conditions of a temperature of 190° C. and a load of 2.16 kg is subjected to heat treatment at 120° C. for 1 hour and slowly cooled to room temperature over a period of 1 hour. Then, the density is measured by a density gradient tube.

The swell ratio of the high-pressure radical process low-density polyethylene, which indicates the degree of long chain branches, is desirably not less than 1.3. The swell ratio is a ratio (Ds/D) of a diameter (Ds) of a strand extruded from a nozzle (inner diameter (D): 2.0 mm, length: 15 mm) at an extrusion speed of 10 mm/min using a capillary flow property tester to an inner diameter (D) of the nozzle.

As the high-pressure radical process low-density polyethylene, a copolymer thereof with a polymerizable monomer such as another α-olefin, vinyl acetate or an acrylic ester is employable within limits not prejudicial to the objects of the present invention.

Ethylene Copolymer Composition

The ethylene copolymer composition (A) according to the invention comprises the above-mentioned ethylene/α-olefin copolymer (A) and the high-pressure radical process low-density polyethylene (E).

In the ethylene copolymer composition (A) comprising the ethylene/α-olefin copolymer (A) and the high-pressure radical process low-density polyethylene (E), the component ratio is not specifically limited, but it is desirable that the ethylene/α-olefin copolymer (A) is contained in an amount of usually 60 to 99% by weight, preferably 80 to 99% by weight, more preferably 90 to 99% by weight, and the high-pressure radical process low-density polyethylene (E) is contained in an amount of usually 1 to 40% by weight, preferably 1 to 20% by weight, more preferably 1 to 10% by weight.

The ethylene copolymer composition (A) can be prepared hitherto known processes, for example, the following processes.

(1) A process of mechanically belnding the ethylene/α-olefin copolymer (A), the high-pressure radical process low-density polyethylene (E) and other components optionally added using an extruder, a kneader or the like.

(2) A process of dissolving the ethylene/α-olefin copolymer (A), the high-pressure radical process low-density polyethylene (E) and other components optionally added in an appropriate good solvent (e.g., hydrocarbon solvents, such as hexane, heptane, decane, cyclohexane, benzene, toluene and xylene), and removing the solvent from the solution.

(3) A process of individually dissolving the ethylene/α-olefin copolymer (A), the high-pressure radical process low-density polyethylene (E) and other components optionally added in an appropriate good solvent to prepare solutions, mixing the solutions, and removing the solvents from the mixture.

(4) A process of properly combining the processes (1) to (3).

The ethylene copolymer composition (A') according to another embodiment of the invention comprises the ethylene/α-olefin copolymer (B), the ethylene/α-olefin copolymer (C) and the high-pressure radical process low-density polyethylene (E).

In the ethylene copolymer composition (A') comprising the ethylene/α-olefin copolymer (B), the ethylene/α-olefin copolymer (C) and the high-pressure radical process low-density polyethylene (E), the component ratio is not specifically limited, but it is desirable that the ethylene/α-olefin copolymers (B) and (C) are contained in the total amount of usually 60 to 99% by weight, preferably 80 to 99% by weight, more preferably 90 to 99% by weight, and the high-pressure radical process low-density polyethylene (E) is contained in an amount of usually 1 to 40% by weight, preferably 1 to 20% by weight, more preferably 1 to 10% by weight.

It is desirable that the ethylene/α-olefin copolymer (B) is contained in an amount of 1 to 90% by weight, preferably 2 to 80% by weight, based on 100% by weight of the total of the ethylene/α-olefin copolymers (B) and (C), and the ethylene/α-olefin copolymer (C) is contained in an amount of 10 to 99% by weight, preferably 20 to 98% by weight, based on 100% by weight of the total of the ethylene/α-olefin copolymers (B) and (C).

The ethylene copolymer composition (A') can be prepared hitherto known processes, for example, the following processes.

(1) A process of mechanically blending the ethylene/α-olefin copolymers (B) and (C), the high-pressure radical process low-density polyethylene (E) and other components optionally added using an extruder, a kneader or the like.

(2) A process of dissolving the ethylene/α-olefin copolymers (B) and (C), the high-pressure radical process low-density polyethylene (E) and other components optionally added in an appropriate good solvent (e.g., hydrocarbon solvents, such as hexane, heptane, decane, cyclohexane, benzene, toluene and xylene), and removing the solvent from the solution.

(3) A process of individually dissolving the ethylene/α-olefin copolymers (B) and (C), the high-pressure radical process low-density polyethylene (E) and other components optionally added in an appropriate good solvent to prepare solutions, mixing the solutions, and removing the solvents from the mixture.

(4) A process of properly combining the processes (1) to (3).

In the present invention, it is possible that a composition (F) is first prepared from the ethylene/α-olefin copolymers (B) and (C) and then the ethylene copolymer composition (A') is prepared from the composition (F) and the high-pressure radical process low-density polyethylene (E) by the above-mentioned known processes.

In the composition (F) comprising the ethylene/α-olefin copolymer (B) and ethylene/α-olefin copolymer (C), the ratio of the melt flow rate (MFR(B)) of the ethylene/α-olefin copolymer (B) to the melt flow rate (MFR(C)) of the ethylene/α-olefin copolymer (C) preferably satisfies the following condition $$1 < MFR(C)/MFR(B) \leq 20.$$

In the present invention, it is desirable that the ethylene/α-olefin copolymers (B) and (C) are each an ethylene/1-hexene copolymer. In this case, the composition (F) comprising the ethylene/α-olefin copolymers (B) and (C) preferably has substantially the same properties as those of the ethylene/α-olefin copolymer (A), as described below, and is expected to have the same usefulness as that of the copolymer (A).

(A'-i) The melt tension (MT (g)) and the melt flow rate (MFR (g/10 min)) satisfy the following relation:

$$9.0 \times MFR^{-0.65} > MT > 2.2 \times MFR^{-0.84},$$

preferably $9.0 \times MFR^{-0.65} > MT > 2.3 \times MFR^{-0.84}$,
more preferably $8.5 \times MFR^{-0.65} > MT > 2.5 \times MFR^{-0.84}$.

The ethylene copolymer composition (F) having the above property has high melt tension (MT), so that it has excellent moldability.

(A'-ii) The flow activation energy ($(E_a) \times 10^{-4}$ J/molK) determined from a shift factor of time-temperature superposition of the flow curve, the carbon atom number (C) of 1-hexene in the copolymers (B) and (C), and the total content (x mol %) of 1-hexene in the copolymers (B) and (C) satisfy the following relation:

$$(0.039 \ln(C-2)+0.0096) \times x+2.87 < (E_a) \times 10^{-4} \leq (0.039 \ln(C-2)+0.1660) \times x+2.87,$$

preferably, $(0.039 \ln(C-2)+0.0096) \times x+2.87 < (E_a) \times 10^{-4} \leq (0.039 \ln(C-2)+0.1500) \times x+2.87$,
more preferably, $(0.039 \ln(C-2)+0.0096) \times x+2.87 < (E_a) \times 10^{-4} \leq (0.039 \ln(C-2)+0.1300) \times x+2.87$.

(A'-iii) The haze of a film having a thickness of 30 μm produced from the ethylene copolymer composition (F) by inflation molding satisfies the following conditions: when the flow index (FI) defined by a shear rate at which a shear stress at 190° C. reaches $2.4 \times 10^6$ dyne/cm² and the melt flow rate (MFR) satisfy the relation FI≧100×MFR, Haze<0.45/(1×d)×log(3×MT$^{1.4}$)×(C−3)$^{0.1}$, and when the flow index (FI) defined by a shear rate at which a shear stress at 190° C. reaches 2.4×10⁶ dyne/cm² and the melt flow rate (MFR) satisfy the relation FI<100×MFR, Haze<0.25/(1−d)×log(3×MT$^{1.4}$)×(C−3)$^{0.1}$ wherein d represents density (g/cm³), MT represents melt tension (g), and C represents the carbon atom number of 1-hexene, namely, 6.

The composition (F) comprising the ethylene/α-olefin copolymers (B) and (C) and satisfying the above conditions has excellent moldability and can produce films of excellent transparency.

The composition (F) comprising the ethylene/α-olefin copolymers (B) and (C) of the invention preferably further has the following property in addition to the above properties.

(A'-iv) The molecular weight distribution (Mw/Mn, Mw: weight-average molecular weight, Mn: number-average molecular weight), as determined by GPC, satisfies the following condition:

2.0≦Mw/Mn≦2.5, preferably 2.0≦Mw/Mn≦2.4.

In the composition (F), the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms, preferably 1-hexene, are present in amounts of 0 to 50% by weight, preferably 1 to 45% by weight, more preferably 2 to 35% by weight, particularly preferably 4 to 30% by weight.

The composition (F) desirably has a density (d) of 0.880 to 0.970 g/cm³, preferably 0.880 to 0.960 g/cm³, more preferably 0.890 to 0.935 g/cm³, most preferably 0.905 to 0.930 g/cm³.

The composition (F) desirably has a melt flow rate (MFR) of 0.05 to 200 g/10 min, preferably 0.08 to 50 g/10 min, more preferably 0.1 to 10 g/10 min.

The n-decane-soluble component fraction (W (wt %)) of the composition (F) at 23° C. and the density (d (g/cm³)) thereof satisfy the following relation:

in the case of MFR≦10 g/10 min,

W<80×exp (−100(d−0.88))+0.1, preferably W<60×exp(−100(d−0.88))+0.1,
more preferably W<40×exp(−100(d−0.88))+0.1,
in the case of MFR>10 g/10 min, W<80×(MFR−9)$^{0.26}$×exp (−100(d−0.88))+0.1.

The temperature (Tm (° C.)) at the maximum peak position of an endothermic curve of the composition (F) as measured by a differential scanning calorimeter (DSC) and the density (d (g/cm³)) thereof satisfy the following relation:

Tm<400×d−248, preferably Tm<450×d−296, more preferably Tm<500×d−343,
particularly preferably Tm<550×d−392.

The composition (F) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) has a narrow composition distribution.

The composition (F) which comprises the ethylene/α-olefin copolymer (B) and the ethylene/α-olefin copolymer (C) can be prepared by conventional processes, for example, the following processes.

(1) A process of mechanically blending or melt mixing the ethylene/α-olefin copolymer (B), the ethylene/α-olefin copolymer (C) and other components optionally added using a tumbler, an extruder or a kneader.

(2) A process of dissolving the ethylene/α-olefin copolymer (B), the ethylene/α-olefin copolymer (C) and other components optionally added in an appropriate good solvent (e.g., hydrocarbon solvents such as hexane, heptane, decane, cyclohexane, benzene, toluene and xylene), and removing the solvent from the solution.

(3) A process of individually dissolving the ethylene/α-olefin copolymer (B), the ethylene/α-olefin copolymer (C) and other components optionally added in an appropriate good solvent to prepare solutions, mixing the solutions, and removing the solvents from the mixture.

(4) A process of properly combining the processes (1) to (3).

The ethylene/α-olefin copolymer (A) and the ethylene copolymer composition (A') of the invention, as described above, both have excellent moldability and can produce films of excellent transparency and mechanical strength, as they are. Furthermore, they can be used in combination with other polymers, preferably an ethylene/α-olefin copolymer. For example, they can be used as an ethylene copolymer composition (A'') of the ethylene/α-olefin copolymer (A) and another ethylene/α-olefin copolymer, and an ethylene copolymer composition (A''') of the ethylene/α-olefin copolymer (A') and another ethylene/α-olefin copolymer. As such an ethylene/α-olefin copolymer, the ethylene/α-olefin copolymer (D) described below is particularly preferably employed.

The ethylene/α-olefin copolymer (D) used for the invention is a random copolymer of ethylene and an α-olefin of 3 to 20 carbon atoms. Examples of the α-olefins of 3 to 20 carbon atoms may include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer (D), the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 3 to 20 carbon atoms are present in amounts of 0 to 50% by weight, preferably 1 to 45% by weight, more preferably 2 to 35% by weight, most preferably 4 to 30% by weight.

The ethylene/α-olefin copolymer (D) preferably has the following properties (D-i) to (D-ii) and particularly preferably has the following properties (D-i) to (D-iv).

(D-i) The density (d) is in the range of 0.850 to 0.980 g/cm³, preferably 0.910 to 0.960 g/cm³, more preferably 0.915 to 0.955 g/cm³, most preferably 0.920 to 0.950 g/cm³.

(D-ii) The intrinsic viscosity (η), as measured in decalin at 135° C., is in the range of 0.4 to 8 dl/g, preferably 0.4 to 1.25 dl/g, more preferably 0.5 to 1.23 dl/g.

(D-iii) The temperature (Tm (° C.)) at the maximum peak position of an endothermic curve of the copolymer as measured by a differential scanning calorimeter (DSC) and the density (d (g/cm³)) satisfy the following relation:

Tm<400×d−250, preferably Tm<450×d−297,
more preferably Tm<500×d−344,
particularly preferably Tm<550×d−391.

(D-iv) The n-decane-soluble component fraction (W (wt %)) at room temperature and the density (d (g/cm³)) satisfy the following relation:
in the case of MFR≦10 g/10 min, W<80×exp (−100(d−0.88))+0.1, preferably W<60×exp(−100(d−0.88))+0.1,
more preferably W<40×exp(−100(d−0.88))+0.1,
in the case of MFR>10 g/10 min, W<80×(MFR−9)$^{0.26}$×exp (−100(d−0.88))+0.1.

The ethylene/α-olefin copolymer (D) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) has a narrow composition distribution.

The ethylene/α-olefin copolymer (A) is not identical with the ethylene/α-olefin copolymer (D); and each of the ethylene/α-olefin copolymers (B) and (C) is not identical with the ethylene/α-olefin copolymer (D). Specifically, the ethylene/α-olefin copolymer (D) can be distinguished from the ethylene/α-olefin copolymers (A) to (C) in the following properties.

That is, the ethylene/α-olefin copolymer (D) does not satisfy at least one of properties (A-i) to (A-iii) required for the copolymer (A).

The ethylene/α-olefin copolymer (D) further does not satisfy at least one of (B-iii) to (B-vii) for the copolymer (B).

The ethylene/α-olefin copolymer (D) furthermore does not satisfy at least one of (C-iii) to (C-v) required for the copolymer (C).

The ethylene/α-olefin copolymer (D) desirably has a lower intrinsic viscosity (η), as measured in decalin at 135° C. and a lower density than those of the ethylene/α-olefin copolymer (A).

The ethylene/α-olefin copolymer (D) desirably has a lower intrinsic viscosity (η), as measured in decalin at 135° C. and a lower density than those of the ethylene/α-olefin copolymers (B) and (C).

The ethylene/α-olefin copolymer (D) is prepared by copolymerizing ethylene and an olefin of 3 to 20 carbon atoms in the presence of an olefin polymerization catalyst which comprises, for example, (a) an organoaluminum oxy-compound and (b-III) the transition metal compound represented by the formula (III) as described later. The organoaluminum oxy-compound (a) is the same as that previously described in the process for preparing the ethylene/α-olefin copolymer (A). Similarly to the above case, the carrier (c) and the organoaluminum compound (d) may be employed, and prepolymerization may be conducted. The amounts of the components, prepolymerization conditions and polymerization conditions for preparing the ethylene/α-olefin copolymer (D) are the same as those for preparing the ethylene/α-olefin copolymer (A).

The transition metal compound (b-III) is described below.
(b-III) Transition Metal Compound The transition metal compound of a Group 4 transition metal of the periodic table including a ligand having a cyclopentadienyl skeleton (b-III) (sometimes referred to as "component (b-III)" hereinafter) used for preparing the ethylene/α-olefin copolymer (D) is not particularly limited as long as a compound of a Group 4 transition metal of the periodic table containing a ligand having a cyclopentadienyl skeleton. The transition metal compound (b-III), further, is preferably a compound represented by the following formula (III).

ML³$_x$     (III)

In the formula (III), M is a transition metal atom selected from Group 4 of the periodic table, specifically zirconium, titanium or hafnium, preferably zirconium.

x is a valence of the transition metal.

L³ is a ligand coordinated to the transition metal atom M, and at least one ligand L³ is a ligand having a cyclopentadienyl skeleton. Examples of the ligands having a cyclopentadienyl skeleton include:

a cyclopentadienyl group;

alkyl-substituted cyclopentadienyl groups, such as a methylcyclopentadienyl group, a dimethyl cyclopentadienyl group, a trimethyl cyclopentadienyl group, a tetramethyl cyclopentadienyl group, a pentamethyl cyclopentadienyl group, an ethyl cyclopentadienyl group, a methylethylcyclopentadienyl group, a propylcyclopentadienyl group, a methylpropylcyclopentadienyl group, a butylcyclopentadienyl group, a methylbutylcyclopentadienyl group and a hexylcyclopentadienyl group; an indenyl group; a 4,5,6,7-tetrahydroindenyl group; and a fluorenyl group. These groups may be substituted with halogen atoms, trialkylsilyl groups and the like.

Of the ligands having a cyclopentadienyl skeleton, particularly preferable are alkyl-substituted cyclopentadienyl groups.

When the compound of the formula (III) contains two or more ligands having a cyclopentadienyl skeleton, two of them may be bonded through an alkylene group, such as ethylene or propylene, a substituted alkylene group, such as isopropylidene or diphenylmethylene, a silylene group, or a substituted silylene group, such as dimethylsilylene, diphenylsilylene or methylphenyl silylene.

In the formula (III), L³ other than the ligand having a cyclopentadienyl skeleton is a hydrocarbon group of 1 to 12 carbon atoms, an alkoxy group, an aryloxy group, a trialkylsilyl group, a halogen atom, hydrogen or a SO₃R group (R is a hydrocarbon group of 1 to 8 carbon atoms which may have a substituent such as halogen), each of which is the same group or atom as indicated by L¹ in the formula (I). Examples of the ligands represented by SO₃R include a p-toluenesulfonato group, a methanesulfonato group and a trifluoromethane sulfonato group.

The transition metal compound of the formula (III) in which the valence of the transition metal is, for example, 4, is more specifically represented by the following formula (III'):

R²$_k$R³$_l$R⁴$_m$R⁵$_n$M     (III')

wherein M is the same transition metal atom as described above; R² is a group (ligand) having a cyclopentadienyl skeleton; $R^3$, $R^4$ and $R^5$ are each a group having a cyclopentadienyl skeleton, an alkyl group, a cycloalkyl group, an aryl group, an aralkyl group, an alkoxy group, an aryloxy group, a trialkylsilyl group, a $SO_3R$ group, a halogen atom or hydrogen; k is an integer of 1 or more; and k+l+m+n=4.

In the present invention, a metallocene compound wherein one of $R^3$, $R^4$ and $R^5$ is a group (ligand) having a cyclopentadienyl skeleton, e.g., a metallocene compound wherein $R^2$ and $R^3$ are each a group (ligand) having a cyclopentadienyl skeleton, is preferably employed. The groups having a cyclopentadienyl skeleton may be bonded through an alkylene group such as ethylene or propylene, a substituted alkylene group such as isopropylidene or diphenylmethylene, a silylene group, or a substituted silylene group such as dimethylsilylene, diphenyl silylene or methylphenylsilylene. In this case, other ligands (e.g., $R^4$ and $R^5$) are each a group having a cyclopentadienyl skeleton, an alkyl group, a cycloalkyl group, an aryl group, an aralkyl group, an alkoxy group, an aryloxy group, a trialkylsilyl group, a $SO_3R$ group, a halogen atom or hydrogen.

Examples of the transition metal compounds of the formula (III) include:
bis(indenyl)zirconium dichloride,
bis(indenyl)zirconium dibromide,
bis(indenyl)zirconium bis(p-toluenesulfonato),
bis(4,5,6,7-tetrahydroindenyl)zirconium dichloride,
bis(fluorenyl)zirconium dichloride,
ethylenebis(indenyl)zirconium dichloride,
ethylenebis(indenyl)zirconium dibromide,
ethylenebis(indenyl)dimethylzirconium,
ethylenebis(indenyl)diphenylzirconium,
ethylenebis(indenyl)methylzirconium monochloride,
ethylenebis(indenyl)zirconium bis(methanesulfonato),
ethylenebis(indenyl)zirconium bis(p-toluenesulfonato),
ethylenebis(indenyl)zirconium bis (trifluoromethanesulfonato),
ethylenebis(4,5,6,7-tetrahydroindenyl)zirconium dichloride,
isopropylidene(cyclopentadienyl-fluorenyl)zirconium dichloride,
isopropylidene(cyclopentadienyl-methylcyclopentadienyl) zirconium dichloride,
dimethylsilylenebis(cyclopentadienyl)zirconium dichloride,
dimethylsilylenebis(methylcyclopentadienyl)zirconium dichloride,
dimethylsilylenebis(dimethylcyclopentadienyl)zirconium dichloride,
dimethylsilylenebis(trimethylcyclopentadienyl)zirconium dichloride,
dimethylsilylenebis(indenyl)zirconium dichloride,
dimethylsilylenebis(indenyl)zirconium bis (trifluoromethanesulfonato),
dimethylsilylenebis(4,5,6,7-tetrahydroindenyl)zirconium dichloride,
dimethylsilylene(cyclopentadienyl-fluorenyl)zirconium dichloride,
diphenylsilylenebis(indenyl)zirconium dichloride,
methylphenylsilylenebis(indenyl)zirconium dichloride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochioride,
bis(cyclopentadienyl)phenylzirconium monochloride,
bis(cyclopentadienyl)benzylzirconium monochloride,
bis(cyclopentadienyl)zirconium monochoride monohydride,
bis(cyclopentadienyl)methylzirconium monohydride,
bis(cyclopentadienyl)dimethylzirconium,
bis(cyclopentadienyl)diphenylzirconium,
bis(cyclopentadienyl)dibenzylzirconium,
bis(cyclopentadienyl)zirconium methoxychloride,
bis(cyclopentadienyl)zirconium ethoxychloride,
bis(cyclopentadienyl)zirconium bis(methanesulfonato),
bis(cyclopentadienyl)zirconium bis(p-toluenesulfonato),
bis(cyclopentadienyl)zirconium bis (trifluoromethanesulfonato),
bis(methylcyclopentadienyl)zirconium dichloride,
bis(dimethylcyclopentadienyl)zirconium dichloride,
bis(dimethylcyclopentadienyl)zirconium ethoxychloride,
bis(dimethylcyclopentadienyl)zirconium bis(trifluoromethane-sulfonato),
bis(ethylcyclopentadienyl)zirconium dichloride,
bis(methylethylcyclopentadienyl)zirconium dichloride,
bis(propylcyclopentadienyl)zirconium dichloride,
bis(methylpropylcyclopentadienyl)zirconium dichloride,
bis(butylcyclopentadienyl)zirconium dichloride,
bis(methylbutylcyclopentadienyl)zirconium dichloride,
bis(methylbutylcyclopentadienyl)zirconium bis (methanesulfonato),
bis(trimethylcyclopentadienyl)zirconium dichloride,
bis(tetramethylcyclopentadienyl)zirconium dichloride,
bis(pentamethylcyclopentadienyl)zirconium dichloride,
bis(hexylcyclopentadienyl)zirconium dichloride, and
bis(trimethylsilylcyclopentadienyl)zirconium dichloride.

In the above examples, the di-substituted cyclopentadienyl rings include 1,2- and 1,3-substituted cyclopentadienyl rings, and the tri-substituted cyclopentadienyl rings include 1,2,3- and 1,2,4-substituted cyclopentadienyl rings. The alkyl groups, such as propyl and butyl include isomers, such as n-, i-, sec- and tert-alkyl groups.

Also employable are compounds obtainable by replacing zirconium with titanium or hafnium in the above-exemplified zirconium compounds.

The transition metal compounds represented by the formula (III) include the transition metal compounds (b-I) represented by the formula (I) and the transition metal compounds (b-II) represented by the formula (II).

The ethylene/α-olefin copolymer (D) is prepared by copolymerizing ethylene and an α-olefin of 3 to 20 carbon atoms in the presence of the above-mentioned olefin polymerization catalyst in such a way that the resulting copolymer has a density of from 0.850 to 0.980 g/cm$^3$.

The ethylene/α-olefin copolymer (D) is used in an amount of preferably 99 to 60 parts by weight, more preferably 95 to 60 parts by weight, based on 100 parts by weight of the ethylene copolymer composition (A) or the ethylene copolymer composition (A').

A composition which comprises the ethylene/α-olefin copolymer (D) and either the ethylene copolymer composition (A) or the ethylene copolymer composition (A') can be prepared by the conventional processes previously described.

The molded products according to the invention are formed from the ethylene copolymer composition (A), (A'), (A") or (A''').

Examples of the molded products include single-layer films, multi-layer films, injection molded products, extrusion molded products, fibers, foam products and electric wire sheaths. More specifically, there can be mentioned agricultural films (single-layer, multi-layer), water barrier sheets, multi-layer films, packaging films (multi-layer films, stretch films, heavy-duty packaging films), multi-layer barrier films, sealants for laminated films, heavy-duty packaging films, grain bags, fluid packaging pouches, batch inclusion packages, bag-in-box interior containers, medical containers, heat-resistant containers, fibers, expansion molded products, gaskets, extrusion molded products, pipes, various injection molded products and electric wire sheaths.

The molded products formed from the ethylene copolymer composition (A), (A'), (A") or (A''') are described below in more detail.

Agricultural Film (Single-layer)

The agricultural film comprises the ethylene copolymer composition (A), (A'), (A") or (A'''), and if desired, additives hitherto known, such as antioxidant, ultraviolet light absorber, lubricant, slip agent, anti-blocking agent, anti-stick agent, antistatic agent, colorant, carbon black, medium-density polyethylene, ethylene/vinyl acetate copolymer and ethylene/α-olefin copolymer rubber.

The agricultural film of the invention has a thickness of 3 to 30 μm, preferably 7 to 20 μm.

The agricultural film can be prepared by film molding of the ethylene copolymer composition (A), (A'), (A") or (A''') using an inflation method or a T-die method. Film molding using the inflation method can be conducted by extruding the composition (A), (A'), (A") or (A''') through a slit die and inflating the extrudate with a given air steam.

The agricultural film is excellent in various properties such as weathering stability, tensile properties, tear properties, impact resistance and rigidity as well as in adhesion to soil, i.e., flexibility, so that it can be effectively used for open-field culturing, growing in plastic tunnel, semi-forcing growing in greenhouse, non-support growing for processing, early digging culturing, etc. as mulch films which are mainly required to exert soil temperature rise effects.

Agricultural Multi-layer Film

The agricultural multi-layer film according to the invention is a three-layer laminated film consisting of an outer layer, an intermediate layer and an inner layer.

Outer layer

The outer layer for constituting the agricultural multi-layer film of the invention is formed from a composition comprising the ethylene copolymer composition (A), (A'), (A") or (A'''), an inorganic compound, and if desired, a weathering stabilizer and an anti-fogging agent.

The outer layer comprising the composition (A), (A'), (A") or (A''') has an extremely small decrease of light transmittance with time. Therefore, the agricultural multi-layer film having such outer layer can be in a spread state for a long period of time.

When the composition (A), (A'), (A") or (A''') is used, the outer layer of the multi-layer film can be thinned, so that the multi-layer film can be made lightweight.

Inorganic Compound

Examples of the inorganic compounds employable for forming the outer layer of the multi-layer film include inorganic oxides, inorganic hydroxides and hydrotalcites all of which contain at least one atom selected from Mg, Ca, Al and Si, and are effective as thermo-keeping agents.

More specifically, there can be mentioned inorganic oxides, such as $SiO_2$, $Al_2O_3$, MgO and CaO; inorganic hydroxides, such as $Al(OH)_3$, $Mg(OH)_2$ and $Ca(OH)_2$; and hydrotalcites such as inorganic complex compounds represented by the formula $M^{2+}_{1-x}Al_x(OH)_2(A^{n-})_{x/n} \cdot mH_2O$ (wherein $M^{2+}$ is a divalent metal ion of Mg, Ca or Zn, $A^{n-}$ is an anion such as $Cl^-$, $Br^-$, $I^-$, $NO_3^{2-}$, $ClO_4^-$, $SO_4^{2-}$, $CO_2^{2-}$, $SiO_3^{2-}$, $HPO_4^{2-}$, $HBO_3^{2-}$ or $PO_4^{2-}$, x is a number satisfying the condition of 0<x<0.5, and m is a number satisfying the condition of $0 \leq m \leq 2$), and the calcined products of the compounds. Of these, preferable are hydrotalcites, and particularly preferable are calcined products of the inorganic complex compounds represented by the above formula.

The inorganic compounds mentioned above can be used singly of in combination of two or more kinds.

The inorganic compound desirably has an average particle diameter of not more than 10 μm, preferably not more than 5 μm, more preferably not more than 3 μm.

When the average particle diameter of the inorganic compound is in the above range, a multi-layer film having good transparency can be obtained.

In the present invention, the inorganic compound is used in an amount of 1 to 20 parts by weight, preferably 1 to 18 parts by weight, more preferably 2 to 15 parts by weight, based on 100 parts by weight of the composition (A), (A'), (A") or (A''').

When the inorganic compound is used in the above amount in the formation of an outer layer of a multi-layer film, a multi-layer film having excellent thermo-keeping properties can be obtained.

Weathering Stabilizer

Although the weathering stabilizers optionally used for forming the outer layer of the multi-layer film are broadly divided into ultraviolet light stabilizers and light stabilizers, the light stabilizers are more effective for thin agricultural films and exert higher effects in the weathering stability.

As the light stabilizers, hitherto known light stabilizers are employable. Above all, hindered amine light stabilizers (HALS) are preferably employed.

Examples of the hindered amine light stabilizers include the following compounds.

(1) Bis(2,2,6,6-tetramethyl-4-piperidyl) sebacate,
(2) Dimethyl succinate-1-(2-hydroxyethyl)-4-hydroxy-2,2,6,6-tetramethylpiperidine polycondensate,
(3) Tetrakis(2,2,6,6-tetramethyl-4-piperidyl)-1,2,3,4-butanetetracarboxylate,
(4) 2,2,6,6-Tetramethyl-4-piperidinyl benzoate,
(5) Bis-(1,2,6,6-tetramethyl-4-piperidinyl)-2-(3,5-di-t-butyl-4-hydroxybenzyl)-2-n-butyl malonate,
(6) Bis(N-methyl-2,2,6,6-tetramethyl-4-piperidinyl) sebacate,
(7) 1,1'-(1,2-ethanediyl)bis(3,3,5,5-tetramethylpiperazinone),
(8) (Mixed 2,2,6,6-tetramethyl-4-piperidyl/tridecyl)-1,2,3,4-butanetetracarboxylate,
(9) (Mixed 1,2,2,6,6-pentamethyl-4-piperidyl/tridecyl-1,2,3,4-butanetetracarboxylate,
(10) Mixed {2,2,6,6-tetramethyl-4-piperidyl/β,β,β',β'-tetramethyl-3,9-[2,4,8,10-tetraoxaspiro(5,5)undecane] diethyl}-1,2,3,4-butanetetracarboxylate,
(11) Mixed {1,2,2,6,6-pentamethyl-4-piperidyl/β,β,β',β'-tetramethyl-3,9-[2,4,8,10-tetraoxaspiro(5,5)undecane] diethyl}-1,2,3,4-butanetetracarboxylate,
(12) N,N'-bis(3-aminopropyl)ethylenediamine-2,4-bis[N-butyl-N-(1,2,2,6,6-pentamethyl-4-piperidyl)amino]-6-chloro-1,3,5-triazine condensate,
(13) Condensate of N,N'-bis(2,2,6,6-tetramethyl-4-piperidyl)hexamethylenediamine and 1,2-dibromoethane, and
(14) [N-(2,2,6,6-tetramethyl-4-piperidyl)-2-methyl-2-(2,2,6,6-tetramethyl-4-piperidyl)imino]propionamide.

These hindered amine light stabilizers can be used singly or in combination of two or more kinds.

The light stabilizer is used in an amount of 0.005 to 5 parts by weight, preferably 0.005 to 2 parts by weight, more preferably 0.01 to 1 part by weight, based on 100 parts by weight of the composition (A), (A'), (A") or (A''').

Examples of the ultraviolet light absorbers include;

salicylic acid type ultraviolet light absorbers, such as phenyl salicylate, p-tert-butylphenyl salicylate and p-octylphenyl salicylate;

benzophenone type ultraviolet light absorbers, such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone and 2-hydroxy-4-methoxy-5-sulfobenzophenone;

benzotriazole type absorbers, such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and 2-(2'-hydroxy-3',5'-di-tert-amylphenyl)benzotriazole; and cyano acrylate type ultraviolet absorbers, such as 2-ethylhexyl-2-cyano-3,3'-diphenyl acrylate, ethyl-2-cyano-3,3'-diphenyl acrylate.

The ultraviolet light absorber is used in an amount of 0.005 to 5 parts by weight, preferably 0.005 to 2 parts by weight, more preferably 0.01 to 1 part by weight, based on 100 parts by weight of the the composition (A), (A'), (A") or (A''').

Other Components

To the composition (A), (A'), (A") or (A'''), hitherto known additives, such as anti-fogging agent, antistatic agent and heat stabilizer, can be added in amounts not detrimental to the objects of the present invention.

The anti-fogging agent preferably used is an anti-fogging agent containing as a main ingredient a partially esterified product comprising a polyhydric alcohol and a higher fatty acid of 12 to 24 carbon atoms (including hydroxy fatty acid).

Intermediate Layer

The intermediate layer for constituting the agricultural multi-layer film of the invention is formed from a composition comprising an ethylene/vinyl acetate copolymer, an inorganic compound, and if desired, an ethylene/α-olefin copolymer (A-1) as described herein below, a weathering stabilizer and an anti-fogging agent.

Ethylene/vinyl Acetate Copolymer

The ethylene/vinyl acetate copolymer for use in the invention has a vinyl acetate content of 2.0 to 30% by weight, preferably 3.0 to 25% by weight, more preferably 5.0 to 20% by weight.

When the intermediate layer is formed by the use of the ethylene/vinyl acetate copolymer, a multi-layer film having excellent thermo-keeping properties can be obtained. The term "thermo-keeping properties" used herein means properties to absorb radiation released in the night from the ground whose temperature has been raised by absorption of the sunlight during the daytime and to reflect the radiation so as to maintain the temperature (atmospheric temperature and soil temperature) inside the greenhouse or the tunnel.

Inorganic Compound

The inorganic compound used for forming the intermediate layer of the multi-layer film is identical with the inorganic compound used for forming the aforesaid outer layer.

The inorganic compound is used in an amount of 1 to 20 parts by weight, preferably 1 to 18 parts by weight, more preferably 2 to 15 parts by weight, based on 100 parts by weight of the total of the ethylene/vinyl acetate copolymer and the later-described ethylene/α-olefin copolymer (A-1). The component (A-1) is a component optionally used, so that the amount thereof may become 0 part by weight.

When the inorganic compound is used in the above amount in the formation of an intermediate layer of a multi-layer film, a multi-layer film having more excellent thermo-keeping properties can be obtained.

Ethylene/α-olefin Copolymer (A-1)

The ethylene/α-olefin copolymer (A-1) which is optionally used for forming the intermediate layer of the multi-layer film has a density of not more than 0.925 $g/cm^3$, preferably 0.880 to 0.920 $g/cm^3$, which is one of the ethylene/α-olefin copolymer (A).

In the present invention, the weight ratio of the ethylene/α-olefin copolymer (A-1) to the ethylene/vinyl acetate copolymer (C) ((A-1)/(C)) is in the range of 99/1 to 1/99, preferably 90/10 to 10/90, more preferably 80/20 to 20/80.

When the ethylene/α-olefin copolymer (A-1) is used in the above weight ratio to the ethylene/vinyl acetate copolymer in the formation of the intermediate layer of the multi-layer film, the intermediate layer can be thinned.

Weathering Stabilizer

Examples of the weathering stabilizers optionally used in the formation of the intermediate layer of the multi-layer film include the same ultraviolet light absorbers and light stabilizers as previously described in the formation of the outer layer.

The light stabilizer is used in an amount of 0.005 to 5 parts by weight, preferably 0.005 to 2 parts by weight, more preferably 0.01 to 1 part by weight, based on 100 parts by weight of the total of the ethylene/α-olefin copolymer (A-1) and the ethylene/vinyl acetate copolymer. The component (A-1) is a component optionally used, so that the amount thereof may become 0 part by weight.

The ultraviolet light absorber is used in an amount of 0.005 to 5 parts by weight, preferably 0.005 to 2 parts by weight, more preferably 0.01 to 1 part by weight, based on 100 parts by weight of the total of the ethylene/α-olefin copolymer (A-1) and the ethylene/vinyl acetate copolymer. The component (A-1) is a component optionally used, so that the amount thereof may become 0 part by weight.

Other Components

To the ethylene/vinyl acetate copolymer for forming the intermediate layer, hitherto known additives, such as anti-fogging agent, antimist agent, antistatic agent and heat stabilizer, can be added in amounts not detrimental to the objects of the present invention.

The anti-fogging agent preferably used is an anti-fogging agent containing as a main ingredient a partially esterified product comprising a polyhydric alcohol and a higher fatty acid of 12 to 24 carbon atoms (including hydroxy fatty acid).

The anti-fogging agent is used in an amount of 0.05 to 5 parts by weight, preferably 0.1 to 4 parts by weight, more preferably 0.5 to 3 parts by weight, based on 100 parts by weight of the total of the ethylene/α-olefin copolymer (A-1) and the ethylene/vinyl acetate copolymer. The component (A-1) is a component optionally used, so that the amount thereof may become 0 part by weight.

Inner Layer

The inner layer for constituting the agricultural multi-layer film of the invention is formed from the composition (A), (A'), (A") or (A'''). To the composition (A), (A'), (A") or (A'''), an inorganic compound, a weathering stabilizer and an anti-fogging agent can be added.

In the present invention, the inorganic compound is used in an amount of 1 to 3 parts by weight based on 100 parts by weight of the composition (A), (A'), (A") or (A''').

When the inorganic compound (B) is used in the above amount in the formation of an inner layer of a multi-layer film, a multi-layer film having excellent thermo-keeping properties can be obtained.

Weathering Stabilizer

Examples of the weathering stabilizers optionally used in the formation of the inner layer of the multi-layer film include the same ultraviolet light absorbers and light stabilizers as previously described.

The light stabilizer is used in an amount of 0.005 to 5 parts by weight, preferably 0.005 to 2 parts by weight, more preferably 0.01 to 1 part by weight, based on 100 parts by weight of the composition (A), (A'), (A") or (A'").

The ultraviolet light absorber is used in an amount of 0.005 to 5 parts by weight, preferably 0.005 to 2 parts by weight, more preferably 0.01 to 1 part by weight, based on 100 parts by weight of the copolymer (A) or the composition (A'), (A") or (A'").

Other Components

To the composition (A), (A'), (A") or (A'") used for forming the inner layer of the multi-layer film, hitherto known additives, such as anti-fogging agent, antistatic agent and heat stabilizer, can be added in amounts not detrimental to the objects of the present invention.

The anti-fogging agent preferably used is an anti-fogging agent containing as a main ingredient a partially esterified product comprising a polyhydric alcohol and a higher fatty acid of 12 to 24 carbon atoms (including hydroxy fatty acid).

The anti-fogging agent is used in an amount of 0.05 to 5 parts by weight, preferably 0.1 to 3 parts by weight, more preferably 0.5 to 2 parts by weight, based on 100 parts by weight of the composition (A), (A'), (A") or (A'").

Multi-layer Film

In the agricultural multi-layer film of the invention consisting of the outer layer, the intermediate layer and the inner layer, the thickness of the outer layer is in the range of usually 3 to 100 $\mu$m, preferably 10 to 80 $\mu$m, more preferably 20 to 70 $\mu$m; the thickness of the intermediate layer is in the range of 10 to 150 $\mu$m, preferably 20 to 120 $\mu$m, more preferably 30 to 100 $\mu$m; the thickness of the inner layer is in the range of 3 to 100 $\mu$m, preferably 10 to 80 $\mu$m, more preferably 20 to 70 $\mu$m; and the total thickness of these layers is in the range of 30 to 200 $\mu$m, preferably 50 to 180 $\mu$m, more preferably 70 to 150 $\mu$m.

The agricultural multi-layer film of the invention has the following physical properties and characteristics.

(i) The Elmendorf tear strength is not less than 90 kg/cm, preferably not less than 100 kg/cm, in MD, and is not less than 90 kg/cm, preferably not less than 100 kg/cm, in TD.

(ii) The dart impact strength in the thickness of 100 $\mu$m is not less than 900 g, preferably not less than 1,000 g.

(iii) The tensile strength at break is not less than 350 kg/cm$^2$, preferably not less than 370 kg/cm$^2$, in MD, and is not less than 350 kg/cm$^2$, preferably not less than 370 kg/cm$^2$, in TD.

(iv) In case of a film having a thickness of 100 $\mu$m, the initial light transmittance is not less than 90%, preferably not less than 92%, and the light transmittance after outdoor exposure of 120 days is not less than 85%, preferably not less than 87%.

The Elmendorf tear strength is determined by carrying out a tensile strength test in MD and TD in accordance with JIS Z 1702. The dart impact strength is determined by carrying out an impact test in accordance with JIS Z 1707 (dart tip diameter: 38 mm). The tensile strength at break is determined in accordance with JIS K 6781 by carrying out a tensile test of a multi-layer film in MD and TD using a tensile tester of constant crosshead speed type (manufactured by Instron Co.).

The agricultural multi-layer film of the invention having a thickness of 50 $\mu$m has a gloss of usually not less than 60% and a haze of usually not more than 15%.

The gloss of the film was measured at an incident angle of 60° in accordance with ASTM D 523. The haze of the film was measured in accordance with ASTM D 1003-61.

Preparation of Multi-layer Film

The agricultural multi-layer film of the invention can be prepared by a process comprising mixing the polyethylene resin and the aforesaid additives for each layer of the multi-layer film, melt kneading each mixture by a Banbury mixer or a roll mill and subjecting the mixtures to a coextrusion inflation method or a coextrusion T-die method to laminate the outer layer, the intermediate layer and the inner layer together.

The agricultural multi-layer film has excellent thermo-keeping properties, dustproof properties and toughness, so that it can be used for a long period of time for culturing of useful crops by spreading them to form agricultural and horticultural facilities such as greenhouse and tunnel.

Water Barrier Sheet

The water barrier sheet is formed from the ethylene copolymer composition (A), (A'), (A") or (A'"), and if desired, known additives such as carbon black, heat stabilizer, weathering stabilizer, pigment, filler (except carbon black), lubricant, antistatic agent, flame retardant and blowing agent. The water barrier sheet may be a multi-layer sheet wherein the outer layer or the inner layer made of the composition (A), (A'), (A") or (A'") is combined with other substrates, reinforcing materials or other drainage materials.

The water barrier sheet preferably has the following properties: in case of a sheet having a thickness of 1.5 mm, the elongation at tear (JIS A 6008, Crepe method, rate: 200 mm/min) is not less than 80%; in case of a sheet having a thickness of 1.5 mm, the elongation at penetration is not less than 5 mm; the peel strength (JIS K 6328, rate: 50 mm/min) at the heat-sealed portion of sheets having been heat sealed under the conditions of a preset temperature of 500° C. and a sealing rate of 5 m/min using a field heat sealer is not less than 10 kg/20 mm.

The water barrier sheet is sometimes brought into contact with uneven substances, particularly pointed or tapered substances, so that the elongation at tear or the elongation at penetration are important factors of maintaining qualities of the water barrier sheet.

As the heat sealer for field use, a hot air sheet sealer 10E model manufactured by Leister Co. is employed. The peel test was carried out as follows: two sheets were heat-sealed using a hot air sheet sealer 10E model manufactured by Leister Co. under the conditions of a preset temperature of 500° C. and a rate of 5 m/min, then conditioned at 23° C. for 48 hours or more, and subjected to a peel strength test at a rate of 50 mm/min in accordance with JIS K 6328 to measure a peel strength, which was taken as an indication of heat-sealing properties. The penetration test was carried out as follows: a water barrier sheet was fixed to a fixture having a diameter of 5 cm, then a needle having a flat tip having a diameter of 0.7 mm was penetrated into the sheet at a rate of 50 mm/min to measure a breaking strength, and thereby a ratio of breaking strength/sheet thickness (kg/mm) and an elongation at break were determined.

The water barrier sheet of the invention is extremely favorable in practical use because it can be easily heat sealed with high strength by a heat sealer practically used in situ.

The water barrier sheet is excellent in mechanical strength, such as tensile strength, tear strength, elongation at tear, penetration strength and elongation at penetration, and has excellent flexibility and heat-sealing properties.

Multi-layer Film

The multi-layer film comprises a substrate film layer and a layer comprising the ethylene copolymer composition (A), (A'), (A") or (A''').

There is no specific limitation on the material of the substrate film, as far as the material has an ability of forming a film, and for example, polymers, paper, aluminum foil and cellophane are employable. Examples of the polymers include olefin polymers, such as high-density polyethylene, medium-density or low-density polyethylene, an ethylene/vinyl acetate copolymer, an ethylene/acrylate copolymer, an ionomer, polypropylene, poly-1-butene and poly-4-methyl-1-pentene; vinyl polymers, such as polyvinyl chloride, polyvinylidene chloride, polystyrene, polyacrylate and polyacrylonitrile; polyamide polymers, such as nylon 6, nylon 66, nylon 10, nylon 11, nylon 12, nylon 610 and polymetaxyleneadipamide; polyester polymers, such as polyethylene terephthalate, polyethylene terephthalate/isophthalate and polybutylene terephthalate; polyvinyl alcohol; ethylene/vinyl alcohol copolymers; and polycarbonate polymers.

When the substrate film is made of a polymer, the polymer film may be a non-stretched film or may be a monoaxially stretched or biaxially oriented film.

The substrate can be appropriately selected according to the use application of the multi-layer film. For example, in case of a packaging composite film, the substrate can be appropriately selected according to a substance to be packaged. For example, when the substance to be packaged is a perishable food, resins having excellent transparency, rigidity and gas permeation resistance, such as polyamides, polyvinylidene chloride, ethylene/vinyl alcohol copolymers, polyvinyl alcohol and polyesters, are employable. When the substance to be packaged is cookie or when fiber packaging is made, polypropylene having excellent transparency, rigidity and water permeation resistance is preferably employed.

In the formation of a layer of the ethylene copolymer composition (A), (A'), (A") or (A''') on the substrate by extrusion coating, the composition (A), (A'), (A") or (A''') may be subjected to extrusion coating directly onto the substrate, or in order to improve adhesion between the substrate and the composition (A), (A'), (A") or (A'''), the substrate is preliminarily coated with an anchor coating agent of organic titanium type, polyethylene imine type or isocyanate type by a known method, or is provided with an undercoating resin layer of adherent polyolefin or high-pressure polyethylene, and then the composition (A), (A'), (A") or (A''') may be subjected to extrusion coating.

In order to ensure adhesion properties between the substrate and the resin to be brought into contact with the substrate (undercoating resin or the composition (A), (A'), (A") or (A''')), it is possible to blow ozone to the extruded molten resin film to forcedly oxidize the surface of the film.

The multi-layer film is favorably used for various packaging bags, e.g., packaging bags of moist foods such as liquid soup, pickles and konnjak spaghetti, packaging bags of paste foods such as miso and jam, packaging bags of powders such as sugar, flour and fish flour, and packaging bags of medical tablets or granules. In these uses, the multi-layer film plays a roll of a sealant layer.

Packaging Multi-layer Film

The packaging multi-layer film has a structure of at least three layers consisting of an outer layer, one or more intermediate layers and an inner layer. The resin for forming the outer layer and the inner layer and the resin for forming the intermediate layer are different in their composition.

The outer layer and the inner layer are each formed from the ethylene copolymer composition (A), (A'), (A") or (A'''). The composition (A), (A'), (A") or (A''') for forming the outer layer and the composition (A), (A'), (A") or (A''') for forming the inner layer may be the same or different.

The intermediate layer is arbitrarily selected from resin compositions used as materials of the aforesaid substrate film. The intermediate layer is preferably a layer formed from a resin or a resin composition comprising a 1-butene (co)polymer and if desired an ethylene/propylene/1-butene random copolymer.

The 1-butene (co)polymer is a 1-butene homopolymer or a 1-butene/propylene copolymer having a 1-butene content of 75 to 85% by mol and a propylene content of 15 to 25% by mol.

The 1-butene (co)polymer has an MFR of 0.1 to 5 g/10 min, preferably 0.5 to 2 g/10 min, and a density of 0.890 to 0.925 g/cm$^3$, preferably 0.895 to 0.920 g/cm$^3$. The 1-butene (co)polymer can be prepared by the use of an ordinary Ziegler-Natta catalyst.

In the present invention, the 1-butene (co)polymer is used in an amount of 40 to 100% by weight, preferably 50 to 90% by weight, more preferably 55 to 95% by weight, based on 100% by weight of the total of the 1-butene (co)polymer and the ethylene/propylene/1-butene random copolymer.

The ethylene/propylene/1-butene random copolymer desirably has a propylene content of 50 to 98% by mol, preferably 70 to 97% by mol.

The ethylene/propylene/1-butene random copolymer has an MFR of 0.1 to 100 g/10 min, preferably 1 to 30 g/10 min, and a density of 0.890 to 0.910 g/cm$^3$.

The ethylene/propylene/1-butene random copolymer can be prepared by the use of an ordinary Ziegler-Natta catalyst.

In the present invention, the ethylene/propylene/1-butene random copolymer is used in an amount of 0 to 60% by weight, preferably 10 to 50% by weight, more preferably 5 to 45% by weight, based on 100% by weight of the total of the 1-butene (co)polymer and the ethylene/propylene/1-butene random copolymer.

When the amounts of the 1-butene (co)polymer and the ethylene/propylene/1-butene random copolymer are within the above ranges, a multi-layer film capable of being well cut with an automatic packaging machine can be obtained.

In the present invention, in addition to the 1-butene (co)polymer and the ethylene/propylene/1-butene random copolymer, various additives such as stabilizer, compounding agent and filler may be added to the resin or the resin composition for forming the intermediate layer in amounts not detrimental to the objects of the invention, similarly to the resin or the resin composition for forming the aforesaid outer and inner layers. In particular, an anti-fogging agent or an antistatic agent may be added in order that the contents look better, or an ultraviolet inhibitor may be added in order to protect the contents. An antioxidant and a lubricant may be also added.

The intermediate layer may comprise one or more layers in which the 1-butene (co)polymer and the ethylene/propylene/1-butene random copolymer are contained in the above amounts.

The packaging multi-layer film of the invention is produced to have a thickness of usually 10 to 20 μm. The intermediate layer of the film is adjusted to have a thickness of 1 to 5 μm, and each of the outer layer and the inner layer is adjusted to have a thickness of 2 to 8 μm. Depending on the use application, it is possible to form other resin layers on the outer side of the inner layer and/or the outer layer.

The packaging multi-layer film is produced by mixing the components for forming each layer using various blenders and then performing an ordinary molding method, namely, a method of feeding the mixtures to an inflation film molding machine that is an extruder equipped with plural die lips or a T-die molding machine.

In the packaging multi-layer film, the ratio of an Elmendorf tear strength in the cross direction to an Elmendorf tear strength in the machine direction (cross direction/machine direction) is desirably not more than 9.1, and such a film can be used as an excellent packaging film. Especially when the film is applied to an automatic packaging machine, the film is cut with a knife running in the cross direction of the film, so that the cutting of the film can be evaluated by the ratio of an Elmendorf tear strength in the cross direction to an Elmendorf tear strength in the machine direction. If the Elmendorf tear strength ratio is not more than 9.1, the cutting of the film with an automatic packaging machine is evaluated as good.

The packaging multi-layer film of the invention has the Elmendorf tear strength ratio of not more than 9.1 and can be easily cut with an automatic packaging machine. Besides, by the use of this film, high-speed continuous packaging is feasible. The Elmendorf tear strength is measured in accordance with the method of JIS Z-1702.

The packaging multi-layer film of the invention has excellent transparency and has a haze of usually not more than 2.0%.

Further, the packaging multi-layer film of the invention has excellent finger-press recovery properties, and has an initial recovery of not less than 70% and a permanent set of not more than 5.5 mm.

Furthermore, the packaging multi-layer film of the invention has excellent low-temperature sealing properties, and has a sealing strength of not less than 100 kg/cm$^2$ after it is heat sealed at 90° C.

The packaging multi-layer film is excellent in mechanical strength properties, transparency and low-temperature heat-sealing properties and has excellent recovery properties even when it is pressed toward the contents after packaging, so that it is suitable for packaging foods and daily necessaries.

Stretch Packaging Film

The stretch packaging film is formed from the ethylene copolymer composition (A), (A'), (A") or (A'"), and if desired, other resin components, e.g., an ethylene/propylene random copolymer having a density of 0.880 to 0.895 g/cm$^3$, an ethylene/butene random copolymer having a density of 0.880 to 0.895 g/cm$^3$ and a high-pressure ethylene/vinyl acetate random copolymer having a density of 0.910 to 0.924 g/cm$^3$.

The other resin components are used in amounts of 0 to 40 parts by weight based on 100 parts by weight of the composition (A), (A'), (A") or (A'").

In the present invention, to the composition (A), (A'), (A") or (A'"), or the composition comprising the composition (A), (A'), (A") or (A'") and other resin components, a slip agent, an anti-blocking agent, an anti-fogging agent, an antistatic agent, and other various additives to protect the contents, such as an ultraviolet inhibitor, can be added in amounts not detrimental to the objects of the invention.

Examples of the slip agents preferably employed include higher fatty amids such as oleic amide, stearic amide and erucic amide.

Examples of the anti-blocking agents preferably employed include inorganic substances such as silica and talc.

Examples of the antistatic agents preferably employed include glycerol fatty esters and sorbitol fatty esters.

The film comprising the composition (A), (A'), (A") or (A'") has desired moderate tackiness. If the film needs more tackiness, liquid polybutadiene, polyisobutylene or the like is added to the linear low-density polyethylene in an amount of about 2 to 10% by weight.

The stretch packaging film of the invention includes a film comprising the composition (A), (A'), (A") or (A'").

The stretch packaging film of the invention has a thickness of usually 10 to 50 μm. The stretch packaging film may have a single-layer structure or a multi-layer structure.

The stretch packaging film of a single-layer structure can be produced by an ordinary film molding method such as an inflation method or a T-die method.

The stretch packaging film of a multi-layer structure can be produced by a hitherto known molding method, e.g., a method of using an inflation film molding machine that is an extruder equipped with plural die lips or a T-die molding machine.

The stretch packaging film preferably has the following properties: the tensile stress at break (JIS Z1702) in the machine direction is not less than 400 kg/cm$^2$; the tensile elongation at break (JIS Z1702) in the machine direction is not less than 500%; the impact strength (ASTM D3420) is not less than 2,500 kg.cm/cm; the tear strength (JIS Z1720) in the machine direction is not less than 50 kg/cm; the tackiness (20 kg, 50° C.×one day) is in the range of 3 to 25 g/cm; the strength after a lapse of 1 hour in a stretch ratio of 300% is in the range of 150 to 300 g/15 mm; and the maximum limit of stretch is not less than 300%.

The stretch packaging film of the invention has higher tensile elongation at break than films of conventional low-density polyethylene or ethylene/vinyl acetate copolymer, and stretching in a ratio of 300 to 600% is feasible, so that the film of the invention is suitable for high stretch packaging or stretch packaging of special shapes (two or more matters having different shapes).

Further, the stretch packaging film of the invention has smaller stress applied after packaging as compared with films of conventional low-density polyethylene or ethylene/vinyl acetate copolymer, and therefore the packaged matter is hardly deformed. Moreover, the stretch packaging film of the invention has high film strength after packaging and exhibits favorable film appearance.

The stretch packaging film of the invention may be a single-layer film comprising the composition (A), (A'), (A") or (A'"), or may be a film of a multi-layer structure comprising a layer of the composition (A), (A'), (A") or (A'") and one or more other layers.

The stretch packaging film of a multi-layer structure, e.g., a multi-layer film wherein a stretch packaging film is made to have a non-tacky surface and a tacky surface, can be produced in the following manner. On one surface of a film layer of the composition (A), (A'), (A") or (A'") serving as an intermediate layer, a film layer made of linear low-density polyethylene having a higher density than the compostion (A), (A'), (A") or (A'") is formed as a non-tacky layer in such a manner that the thickness of this film layer becomes about 5 to 30% of the whole thickness of the resulting stretch packaging film. On the other surface, a film layer made of a composition comprising the composition (A), (A'), (A") or (A'") and 2 to 10% by weight of liquid polyisobutylene, liquid polybutadiene or the like is formed as a tacky layer in such a manner that the thickness of this film layer becomes about 5 to 30% of the whole thickness of the resulting stretch packaging film.

The stretch packaging film has high stretchability and moderate tackiness, applies no excess stress to the packaged matter after packaging, has high strength and good appearance after packaging, is free from excess tackiness, and is excellent in productivity, packaging properties and handling properties.

Packaging Film

The packaging film is an improved packaging or wrapping film, and more specifically, it is a shrink film, a skin film, a stretch film, a hot tack film and a vacuum wrap film with improved transparency, toughness, extrusion processability and irradiation crosslinking efficiency. These films have at least one layer of at least one ethylene copolymer composition (A), (A'), (A") or (A'"). These films may be biaxially oriented multi-layer and/or constructed with barrier properties.

To the ethylene copolymer composition (A), (A'), (A") or (A'"), additives, such as antioxidant (e.g., hindered phenol type such as Irganox (trade name) 1010 available from Ciba Geigy Corp.), phosphites (e.g., Irgafos (trade name) 168 available from Ciba Geigy Corp.), cling additives (e.g., polyisobutylene (PIB), PEPQ (trade name of Sandoz Chemical), their main material is thought to be biphenyl phosphonite), pigment, colorant and filler can be added in amounts not detrimental to the improved film properties found by the present applicants. Further, the film may also contain additives to enhance its anti-blocking and friction coefficient characteristics. Examples of such additives include untreated or treated silicon dioxide, talc, calcium carbonate and clay, as well as primary or secondary fatty amides and silicone coatings, without limiting thereto. As described in, for example, U.S. Pat. No. 4,486,552 (Niemann), other additives to enhance the anti-fogging properties of the film may also be added. Still, other additives, such as quaternary ammonium compounds singly or in combination with EAA or other functional polymers may also be added to enhance the antistatic properties of the film and allow packaging of electircally sensitive articles.

The ethylene copolymer composition (A), (A'), (A") or (A'") for use in the production of the packaging or wrapping olefin film of the invention is employable as the only polymer component of the film independent of a single-layer structure or a multi-layer structure of the film. Other polymers can also be blended with the ethylene copolymer composition (A), (A'), (A") or (A'") to improve film processability, film strength, heat sealing properties or adhesion properties. The packaging and wrapping films produced by appropriately blending the ethylene copolymer composition (A), (A'), (A") or (A'") with other polymer components maintains enhanced performance, and in a special case, improved combinations of properties are provided. Examples of suitable polymers for blending with the ethylene copolymer composition (A), (A'), (A") or (A'") include high-pressure low-density polyethylene (LDPE), ethylene/vinyl acetate copolymer (EVA), ethylene/carboxylic acid copolymers and their ionomers, polybutylene (PB), α-olefin polymers (e.g., high-density polyethylene, medium-density polyethylene, polypropylene, ethylene/propylene copolymers, linear low-density polyethylene (LLDPE) and ultra low-density polyethylene), as well as graft modified polymers, and blends thereof, without limiting to these examples. Such polymers include their variations in the density, MWD and/or combination of comonomers, for example, polymers disclosed in U.S. Pat. No. 5,032,463 by Smith (which is incorporated herein by reference). The ethylene copolymer composition (A), (A'), (A") or (A'") comprises at least 50%, preferably at least 80%, of the blend composition. Highly preferable for the multi-layer film structure, however, the outside film layer (also referred to as "skin layer" or "surface layer" in the art) and the sealant layer consists essentially of the ethylene copolymer composition (A), (A'), (A") or (A'").

The oriented and unoriented film structures of the invention can be produced using conventional simple hot blown bubble method, cast extrusion or extrusion coating techniques. Especially in case of the oriented film, the film can be produced using more elaborate techniques, such as "tenter framing", "double bubble" or "trapped bubble" method.

The terms "stretched" and "oriented" are used in the art and herein interchangeably, but orientation is actually the consequence of a film being stretched by means of, for example, internal air pressure pushing on the tube or by a tenter frame pulling on the edges of the film.

The simple hot blown bubble film method is described in, for example, "The encyclopedia of Chemical Technology", Kirt-Othmer, Third edition (John Wiley & Sons, New York) 1981, Vol. 16, pp. 416–417 and Vol. 18, pp. 191–192. The more elaborate method for producing biaxially oriented film, e.g., the "double bubble" method, is described in U.S. Pat. No. 3,456,044 (Pahlke). Other methods appropriate for producing the biaxially stretched or oriented film are described in, for example, U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.) and U.S. Pat. No. 4,952,451 (Mueller).

As described by Pahlke in U.S. Pat. No. 3,456,044 and in comparison to the simple bubble method, "double bubble" or "trapped bubble" film process can significantly increase a film's orientation in both the machine and transverse directions. The increased orientation gives higher free shrinkage values after the film is heated. As disclosed by Pahlke in U.S. Pat. No. 3,456,044 and Lustig et al. in U.S. Pat. No. 5,059,481, low-density polyethylene and ultra low-density polyethylene, respectively, exhibit poor shrink properties in machine and transverse directions when produced by the simple method, for example, they are inferior in the free shrinkage ratio in both directions by about 3%. The ethylene copolymer composition (A), (A'), (A") or (A'") of the invention, however, exhibits significantly improved shrink properties in both the machine and transverse directions even when it is used in the simple bubble method, in contrast to the conventional film materials, particularly in contrast to the film materials disclosed by Lustig et al. in U.S. Pat. No. 5,059,481, U.S. Pat. No. 4,976,898 and U.S. Pat. No. 4,863,769, as well as in contrast to the film material disclosed by Smith in U.S. Pat. No. 5,032,463. Further, when the ethylene copolymer composition (A), (A'), (A") or (A'") is produced by the simple bubble method at high blow-up ratios, e.g., 2.5:1 or higher, or more preferably, by the "double bubble" method disclosed by Pahlke in U.S. Pat. No. 3,456,044 and Lustig et al. in U.S. Pat. No. 4,976,898, it is possible to achieve favorable shrink properties in the machine and transverse directions making the obtained film suitable for shrink wrap packing purposes.

The blow-up ratio (abbreviated herein as "BUR") is calculated from the following equation:

BUR=diameter of bubble÷diameter of die.

The olefin packaging or wrapping film of the invention may be a single-layer film or a multi-layer film. When the film structure is a single-layer structure, this single layer may comprise at least one ethylene copolymer composition (A), (A'), (A") or (A'") in an amount of at least 10% by weight, preferably at least 30% by weight, or may comprise at least one ethylene copolymer composition (A), (A'), (A") or (A'") in an amount of 100% by weight.

The ethylene copolymer composition (A), (A'), (A") or (A'") used for forming this single layer depends on the properties desired in the film. When two or more kinds of the ethylene copolymer compositions (A), (A'), (A") and (A'")

are used in the single-layer film structure, the polymers are selected partly based on their compatibility with each other with respect to both processing and use conditions. Similarly, when a blend of at least one ethylene copolymer composition (A), (A'), (A") or (A''') and at least one conventional ethylene polymer (e.g., conventional uniformly branched linear ethylene/α-olefin copolymers prepared as described in U.S. Pat. No. 3,645,992, conventional ununiformly branched ethylene/α-olefin copolymers prepared by Ziegler method as described in U.S. Pat. No. 4,076,698) are used, the ethylene polymers are selected partly based on their compatibility with the ethylene copolymer composition (A), (A'), (A") or (A''').

The single-layer film can be used in any of the five various packaging methods depending on their various properties, but as a practical matter, the single-layer film is most adapted for use in the stretch overwrapping and skin packaging methods. As required for the stretch overwrapping, the single-layer film produced from the ethylene copolymer composition (A), (A'), (A") or (A''') exhibits surprisingly excellent oxygen permeability.

Oxygen permeation is particularly useful in the stretch wrapping of individual cuts of red meat (that is, in-store wraped meat where the grocer/butcher actually cuts the primary meat into smaller cuts for individual sale), where the oxygen permeation allows fresh red meat to "bloom" to the desired bright red color. The film effective in packaging individual cuts of red meat will usually exhibits minimal shrinkage and good stretchability. This film preferably exhibits oxygen permeability and has good elastic recovery, to enable the consumers to examine the meat without permanently deforming the film and making it non-attractive. Co-pending U.S. patent application filed in Apr. 28, 1993 by Pak-Wing Steve Chum and Nicole F. Whiteman under the title of "Method of Packaging Food Products" discloses methods of packaging food products including such individual portions of red meat. However, even if shrink properties are not utilized for the present art, the films used in packaging individual portions of red meat can be produced as a heat shrinkable film.

The single-layer film structure suitably used for the stretch overwrapping is particularly preferably made of a blend of the ethylene copolymer composition (A), (A'), (A") or (A''') and any of an ethylene/α,β-unsaturated carbonyl copolymer (e.g., EVA, EAA), an ethylene/methacrylic acid (EMAA) copolymer, alkali metal salts thereof (ionomers), esters thereof and other derivatives thereof.

For the coextruded or lamianted multi-layer film structure (e.g., three-layer and five-layer film structures), the ethylene copolymer composition (A), (A'), (A") or (A''') can be used for a core layer, an outer surface layer, an intermediate layer and/or an inner sealant layer of the structure. Especially, for the hot tack film of the invention, at least one ethylene copolymer composition (A), (A'), (A") or (A''') is used as at least one heat-sealable outer layer of the film structure. The heat-sealable outer layer may be coextruded with other layer(s) or may be laminated onto another layer(s) in the secondary operation. The coextrusion method or the laminating method can be carried out as described in "Packaging Foods With Plastics" written by Wilmer A. Jenkins and James P. Harrington (1991), or "Coextrusion For Barrier Packaging" (written by W. J. Schrenk and C. R. Finch) of "Society of Plastics Engineers RETEC Proceedings", Jun. 5–17, (1981), pp. 211–229.

For the multi-layer film structure, generally, the ethylene copolymer composition (A), (A'), (A") or (A''') comprises at least 10% of the total multi-layer film structure. Other layers of the multi-layer structure include barrier layers and/or tie layers, and/or structural layers, without limiting thereto. Various materials for these layers are employable for these layers, with some of those materials being used as two or more layers in the same film structure. Some examples of the materials include foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acd (EAA) copolymers, ethylene/methacrylic acid (EMAA) copolymers, ULDPE, LLDPE, HDPE, MDPE, LMDPE, LDPE, ionomers, graft modified polymers (e.g., maleic anhydride-grafted polyethylene) and paper. The multi-layer film structure generally comprises 2 to 7 layers.

In one embodiment disclosed herein, a multi-layer film structure comprises at least 3 layers (e.g., an A/B/A structure), wherein each outer layer comprises at least one ethylene copolymer composition (A), (A'), (A") or (A'''), and at least one core layer or hidden layer comprises high-pressure low-density polyethylene (LDPE). The multi-layer film structure exhibits surprisingly excellent optical properties with maintaining excellent overal film strength properties. Generally, the ratio of film structure layers is such that the core layer dominates the film structure in terms of its percentage of the entire structure. The core layer must be at least 33% of the whole structure. For example, in a three-layer film structure, each outer layer (A) comprises at least 33% by weight of the whole film structure, while the core LDPE layer (layer (B)) comprises 33% by weight of the whole film structure. In the three-layer film structure, the core LDPE layer preferably comprises at least 70% of the whole film structure. Additional hidden layer may be included into the film structure, as far as the optical properties are not deteriorated. For example, a tie layer or an intermediate layer made of an ethylene/vinyl acetate copolymer, an ethylene/acrylic acid copolymer or anhydride-graft modified polyethylene is employable, or a barrier layer made of a vinylidene chloride/vinyl chloride copolymer or an ethylene/vinyl alcohol copolymer is employable. In a more preferred three-layer film structure, each outer layer (A) comprises at least one ethylene copolymer composition (A), (A'), (A") or (A''') in an amount of 15% by weight of the whole film structure, and the core layer (B) comprises LDPE in an amount of 70% by weight of the whole film structure. The multi-layer film structure can be orientated and/or irradiated (in any order) to provide a multi-layer shrink film structure or a multi-layer skin package with controlled linear tearability. The LDPE suitable for the multi-layer film structure disclosed herein having improved optical transparency usually has a density of 0.915 g/cm$^3$ to 0.935 g/cm$^3$, a melt index of 0.1 g/10 min to 10 g/10 min and a melt tension of at least 1 g. For improving optical transparency, the ethylene copolymer composition (A), (A'), (A") or (A''') has a density of usually 0.85 g/cm$^3$ to 0.96 g/cm$^3$, preferably 0.9 g/cm$^3$ to 0.92 g/cm$^3$, and a melt index (I2) of usually 0.2 g/10 min to 10 g/10 min, preferably 0.5 g/10 min to 2 g/10 min.

The multi-layer film structure can also be oxygen permeable either by using the ethylene copolymer composition (A), (A'), (A") or (A''') (referred to as "A" in the below-described film structures) singly or in combination with other oxygen permeable film layers such as layers of ethylene/vinyl acetate (EVA) and/or ethylene/acrylic acid (EAA). Particularly interesting film structures include film structures of (A)/EAA/(A), (A)/VLDPE/(A) and LLDPE/(A)/LLDPE. These film structures are replacements for conventional films such as PVC film, and are suitable for stretch overwrapping various fresh foods (e.g., retail-cut red meat, fish, poultry, vegetables, fruits and cheese, and other foods destined for retail display and which benefit from access to environmental oxygen or need appropriate respiration. These films are preferably produced as non-shrink films (e.g., without biaxial orientation induced from double bubble method) with excellent oxygen permeability, stretchability, elastic recovery and heat-sealing properties, whereby a wholesaler or a retailer can use the film in any ordinary form, e.g., stock rolls, and can use the film on conventional packaging device.

In another aspect, these multi-layer film structures may comprise an oxygen barrier film (e.g., SARAN (trade name) that is a film produced from a polyvinylidene chloride polymer, available from Dow Chemical Company), EVAL resins (trade name) that is an ethylene/vinyl alcohol copolymer available from Eval Company of America (a division of Kuraray of America, Inc., a whole owned subsidiary of Kuraray Ltd.)). The oxygen barrier properties are important in films applications such as packaging the primal cuts of meat (that is, large cuts of meat which are transported to special stores for further cutting for the specific consumer consumption). As described by Davis et al. in U.S. Pat. No. 4,886,690, the oxygen barrier layer also can be designed as "peelable" to allow removal once the packaged primal cut arrives at the butche/grocer. The peelable structure or design is particularly useful for "case-ready" vacuum skin packages of individual portions, eliminate the need for repackaging to oxygen permeable package for blooming to bright red.

The film structure produced from the ethylene copolymer composition (A), (A'), (A'') or (A''') may also be preformed by any known method, e.g., extrustion thermoforming according to the shape and contours of the article to be packaged. The advantage of using the pre-formed film structure will be to complement or avoide given packaging operations such as increase of stretchability, decrease of film thickness for given stretch requirements and reduced heat-up and cycle time.

The thickness of the single-layer or multi-layer film structure may vary. The thickness of the single-layer and multi-layer film structures is, however, in the range of typically 0.1 mil (2.5 $\mu$m) to 50 mil (1,270 $\mu$m), preferably 0.4 mil (10 $\mu$m) to 15 mil (381 $\mu$m), particularly 0.6 mil (15 $\mu$m) to 4 mil (102 $\mu$m).

The film structure produced from the ethylene copolymer composition (A), (A'), (A'') or (A''') described herein surprisingly shows more efficient irradiation crosslinking as compared to a comparative conventional Ziegler polymerized linear ethylene/$\alpha$-olefin polymers. As one aspect of the invention, by making use of this merit of the irradiation crosslinking efficiency of these unique polymers, a film structure having a distinctively or selectively crosslinked film layer can be produced. For the purpose of making use of further merit of this discovery, specific film layer materials containing the ethylene copolymer composition (A), (A'), (A'') or (A''') can be prepared together with pro-rad agents, e.g., triallyl cyanurate as described by Warren in U.S. Pat. No. 4,957,790 and/or with crosslinking inhibitors (antioxidants), e.g., butylated hydroxytoluene as described by Evert in U.S. Pat. No. 5,055,328.

Irradiation crosslinking is useful also for increasing the shrinking temperature range and the heat sealing range for the film structure. For example, U.S. Pat. No. 5,089,321 discloses a multi-layer film structure comprising at least one heat-sealable outer layer and at least one core layer which have good irradiation crosslinking properties. Of the irradiation crosslinking technologies, beta irradiation by electron beam sources and gamma irradiation by a radioactive element such as cobalt 60 are the most common method of crosslinking film materials.

The irradiation crosslinking is carried out as follows. A thermoplastic film is produced by a blown film method, and then exposed to an irradiation source (beta or gamma) at an irradiation dose of up to 20 Mrad to crosslink the film materials. Whenever an oriented film is desired, such as for shrink and skin packaging, the irradiation crosslinking can be induced before or after final film orientation, however, preferably irradiation crosslinking is induced before the final orientation. When a heat-shrinkable film or a skin packaging film is produced by irradiation of pellets or film before the final film orientation, the resulting film constantly exhibits higher shrinkage tension and will tend to give higher package warpage and board curl. To the contrary, when the orientation is carried out before the irradiation, the resulting film will exhibit low shrinkage tension. Differently from the shrinkage tension, the free shrinkage properties of the ethylene copolymer composition (A), (A'), (A'') or (A''') of the invention are not substantially influenced by whether irradiation is conducted before or after the final film orientation.

The irradiation techniques advantageously used for the film structure described herein include techniques known to those skilled in the art. It is preferable to effect the irradiation using an electron beam (beta) irradiation device at a dosage level of 0.5 Mrad to 20 Mrad. The shrink film structure produced from the ethylene copolymer composition (A), (A'), (A'') or (A''') described herein is also expected to exhibit improved physical properties due to a low degree of chain scission ocurring as a consequence of the irradiation treatment.

The hot tack film of the invention as oriented or unoriented single-layer or multi-layer structure shows usefulness in a bag-in-box and form-fill-seal operations. Examples of uses of the film of the invention in form-fill-seal operations are described in Wilmer A. J. Jenkins and James P. Harrington "Packaging Foods With Plastics", pp. 32–83 (1991). Packages can be manufactured also by vertical or horizontal foam-fill-seal packaging or thermoform-fill-seal packaging, as described in C. G. Davis of Packaging Machinery Manufacturers Institute "Packaging Machinery Operations; No. 8, Form-Fill-Sealing, A Self-Instructional Course" (1982, April); M. Bakker (editor) "The Wiley Encyclopedia of Packaging Technology", John Wiley & Sons (1986) (p. 334, pp. 364–369); and S. Sacharow and A. L. Brody "Packaging: An Introduction", Harcourt Brace Javanovich Publications. Inc. (1987) (pp. 332–326). A vertical form-fill-seal machine of Hayssen Ultima Super CMB. is a particularly useful machine for the form-fill-seal operation. By the use of this machine, packaging of typical articles such as foods, drugs and hardware is carried out. Other manufacturers of pouch thermoforming and evacuating device include Cryovac and Koch.

Heavy-duty Packaging Film

The heavy-duty packaging film comprises the ethylene copolymer composition (A), (A'), (A'') or (A'''). The heavy-duty packaging film has a film thickness of at least about 1.25 mil (31$\mu$) and a film density of 0.923 to 0.95 g/cm$^3$ (g/cc), and shows a tear strength and an impact strength higher by at least 30% than those of polyethylene films typically used in the industries at present. This film is employable for heavy-duty packaging, transportation and hot-fill packaging.

The term "medium modulus" used herein referring to the novel film means a calculated film density of 0.923 to 0.95 g/cc. The term "calculated film density" used herein means a film density calculated from the known weights of the polymers (components) or the layers and the density measured after annealing.

The term "thick" used herein referring to the novel film means a film thickness of not less than about 1.25 mil (31$\mu$).

The term "variable-stalk blown extrusion" used herein means that the height of the annular die for films and the stalk, i.e., distance between the expanded points of a bubble, can vary over the range of 0 inch (0 cm) to 144 inches (366 cm) during blown film production. This term includes both of the well known pocket blown film and stalk blown film extrusions. The term "high stalk extrusion" used herein in a general sense means that the distance between annular die for films and air ring is 30 inches (76 cm) or more.

The term "hot-fill" used herein means an operation of packaging or filling articles at an article temperature of not lower than 45° C. The term "heavy-duty" used herein means packaging of an industrial item usually having mass- or single-packaged weight of not less than 10 lb (4.5 kg).

The tear resistance of the film of the present invention is measured in accordance with ASTM D1922 and reported in gram. The measurement of the tear resistance is carried out in both of the machine direction (MD) and the cross direction (CD). In the present specification, the term "tear strength" is used to indicate an average of the MD tear resistance and the CD tear resistance, and the tear strength is also reported in gram. The impact resistance of the film of the invention is measured in accordance with ASTM D1709. Where the property values are increased with increase of the thickness, the results of tear and impact are increased or decreased in proportional to the film thickness ($\mu$m) practically measured, whereby the film thickness is accurately normalized to 3 mil. However, the normalization calculation is performed and reported only when the variation of the thickness is not more than 10%, that is, the measured thickness is in the range of 2.7 to 3.3 mil.

The medium-modulus film of the invention has a calculated film density of 0.923 g/cc to 0.95 g/cc, particularly 0.926 g/cc to 0.948 g/cc, more particularly 0.93 g/cc to 0.945 g/cc.

The film thickness is usually not less than about 1.25 mil, particularly in the range of 1.5 mil to 8.75 mil, more particularly in the range of 2 mil to 8 mil.

The tear strength or the impact strength of the novel film is higher by at least 30% than those exhibited by a comparable conventional polyethylene film having almost the same film density, melt index and film thickness.

The novel film can be conveniently formed into bags and is useful for heavy-duty packaging, transportation and hot-fill packaging. In such uses, there are desired films of excellent property balance, i.e., films having excellent tear strength, impact strength and dimensional stability, having high strength and exhibiting modulus of medium level.

This novel film can be produced by the variable-stalk blown extrusion. Production of films by blown film extrusion is well known. For example, U.S. Pat. No. 4,632,801 of Dowd in which a typical blown film extrusion process is described is referred to. In this typical process, a polymer is introduced into a screw extruder, melted therein and put forward in the extruder under pressure. The molten polymer is extruded through an annular die for films to form a molten tube. Then, air is fed into the annular die to blow the tube and thereby produce a "bubble" having a desired diameter. The air is kept inside the bubble by means of the annular die and nip rollers positioned on the downstream side of the die, and then the bubble is pressed to produce a lay-flat film. The final thickness of the film is adjusted by the extrusion rate, bubble diameter and nip rate, which are adjustable by variables such as screw rate, haul-off rate and take-up speed. If the extrusion rate is increased with constantly keeping the bubble diameter and the nip rate, the final film thickness becomes larger.

The typical blown extrusion can be generally classified as "stalk" extrusion or "pocket" extrusion. For the stalk extrusion, blowing and expansion of a bubble take place at the considerably higher position above the annular die, and the adjustment thereof is made. An air stream is fed outside the tube in parallel with the machine direction by an air ring (usually having a single-lip structure) until the molten tube is blown at the height of at least 5 inches (12.7 cm) above the annular die, so that the tube diameter is maintained almost the same as that of the film annular die. For the purpose of ensuring the optimum stability of the bubble during film production, the bubble interior can be cooled; likewise, a bubble stabilization means can be used inside the bubble.

It is known that, if the stalk extrusion is used, molecular relaxation is improved and a tendency to excess orientation in one direction is reduced, whereby well-balanced film properties can be obtained. With increase of the height of the stalk, i.e., height of the expanded part, the properties in the cross direction (CD) are generally improved, and thereby the average film properties are improved. When a blown film is produced from a high-molecular weight polyethylene composition, e.g., high-molecular weight high-density polyethylene (HMW-HDPE) or high-molecular weight low-density polyethylene (HMW-LDPE) (they have melt strength enough for ensuring sufficiently bubble stability), the stalk extrusion, particularly high stalk extrusion, is very useful.

In case of the pocket extrusion, air is fed by means of an air ring positioned right adjacent to the annular die so that the bubble extruded from the die is immediately blown and expanded. The air ring is typically a double-lip type to ensure the bubble stability after feeding of air. The pocket extrusion is more widely used than the stalk extrusion, and generally is suitable for polyethylene compositions having lower molecular weight and lower melt strength, e.g., linear low-density polyethylene (LLDPE) and ultra low-density polyethylene (ULDPE).

The stalk and pocket extrusions can produce both of single-layer films and multi-layer films, and the film of invention may be a single-layer structure or a multi-layer structure. The multi-layer film can be produced by any of known techniques in the art, and coextrusion, laminating and a combination thereof are included in such techniques. The preferred thick medium-modulus polyethylene film of the invention is a single-layer film structure.

To the ethylene copolymer composition (A), (A'), (A") or (A''') for use in the production of the film of the invention, additives, such as antioxidant, phosphites, cling agents, Standostab PEPQ (trade name, available from Sandoz), pigment, colorant and filler, can be added in amounts not detrimental to the improved tear resistance and impact resistance. Further, additives to enhance anti-blocking properties and friction coefficient characteristics, such as release agents, silicone coating agents, etc. can be incorporated into the film of the invention, though they are generally unnecessary. Examples of the additives include untreated or treated silicon dioxide, talc, calcium carbonate, clay, and primary, secondary and substituted fatty amides, without limiting thereto. In order to enhance the film antistatic properties and allow heavy-duty packaging of electrically sensitive articles, additives such as quaternary ammonium compounds singly or in combination with ethylene/acrylic (EAA) copolymers or other functional polymers can be added.

The novel film has advantageously improved film strength, and therefore, in addition to the recycling materials and scrap materials, polymers for dilution can be mixed with or added to the film composition used for producing the novel film, in amounts larger than the amounts typically possible when the conventional polyethylene film compositions are used. The novel film can have or retain quality characteristics desired when the film is successfully used for heavy-duty packaging or transportation. Examples of the suitable materials for dilution include elastomers, rubbers, anhydride-modified polyethylenes (e.g., polybutylene, LLDPE and HDPE grafted with maleic anhydride), high-pressure polyethylenes such as low-density polyethylene (LDPE), ethylene/acrylic acid (EAA) copolymers, ethylene/vinyl acetate (EVA) copolymers, ethylene/methacrylate (EMA) copolymers, and combinations thereof.

Stretch Adhesive Film

The multi-layer film of the invention comprises at least two layers, one surface of which is substantially adherent, and is suitable for use as a stretch wrapping material. This novel multi-layer film comprises a back surface layer made of at least one ethylene copolymer composition (A), (A'), (A") or (A''') and having a density of at least about 0.90 g/cc or a density of about 0.90 g/cc, a front surface layer made of at least one film-forming olefin polymer composition and having a density of about 0.90 g/cc, and optionally at least one core or structural layer made of at least one high-strength ethylene polymer composition.

The front surface layer exhibits adhesion properties conspicuously lower than that of the back surface layer. The core or the structural layer may vary to meet the specific film strength requirements.

In the present invention, the film having adhesion properties on its one surface is particularly useful in stretch wrapping, stretch bundling and tension winding to wrap or hold a small article or a big article. The one-surface-adhesive film of the invention is provided without necessity of additives for adhesion or functional polymers.

As advantages of the present invention, there can be mentioned decrease or cease of heaping or accumulation of resin at the die lip and migration of low-molecular substances. Therefore, cleaning and retention time in the film production and wrapping processes can be reduced. Further, problems relating to adhesion of the film to the adjoining articles or packages, contamination and retention of dust or fragments on the film surface can be decreased.

In another aspect of the invention, there is provided a single-sided adhesive film made of polymers having similar rheological characteristics and monomer chemical characteristics, to thereby easily attain improved melt viscosities similar to each other in coextruding and excellent polymer compatibility with each other for recycling.

In a further aspect of the invention, there is provided a single-sided adhesive film having conspicuous stretch adhesion and non-stretch adhesion without decreasing its high adhesion property under the stretched condition.

It has been found that the adhesion degree closely relates to densities of the polymers or blends for forming the back surface and front surface layers of the film and that the adhesion is improved as the polymer density of the back surface layer is decreased. When the density of the back surface layer is not more than 0.90 g/cc, preferably in the range of 0.85 g/cc to 0.89 g/cc, most preferably in the range of 0.86 g/cc to 0.88 g/cc, the back surface layer shows substantial adhesion to the front surface layer. The density of the front surface layer of the invention is not less than 0.90 g/cc, preferably in the range of 0.91 g/cc to 0.96 g/cc, more preferably in the range of 0.93 g/cc to 0.95 g/cc. The front surface layer having a more preferable density range of 0.93 g/cc to 0.95 g/cc provides a single-sided adhesive film having stretch adhesion and non-stretch adhesion which are equal to each other.

The density of core layer or the structural layer in the multi-layer film of the invention may vary so as to meet the specific film strength requirements of the final use application.

Examples of the ethylene polymers for forming the back surface layer and having a density of 0.90 g/cc or a density of less than 0.90 g/cc include very low-density polyethylene (VLDPE), the composition (A), (A'), (A") or (A'''), and blends combinations thereof. The back surface layer is preferably made of the composition (A), (A'), (A") or (A''').

Examples of the film-forming olefin polymer compositions for forming the front surface layer of the invention and having a density of more than 0.90 g/cc include polymers of propylene and polymers of ethylene (e.g., polypropylene, an ethylene/propylene copolymer, low-density polyethylene (LDPE), medium-density polyethylene (MDPE), high-density polyethylene (HDPE)), the composition (A), (A'), (A") or (A'''), uniformly or ununiformly branched linear low-density polyethylene (LLDPE), uniformly or ununiformly branched very low-density polyethylene (VLDPE), and blend combinations thereof. The front surface layer is preferably made of polypropylene, e.g., MDPE and HDPE or MDPE alone in combination with polypropylene, because stretch adhesion and non-stretch adhesion equal to each other can be imparted.

Examples of the ethylene polymers for forming the core or the structural layer of the invention include low-density polyethylene (LDPE), medium-density polyethylene (MDPE), high-density polyethylene (HDPE), the composition (A), (A'), (A") or (A'''), uniformly or ununiformly branched linear low-density polyethylene (LLDPE), and uniformly or ununiformly branched very low-density polyethylene (VLDPE).

The ununiformly branched VLDPE and LLDPE are known by the skilled in the linear polyethylene art. They are prepared by Ziegler-Natta solution polymerization, slurry polymerization or gas phase polymerization using such a coordination metal catalyst as described in U.S. Pat. No. 4,076,698 of Anderson et al. These Ziegler type linear polyethylenes are not uniformly branched and have low melt tension. These polymers have low density and are not substantially amorphous because they inherently have substantial high-density (crystal) polymer portions. It is very difficult to prepare and pelletize these polymers using a common Ziegler-Natta catalyst to have a density of less than 0.90 g/cc, because the pellets have adhesion properties and easily coalesce together.

Also, the uniformly branched VLDPE and LLDPE are known by the skilled in the linear polyethylene art. For example, the disclosure of U.S. Pat. No. 3,645,992 of Elunston is referred to. They are prepared by solution polymerization, slurry polymerization or gas phase polymerization using any of zirconium and vanadium catalysts. The process for preparing a secondary class linear polyethylene by the use of metallocene catalysts is stated by Eiwen et al. in U.S. Pat. No. 4,937,299. This secondary class linear polyethylene is a uniformly branched polymer, but has low melt tension similarly to the Ziegler type ununiformly branched linear polyethylene. Such polymers are on the market under the trade name of "TAFMAR" by Mitsui Chemicals, Inc. and under the trade name of "EXACT" by Exon Chemicals.

The ethylene polymer composition for the back surface layer, the film-forming olefin polymer composition for the front surface layer and the high-strength ethylene polymer composition for the core or structural layer comprise ethylene polymers prepared by homopolymerization of ethylene or copolymerization of ethylene and small amounts of various monomers.

Additives, such as tackifier, cling agent (e.g., PIB), slip agent, anti-blocking agent, antioxidant (e.g., hindered phenols such as Irganox 1010 or Irganox 1076 available from Ciba Geigy Corp.), phosphites (e.g., Irgafos 168 available from Ciba Geigy Corp.), Standostab PEPQ (available from Sandoz), pigment, colorant, filler and processing aid, can be incorporated into the stretch wrapping materials disclosed herein, though they are not necessary for attaining the desired results of the present invention. The additives should be added in a manner or amounts not detrimental to the substantial adhesion and non-adhesion properties found by the invention.

The multi-layer film of the invention can be produced from two or more film layers including A/B and A/B/C structures by means of film laminating and/or coextrusion technique and blown or cast film extrusion devices known in the art. The preferred structure is a structure of A/B/C produced by coextrusion technique, more preferably cast coextrusion technique.

A preferred blown film method is described in, for example, "The Encyclopedia of Chemical Technology", Kirt-Othmer, Third edition (John Wiley & Sons, New York) 1981, Vol. 16, pp. 416–417 and Vol. 18, pp. 191–192. A preferred cast film extrusion method is described in, for example, "Modern Plastics", mid-October 1989, Encyclopedia Issue, Vol. 66, No. 11, pp. 256–257. Preferred coextrusion technique and requirements are described in Tom I. Buttler "Film Extrusion Manual: Process, Materials, Properties, Coextrusion" Ch. 4, pp. 31–80, TAPPI Press (Atlanta, Ga., 1992).

The melt index of each polymer layer of the multi-layer film of the invention is in the range of 0.4 to 20 g/10 min, preferably 0.5 to 12 g/10 min, more preferably 0.8 to 6 g/10 min.

The total film thickness of the multi-layer film of the invention is in the range of 0.4 to 20 mil ($10\mu$ to $508\mu$), preferably 0.6 to 10 mil ($15\mu$ to $254\mu$), more preferably 0.8 to 5 mil ($20\mu$ to $127\mu$).

The layer ratio of the A/B multi-layer film of the invention is larger than 2:98 (A layer: B layer), and is preferably in the range of 5:95 to 35:65, more preferably 10:90 to 25:75. The layer ratio of the multi-layer film having two or more layers is such a ratio that the thickness of the back surface layer and the thickness of the front surface layer of the film are the same as each other and the proportion of the core or the structural layer is in the range of 60 to 98% by weight, preferably 65 to 95% by weight, more preferably 70 to 90% by weight.

Multi-layer Barrier Film

The multi-layer barrier film is an oxygen-impermeable, water-impermeable multi-layer barrier film, and examples of its uses include ostomy bags, laminated articles to percutaneously supply drugs and articles produced from the multi-layer barrier film, such as heat-sealable bags.

According to one embodiment of the invention, there is provided an oxygen-impermeable, water-impermeable multi-layer barrier film having a heat-sealing strength of at least 1.0 lb, preferably more than 1.5 lb, based on 1 inch of the film width. The term "oxygen impermeability" used herein means that the film has an oxygen permeability of not more than 90 $cc/m^2$/H.atom. The term "water impermeability" used herein means that the film has a water vapor permeability of not more than 5 $gm/m^2$/H.

In one embodiment, the film comprises a barrier layer having thereon at least one heat-sealable skin layer. The barrier layer comprises an arbitrary proper barrier layer material which is compatible with the heat-sealable skin layer (single layer or plural layers) and provides desired oxygen and water impermeability. A preferred barrier material is a copolymer of vinylidene chloride and vinyl chloride or a copolymer of vinylidene chloride and methyl methacrylate. When the barrier layer contains a copolymer of vinylidene chloride and vinyl chloride or a copolymer of vinylidene chloride and methyl methacrylate, the barrier layer may optionally contain a copolymer of ethylene and vinyl acetate as a processing aid in an amount of 0 to 6% weight, more preferably 4 to 6%.

In one embodiment of the invention, the barrier layer is coextruded with at least one heat-sealable skin layer. To provide the desired flexibility, the heat-sealable skin layer has a 2% secant modulus of less than 15,000 psi in both of the machine direction (MD) and the transverse direction (TD). The heat-sealable skin layer comprises the ethylene copolymer composition (A), (A'), (A") or (A'''). To assist processing of the film, the skin layer (single layer or plural layers) may contain a copolymer of ethylene and vinyl acetate as a processing aid in an amount of 0 to 10% by weight, more preferably 0.5 to 5% by weight. Further, the skin layer may optionally contain a slip agent and/or an anti-blocking agent. It is desirable that an adhesive tie layer made of a copolymer of ethylene and vinyl acetate is coextruded between the skin layer and the barrier layer to improve adhesion therebetween.

In a preferred embodiment of the invention, the barrier layer is coextruded between two heat-sealable skin layers. In this case, the proportion of the skin layer is 70% by volume (thickness) of the film, and the proportion of the barrier layer is 30% by volume (thickness) of the film. By the use of this structure, reusable ostomy bags or pouches can be manufactured. It is also possible that the barrier layer and the skin layer (single layer or plural layers) are separately made and then they are laminated together using a suitable adhesive polymer, liquid adhesive or hot-melt adhesive. The multi-layer barrier film of the invention has a noise of less than 85 dB when it is bent at an angle of 65° and 0.45 Hz, preferably a noise of less than 83 dB when it is bent at an angle of 65° and 0.45 Hz, and most preferably exhibits a noise of less than 81 dB when it is bent at an angle of 65° and 0.45 Hz.

In another embodiment of the invention, additional layers are added to the barrier layer to form a system to percutaneously supply drugs. This system preferably comprises a backing layer of the barrier film, which functions as a gateway to the drug system. The adhesive containing an active drug is preferably attached to one surface of the film. The adhesive is adjacent to a release control membrane suited for the contact with the patient's skin and for the release of the drug under control.

In another form of this embodiment, the backing layer can be provided with a reservoir containing an active drug and having a release control membrane for controlling diffusion of the drug into the patient's skin and for hiding the opening of the reservoir. The percutaneously supply system can adhere to the patient's skin with the peripheral or whole adhesive. It is preferable that the adhesive and the membrane are covered with a releasable liner to protect the structure prior to use.

Accordingly, the feature of the present invention is to provide an oxygen-impermeable, water-impermeable multi-layer barrier film capable of being produced by the use of the coextrusion method or the laminating method. Further features of the present invention are odor barrier properties, flexibility and low noise. Still further feature of the present invention is to provide a heat-sealable surface for use in the production of bags and pouches.

In one embodiment of the invention, the multi-layer barrier film can be produced by the use of standard extrusion technique such as feedblock coextrusion, multi-manifold die coextrusion or a combination of these two methods. The volume (thickness) of each independent layer can be controlled during the extrusion. Therefore, the total thickness of the multi-layer structure can be controlled. In another method, the independent layers can be separately formed, and they can be laminated together with an appropriate adhesive tie layer.

The film is not extended or stretched intentionally, except for the natural consequence brought about in film production, to protect the low noise of the film. For example, the film produced by a blown process essentially has some orientation in both of the machine direction (MD) and the transverse direction (TD), but the cast film is still non-stretched in the transverse direction. As the orientation introduced into the film is smaller, the noise generally becomes much smaller. The multi-layer barrier film of the invention has a noise of less than 85 dB when it is bent at an angle of 65° and 0.45 Hz, preferably a noise of less than 83 dB when it is bent at an angle of 65° and 0.45 Hz, and most preferably exhibits a noise of less than 81 dB when it is bent at an angle of 65° and 0.45 Hz.

To provide the desired flexibility, the heat-sealable skin layer has a 2% secant modulus of less than 15,000 psi in both of the machine direction (MD) and the transverse direction (TD). The 2% scant modulus is an indication of rigidity or flexibility of a film. We have found that, as the value of the 2% secant modulus of the heat-sealable skin layer is lower, the resulting film become more flexible. It is generally desirable that the 2% secant modulus of the film is as low as possible and the film is still processable by a conventional device. The whole multi-layer film preferably has a 2% secant modulus of not more than 30,000 psi. The resulting multi-layer film has low oxygen permeability and low steam permeability and also has odor barrier properties, flexibility and low noise which are required for the ostomy.

The oxygen- and water-impermeable multi-layer barrier film comprises a barrier layer which can be formed from a copolymer of vinyl chloride (15 to 20% by weight) and vinylidene chloride (80 to 85% by weight) or a copolymer of vinylidene chloride (93 to 94% by weight) and methyl methacrylate (6 to 7% by weight). Examples of suitable barrier materials include SARAN (registered trademark) 469 and SARAN MA commercially available from Dow Chemical Company. When the SARAN barrier layer material is used, the barrier layer can contain a copolymer of ethylene and vinyl acetate as a processing aid in an amount of 0 to 6% by weight, more preferably 4 to 6% by weight. An example of a suitable ethylene/vinyl acetate copolymer composition is a copolymer commercially available from E.I duPont de Nemours & Co., Inc. under the trade name of Elvax (Elvax: registered trademark).

It is preferable that the barrier layer is coextruded together with two heat-sealable skin layers comprising the ethylene copolymer composition (A), (A'), (A") or (A'''), or it is laminated between these two layers.

The barrier film can be used for producing a reusable ostomy bag or a pouch by folding the film and heat sealing the skin layers comprising the ethylene copolymer composition (A), (A'), (A") or (A'''). The bag has an oxygen permeability of less than 90 cc/m²/H.atom (1.8 cc/100in²/H.atom). The total thickness of the barrier-film is 35 to 100 μm. The barrier layer constitutes 10 to 30% of the total thickness of the film. The skin layer (and if necessary an adhesive layer) constitutes typically 70 to 90% of the total thickness of the film.

The multi-layer barrier film of the invention may be produced by lamination technique using an appropriate adhesive. For example, it is possible that the barrier layer and the skin layer (single layer or plural layers) are separately formed and then they are laminated together using an adhesive polymer, a liquid adhesive or a hot-melt adhesive. Examples of suitable adhesive polymers for tying the barrier layer to the skin layer include ethylenically unsaturated copolymers prepared using vinyl acetate, ethyl acrylate, ethyl methacrylate, methylacrylic acid, acrylic acid and carbon monoxide, without limiting thereto. Also employable are ionomers of ethylene and methylacrylic acid or acrylic acid and copolymers grafted with anhydrides. Examples of suitable liquid adhesives or hot-melt adhesives include those based on urethanes, copolyesters and amide/acrylate copolymers.

A five-layer oxygen- and water-impermeable barrier film comprises a barrier layer made of the suitable barrier material previously discussed. The barrier layer is preferably coextruded with two outer heat-sealable skin layers, with sandwiching an adhesive layer between the barrier layer and each of the two outer heat-sealable skin layers. The heat-sealable skin layers in the five-layer embodiment may contain substantially linear copolymers of ethylene and α-olefins described in PCT Application No. PCT/US92/08812 or uniformly branched linear polyolefin resins such as EXACT resin and TAFMER resin. An example of a suitable adhesive is a copolymer of ethylene and vinyl acetate, which enhances interadhesion between the barrier layer and the skin layer.

In the most simple form of another embodiment of the invention which include the barrier layer and additional layers to make a system for percutaneously supplying drugs, the barrier layer and the skin layer of the film function as backing film which is a barrier to the drug system. The barrier film further comprises an adhesive layer which contains active drug incorporated into the matrix and adheres to one surface of the film. The adhesive selected should be compatible with the active drug and permeable to the active drug. A great number of active drugs such as estrogen, nitroglycerin, nicotine and scopolamine can be administrated into the patient in this manner. Theoretically, almost all drugs can be administrated in this manner.

A release control membrane suited for the contact with the skin of the patient and for the release of the drug under control is present on the adhesive layer. An additional adhesive layer applicable to the periphery or the whole surface of the membrane may be allowed to be present to fix the percutaneous supply system onto the skin of the patient. The adhesive for use in this embodiment of the invention should be a medical adhesive such as a silicone adhesive, an acrylic acid adhesive or a vinyl acetate adhesive. In this embodiment, the system is generally sealed in a package or fixed to the second barrier film, and the package or the second barrier film is removed when the system is used.

Another form of the percutaneous drug supply system according to the invention is described below. The barrier layer and the skin layer constituting a barrier film are molded into a reservoir for containing an active drug. The opening of the reservoir is hidden with a release control membrane. The adhesive applicable to the periphery or the whole surface of the membrane functions to fix the system to the patient's skin. The adhesive selected should be compatible with the active drug and permeable to the active drug. It is preferable to provide a releasable liner or the like for hiding and protecting the adhesive and the membrane prior to use.

The typical, reusable ostomy bag with an opening formed from the multi-layer barrier film can be produced by folding edges of the multi-layer film and heat-sealing the edges. It is preferable that the film is folded and sealed so that one heat-sealable skin layer forms the inner surface of the resulting bag or pouch. The barrier film of the invention provides flexibility, calmness, waterproofness, odor barrier properties and oxygen barrier properties which are desired for the ostomy use. As is evaluated by the skilled in the art, the barrier film of the invention can be also applied to other packaging uses where barrier properties to water and oxygen are required.

Laminated Film Sealant

The laminated film sealant can be produced by air-cooling inflation using the ethylene copolymer composition (A), (A'), (A") or (A''').

The laminated film sealant of the invention has a dart impact strength of not less than 100 kg/cm, preferably not less than 150 kg/cm. This film has a complete sealing temperature of not higher than 130° C., preferably 110 to 130° C.

The laminated film sealant of the invention has a blocking strength of usually not more than 1.5 kg/cm and a Young's modulus in tension of usually not less than 3,500 kg/cm$^2$.

The thickness of the laminated film sealant of the invention is in the range of 10 to 150 $\mu$m, preferably 10 to 60 $\mu$m.

The laminated film is obtained by laminating the above-mentioned laminated film sealant of the invention onto a substrate.

As the substrate, a thin film made of any material capable of forming a film is employable. Examples of such thin films include polymer films, sheets, fabrics, paper, metal foils and cellophane.

The laminated film sealant is excellent in low-temperature heat-sealing properties, hot tack properties, impact resistance, anti-blocking properties and openability.

Heavy-duty Packaging Film

The heavy-duty packaging film has a Young's modulus, as measured in accordance with JIS K 6781, of not less than 4,000 kg/cm$^2$, a dart impact strength, as measured in accordance with the A method of ASTM D 1709, of not less than 55 kg/cm, and a film thickness of usually 30 to 200 $\mu$m.

The heavy-duty packaging film can be produced by subjecting the ethylene copolymer composition (A), (A'), (A") or (A''') to an inflation method or a T-die method. The heavy-duty packaging film is laminated to a film of polyester or polyamide to make a multi-layer film.

The heavy-duty packaging film has excellent mechanical strength, transparency and surface smoothness, so that the film is suitable for packaging of foods, office supplies, furniture, toys, electrical parts and mechanical parts. Moreover, this film can be used for heavy-duty packaging bags in cold districts.

Grain Bag

The grain bag of the invention is made of films of the ethylene copolymer composition (A), (A'), (A") or (A'''), and three sides of two films superposed upon each other are sealed. The grain bag may be produced in any manner, as far as an opening is formed at one end, and a bottom is formed at the other end. For example, the grain bag may be a bag obtained by folding one film in two and sealing the both sides, or may be a bag obtained by sealing one end of a tubular film produced by inflation or the like and keeping the other end open.

For sealing the films on one side, it is preferable to fuse the films together, but any method is applicable as far as the sealed films can contain the contents.

Extended Edge Part

The extended edge part is a base where the below-described a tying string is attached and serves as a margin to wind up the string to close the opening of the grain bag of the invention.

This extended edge part may be formed by fitting a separate film at the end of the opening of the bag-shaped film or may be formed by overlapping films to each other in the production of the bag so as to extend one film.

Tying String

The tying string is provided to close the opening of the grain bag. Although any material may be used for the tying string, the same material as that of the film is preferable because use of such material is more convenient for recycling the grain bag.

String Seal Part

The string seal part is provided to mount the tying string on the extended edge part. The string seal part is formed by folding a part of the extended edge toward the opening side of the other film so as to involve the tying string inside the folded film. The tying string may be only put through the folded and sealed extended edge portion, or may be sealed together with the folded extended edge part so as not to freely move. As a matter of course, the inside of the string seal part may be coated with an adhesive to bond and fix the tying string to the string seal part.

Gap

A gap is provided between the string seal part and the opening side end of the other film. It is preferable to provide the gap because the opening can be easily opened in the use of the grain bag and the gap serves as a margin for winding up the tying string to close the grain bag. The width of the gap is in the range of 5 to 100 mm, preferably 10 to 30 mm.

ADDITIONAL CONSTITUENTS OF THE PRESENT INVENTION

The grain bag of the invention comprises the essential constituents mentioned above, but it may further comprise the following additional constituents.

Flap

The grain bag of the invention may be provided with a flap extending from the string seal part to the opening end side and having a given width so as to cover the opening. It is preferable to provide the flap because the flap can hold the contents present in the vicinity of the opening, whereby the grain hardly comes out of the bag even when the bag is laid on its side.

The width of the flap is not less than the width of the gap, and is in the range of 30 to 150 mm, preferably 50 to 100 mm.

Fold Portion

The bottom of the bag may be provided with a fold portion having a V-shaped section, which is formed by folding one end of the synthetic resin film inward. It is preferable to provide the fold portion because the bottom of the grain bag becomes flat when the grain is introduced inside the bag and thereby the bag can stably stand up. In this case, each corner of the bottom of the grain bag is preferably subjected to oblique sealing so as to form an isosceles triangle whose oblique sides have the same length as the width of each fold portion, whereby the width of the bottom becomes constant independent of the volume of the grain contained in the bag.

Air Holes

The both sides of the grain bag are preferably provided with plural air holes because the condition of the grain contained in the resulting bag can be properly maintained. The plural air holes may be formed along at least any one of the opening end and the bottom end of the film. Each of air holes may be arranged in the film to form a rectangular shape.

The air holes may be provided on any one of the two films or both of them.

The grain bag is required to have excellent impact resistance and tear resistance, because heavy materials are introduced into the bag and the bag is frequently moved.

The grain bag of the invention is produced from films obtained by subjecting the composition (A), (A'), (A") or (A''') to, for example, an inflation method, so as to impart a strength appropriate for grain bags. Therefore, the thickness of the grain bag can be made smaller than the thickness of grain bags of conventional polyethylene. The film produced by air-cooling inflation of the composition (A), (A'), (A") or (A''') and having (i) a Young's modulus in tension of not less than 4,000 kg/cm$^2$ and (ii) a dart impact strength of not less than 55 kg/cm is suitably used for the grain bag.

Further, the film for the grain bag preferably having a gloss of not less than 50% and a thickness of 30 to 200 μm.

The film has such excellent low-temperature properties (e.g., low-temperature drop-bag strength property) that it can be satisfactorily used as the grain bag even in the cold district having below-zero temperatures. Therefore, decrease of film thickness is feasible, and high-speed molding of the film is feasible.

In the use of the grain bag of the invention, the opening provided at one end of the grain bag is opened, and the grain in an appropriate amount is introduced into the bag through the opening. Then, the extended edge part is wound appropriate times toward the opening end side of the other film, and finally both ends of the tying string is tied to close the opening. Thus, the way of use of the grain bag is identical with that of the conventional paper grain bags, and there is no change in working of producers or dealers using the conventional paper grain bags.

The grain bag of the invention uses synthetic resin materials, so that the bag can be manufactured at lower cost as compared with the conventional paper grain bags. The above-mentioned constituents can be used in any combination.

Process for Producing Grain Bag

The process for producing the grain bag comprises the following steps: an extended edge part forming step wherein an extended edge part is formed by extending an end of one film (of two films) to the upper position of the opening end of the other film, a tying string put through step wherein the tying string is put through at the place having a given space (gap) from the opening end of the other film along the width direction of the resulting bag, a folding step wherein the extended edge part is folded toward the opening end side of the other film so that the tying string is involved in the folded extended edge.part, and a sealing step wherein the extended edge part thus folded is sealed in such a state that the tying string is involved and that the gap is left between the extended edge part and the opening end of the other film.

The grain bag comprising superposed two synthetic resin films whose three sides are sealed and having a bottom at one end and an opening at the other end may be produced by sealing the three sides of superposed two independent films or may be produced by folding one film in two and sealing two sides. However, if a tubular film such as an inflation film is used, the production process can be simplified because two sides are closed from the beginning.

The above process may further comprise a bottom folding step wherein the bottom is folded inside to form a fold portion having a V-shaped section. The above process may still further comprise a perforating step wherein plural air holes are formed along both sides of the ends of the films. The above process may still further have a second perforating step wherein plural air holes are formed along at least any one of the opening end and the bottom end of the other side film.

Fluid Material Packaging Pouch

The fluid material packaging pouch is useful for packaging fluid materials (e.g., liquid such as milk) for consumers, and is produced from a specific film structure comprising the ethylene copolymer composition (A), (A'), (A") or (A''').

The pouch of the invention for packaging fluid materials is produced by the use of a single-layer film structure (polymer sealing layer) comprising the ethylene copolymer composition (A), (A'), (A") or (A''').

The ethylene copolymer composition (A), (A'), (A") or (A''') is generally used singly for forming the film or a sealing layer of the film structure. However, it is possible to blend the ethylene copolymer composition (A), (A'), (A") or (A''') with other polymers employable for the heat-sealing layer. The ethylene copolymer composition (A), (A'), (A") or (A''') is generally used in an amount of 10 to 100% by weight based on the film structure.

To the polymer for forming the pouch of the invention, additives known by the technologists of this art, such as antioxidant, phosphites, cling additive, Standostab PEPQ (trade name, available from Sandoz), anti-blocking gent, slip agent, UV stabilizer, pigment and processing aid, can be added.

The film and the film structure disclosed in the present specification may be a single-layer structure or a multi-layer structure, with the proviso that the ethylene copolymer composition (A), (A'), (A") or (A''') is used for at least one layer, preferably a sealing layer. The thickness of the sealing layer may be at least about 0.1 mil (2.5μ), preferably 0.2 mil (5μ) to 10 mil (254μ), more preferably 0.4 mil (10μ) to 5 mil (127μ).

The film structure for the pouch of the invention has a surprisingly wide range of heat-sealing temperature. The heat-sealing temperature of the film structure can be in the range of usually 50° C. to 160° C., preferably 75° C. to 130° C. It has been found that the sealing layer of the invention have a heat sealing temperature range wider than that of the conventional polyethylene films, which are prepared from ununiformly branched ethylene polymers and have almost the same density. In order to improve flexibility in the heating-sealing process for producing a pouch from the film structure, it is important to widen the heat-sealing temperature range of the film structure. The composition (A), (A'), (A") or (A''') used for producing the film structure having the above-mentioned heat-sealing temperature range can have a melting point of usually 50° C. to 130° C., preferably 55° C. to 115° C.

The film structure for the pouch of the invention exhibits, as unexpected characteristics, heat-sealing strength at low temperatures. The film structure of the invention attains a hot tack strength, as measured by a DTC hot tack strength method, of at least about 1 N/in (39.4 N/m) within about 0.3 second at a sealing bar temperature of about 110° C., or attains a heat sealing strength, as measured by a DTC heat-sealing strength method, of at least 11 bf/in (175 N/m) within 0.4 second at a sealing bar temperature of about 110° C. The film structure of the invention also exhibits a hot tack or heat-sealing starting temperature of lower than about 110° C. with a strength of at least about 1 N/in (39.4 N/m). It has been found that a seal prepared using the sealing layer of the invention exhibits higher heat sealing strength at lower temperatures as compared with a seal prepared using the conventional polyethylene having higher density. In order to produce leakage-free pouches by operating a common packaging machine such as a vertical form-fill-sealing machine at a high speed, it is important to impart a high heat-sealing strength at low temperatures.

When the ethylene copolymer composition (A), (A'), (A") or (A''') is used for the sealing layer of the film structure of the pouch according to invention, it is thought that (1) a pouch can be produced by a form-fill-sealing machine at a high speed, and (2) a pouch package almost free from leakage is obtained, unlike the pouches obtained by the use of linear low-density polyethylene, linear ultra low-density polyethylene, high-pressure low-density polyethylene or a combination thereof.

In one embodiment of the invention, a pouch is produced by heat sealing a tubular film structure in the machine direction to form a closed end.

The film structure has (I) at least one layer comprising the ethylene copolymer composition (A), (A'), (A") or (A''') in an amount of 10 to 100% by weight, and (II) at least one layer comprising at least one polymer selected from the group consisting of an ununiformly branched linear ethylene/C3–C18 α-olefin copolymer, high-pressure low-density polyethylene and an ethylene/vinyl acetate copolymer, in an amount of 0 to 90% by weight.

The ununiformly branched linear ethylene/C3–C18 α-olefin copolymer of (II) generally is linear low-density polyethylene (e.g., polyethylene prepared by the use of a Ziegler catalyst). The linear low-density polyethylene is often classified as a subset, and the subset is represented by very low-density polyethylene (VLDPE) or ultra low-density polyethylene (ULDPE). The terms VLDPE and ULDPE used herein are exchangeable, and the technologists of this art generally use them in this way. The linear low-density polyethylene of (II) has a density of usually 0.87 g/cm$^3$ to 0.94 g/cm$^3$, preferably 0.87 g/cm$^3$ to 0.915 g/cm$^3$. The ununiformly branched linear ethylene/C3–C18 α-olefin copolymer of (II) preferably has a melt index of 0.1 to 10 g/10 min.

The high-pressure low-density polyethylene of (II) preferably has a density of 0.916 to 0.93 g/cm$^3$ and a melt index of 0.1 to 10 g/10 min.

The ethylene/vinyl acetate copolymer of (II) preferably has an ethylene:vinyl acetate weight ratio of 2.2:1 to 24:1, and exhibits a melt index of 0.2 to 10 g/10 min.

In another embodiment of the invention, a pouch is produced from a blend comprising:

(a) at least one composition (A), (A'), (A") or (A''') having a density of not more than 0.915 g/cm$^3$ and a melt index of not more than 10.0 g/10 min, in an amount of 10 to 100% by weight, and (b) at least one polymer selected from the group consisting of an ununiformly branched linear ethylene/ C3–C18 α-olefin copolymer, high-pressure low-density polyethylene and an ethylene/vinyl acetate (EVA) copolymer, in an amount of 0 to 90% by weight.

The ununiformly branched linear ethylene/C3–C18 α-olefin copolymer of (b) generally is linear low-density polyethylene (e.g., polyethylene prepared by the use of a Ziegler catalyst). The linear low-density polyethylene includes very low-density polyethylene (VLDPE) or ultra low-density polyethylene (ULDPE), as described above. The linear low-density polyethylene of (b) has a density of usually 0.87 g/cm$^3$ to 0.94 g/cm$^3$, preferably 0.87 g/cm$^3$ to 0.915 g/cm$^3$. The ununiformly branched linear ethylene/ C3–C18 α-olefin copolymer of (b) preferably has a melt index of 0.1 to 10 g/10 min.

The high-pressure low-density polyethylene of (b) preferably has a density of 0.916 to 0.93 g/cm$^3$ and a melt index of 0.1 to 10 g/10 min.

The ethylene/vinyl acetate copolymer of (b) preferably has an ethylene:vinyl acetate weight ratio of 2.2:1 to 24:1, and exhibits a melt index of 0.2 to 10 g/10 min.

The film structure of the pouch of the invention includes a multi-layer structure or a composite film structure, and in this case, the polymer sealing layer of the structure is preferably set as an inside layer of the pouch.

As will be understood by the technologists of this art, the multi-layer film structure for the pouch of the invention may includes various combinations of film layers, as far as the sealing layer constitutes a part of the final film structure. The multi-layer film structure for the pouch of the invention may be a coextrusion film, a coated film or a laminated film. The film structure includes the sealing layer in combination with a barrier film, e.g., a film of polyester, nylon, ethylene/vinyl alcohol copolymer (EVOH) or polyvinylidene dichloride (PVDC) such as Saran (trade name, available from The Dow Chemical Company) and a metal coated film. Selection of other materials used in combination with the sealing layer film is greatly influenced by the final use of the pouch. The pouch used herein means at least sealing layer used as an inside layer.

One embodiment of the film structure for the pouch of the invention has a sealing layer made of the ethylene copolymer composition (A), (A'), (A") or (A''') and at least one polymer outside layer. The polymer outside layer is preferably a polyethylene film layer, more preferably a layer of ununiformly branched linear polyethylene that is referred as to "linear low-density polyethylene" (LLDPE), "linear ultra low-density polyethylene" (ULDPE) and/or "very low-density polyethylene" (VLDPE) herein. An example of the commercially available LLDPE is DOWLEX (trade name) 2045 that is available from The Dow Chemical Company. An example of the commercially available ULDPE is ATTANE (trade name) 4201 that is available from The Dow Chemical Company.

The LLDPE (including both of VLDPE and ULDPE) useful herein is ununiformly branched linear copolymers prepared from ethylene and a small amount of an α-olefin of 3 to 18 carbon atoms, preferably an α-olefin of 4 to 10 carbon atoms (e.g., 1-butene, 4-methyl-1-pentene, 1-hexene, 1-octene and 1-decene). The ununiformly branched LLDPE is generally prepared by the use of a Ziegler catalyst (by a method described in, for example, U.S. Pat. No. 4,076,698 (Anderson et al.).

The LLPDE for the outside layer has a density of usually not less than 0.87 g/cm$^3$, preferably 0.9 to 0.93 g/cm$^3$, and a melt index of usually 0.1 to 10 g/10 min, preferably 0.5 to 2 g/10 min.

The outside layer may have any thickness as far as the sealing layer has a thickness of at least 0.1 mil (2.5μ).

Another embodiment of the film structure for the pouch of the invention includes a polymer layer interposed between two polymer sealing layers.

A further embodiment of the film structure for the pouch of the invention includes a polymer core layer between at least one polymer outside layer and at least one polymer sealing layer. Although this polymer layer may be a film layer of the same LLDPE as that of the outside layer, it is preferably a layer of different LLDPE, more preferably a layer of LLDPE having a higher density than that of the outside layer. The core layer may have any thickness as far as the sealing layer has a thickness of at least 0.1 mil ($2.5\mu$).

A still further embodiment of the film structure for the pouch of the invention may be a structure including a sealing layer and a film layer of different polyethylene which is referred to as "high-pressure low-density polyethylene" (LDPE) hereinafter. The LDPE layer generally has a density of 0.916 to 0.930 g/cm$^3$ and a melt index of 0.1 to 10 g/10 min. The LDPE layer may have any thickness as far as the sealing layer has a thickness of at least 0.1 mil ($2.5\mu$).

A still further embodiment of the film structure for the pouch of the invention may be a structure including a sealing layer and an EVA copolymer layer having an ethylene:vinyl acetate weight ratio of 2.2:1 to 24:1 and a melt index of 0.2 to 20 g/10 min. The EVA layer may have any thickness as far as the sealing layer has a thickness of at least 0.1 mil ($2.5\mu$).

The thickness of the film structure for use in the production of the pouch of the invention is in the range of 0.5 mil ($12.7\mu$) to 10 mil ($254\mu$), preferably 1 mil ($25.4\mu$) to 5 mil ($127\mu$).

Designing of the film structure for the pouch of the invention is flexible. For the purpose of optimizing the specific film property such as rigidity, LLDPE different from each other (e.g., VLDPE and ULDPE) can be used for the outside layer and the core layer. Thus, the film can be made optimum for the specific use, for example, use in a vertical form-fill-sealing machine.

The polyethylene film structure for use in the production of the pouch of the invention is prepared by any of a blown tube extrusion process and a cast extrusion process which are well known in this technical field. The blown tube extrusion process is described in, for example, "Modern Plastics" Mid-October, 1989, Encyclopedia Issue, Vol. 66, Number 11, pp. 264–266. The cast extrusion process is described in, for example, "Modern Plastics" Mid-October, 1989, Encyclopedia Issue, Vol. 66, Number 11, pp. 256–257.

The pouch of the invention is a sealed container to be filled with "fluid material". The term "fluid material" means a material capable of flowing by gravity or capable of being pumped, but the meaning thereof does not include a gaseous material. Examples of the fluid materials include non-carbonated beverages, such as milk, water, fruit juice and wine; carbonated beverages, such as soda, beer and water; emulsions, such as ice cream mix and soft margarine; pastes, such as meat paste and peanut butter; preserves, such as jam, pie stuffing and marmalade; jelly; dough; minced meats, such as meat for sausages; powders, such as gelatin powder and detergent; granular solids, such as nuts, sugar and grain; and analogous materials. The pouch of the invention is particularly useful for packaging liquids (e.g., milk). The fluid materials also include oily liquids such as cooking oil and motor oil.

After the film structure for the pouch of the invention is formed, the film structure is cut so as to have a width desired for the use in a common pouch producing machine. Then, the pouch of the invention is produced using a "form-fill-sealing machine" well known in this technical field. An embodiment of the pouch of the invention is a pouch formed from a tubular member and having a lap seal in the machine direction and a seal in the cross direction so as to produce a pouch in a "pillow shape" after a fluid material is filled.

Another embodiment of the pouch of the invention is a pouch which is formed from a tubular member, which has fin seals along three sides of the tubular member, i.e., top seal and side seals in the machine direction, and which has a bottom member in a substantially concave shape or "ball shape" sealed with the tubular member so that the bottom becomes semicircular or "arc-shaped" when the vertical section of the pouch filled with a fluid material is seen. This pouch is an "Enviro-Pak" pouch known in this technical field.

The pouch produced in accordance with the invention is preferably a pouch produced by a vertical form-fill-sealing machine (VFFS machine). Examples of the commercially available VFFS machines include VFFS machines manufactured by Hayssen or Prepac. The VFFS machines are described in F. C. Lewis "Form-Fill-Seal", Packaging Encyclopedia, p. 180, 1980.

In the VFFS packaging method, a sheet of the plastic film structure described herein is fed to a VFFS machine, and the sheet is formed into a continuous tube in a tube-forming section of the machine. In detail, the longitudinal edges of the film are sealed, that is, the plastic film is folded and subjected to inside/outside sealing, or the plastic film is subjected to inside/outside sealing to perform fin sealing, whereby the tubular member is produced. Then, the tube is transversely sealed at a position of one end thereof by a sealing bar so as to form a bottom of the resulting pouch. Thereafter, the pouch is filled with a filling material such as milk. Then, the upper end of the pouch is sealed by a sealing bar, and the plastic film is burned off or cut off, whereby the finished pouch is separated from the tube. The process for producing pouches using the VFFS machine is described in U.S. Pat. Nos. 4,503,102 and 4,521,437.

The volume of the pouch of the invention can be changed. The pouch can contain a fluid material in an amount of usually 5 milliliters to 10 liters, preferably 10 milliliters to 8 liters, more preferably 1 liter to 5 liters.

Use of the sealing layer of the ethylene copolymer composition (A), (A'), (A") or (A''') in two-layer or three-layer coextrusion film articles makes it possible to produce pouches by the VFFS machine at a higher speed and to obtain film structures capable of forming pouches free from leakage.

It is possible to make printing on the pouch of the invention using technique known in the art, and prior to printing, the pouch can be subjected to a corona treatment.

When the pouch of the invention is subjected to a 5-feet (1.52 m) drop test (defined in the present specification), it has excellent results. The per cent failure of the pouch of the invention, as measured by the 5-feet (1.52 m) drop test, is preferably not more than 40%, more preferably not more than 20%, particularly not more than 10%.

The pouch of the invention is more advantageously used for packaging of liquids for consumers (e.g., milk) as compared with hitherto used containers such as glass bottles, paper cartons and high-density polyethylene jugs. For producing the hitherto used containers, large amounts of natural resources are consumed, and a significantly large space is required for dumping. Moreover, a large space is required for storage, and high energy is required for temperature control of the articles because of heat transfer properties of the containers.

When the pouch of the invention produced from a thin film is used for liquid packaging, a greater number of advantages are obtained as compared with the hitherto used containers. The pouch of the invention has the following advantages: (1) consumption of natural resources is small; (2) the space required for dumping is small; (3) recycling is feasible; (4) processing is easily carried out; (5) the space required for storage is small; (6) energy consumed for storage is small due to heat transfer properties of the package; (7) incineration can be safely carried out; and (8) reusing is possible, for example, the emptied pouch can be applied to other uses, e.g., uses as freezer bag, sandwich bag and general-purpose storage bag.

Batch Inclusion Package

The batch inclusion package is produced from the ethylene copolymer composition (A), (A'), (A") or (A'") or a composition containing any one of them. This package is formed from a film, and into the package, a powder, pellet or fluid material is introduced to protect the material. Then, the whole package (film and the contents) can be added to a mixture for producing a certain article. For example, the package and the contents included therein can be fed to an extruder or a mixer at the same time.

The ethylene copolymer composition (A), (A'), (A") or (A'") is preferably used as only one polymer component for producing the film for the batch inclusion package. However, together with the ethylene copolymer composition (A), (A'), (A") or (A'"), other polymers may be subjected to blending, multi-layer coextrusion and/or multi-layer laminating, to impart film processability, film hardness, film barrier properties, film strength, film melt properties and other desired film properties. The batch inclusion film produced by the use of a blend of the ethylene copolymer composition (A), (A'), (A") or (A'") and other polymer components would maintain improved properties. Some useful examples of the components of the polymer blend include an ethylene/vinyl acetate copolymer (EVA), an ethylene/vinyl alcohol copolymer (EVOH), polybutylene (PB), linear high-density polyethylene (HDPE) having a density of 0.941 to 0.965 g/cm$^3$, and linear low-density polyethylene (LLDPE) having a density of 0.87 to 0.94 g/cm$^3$ which is prepared by the use of a conventional Ziegler catalyst. The ethylene copolymer composition (A), (A'), (A") or (A'") comprises preferably at least about 50%, more preferably at least about 80% of the blend composition. It is particularly preferable that the inside layer is substantially composed of at least one ethylene copolymer composition (A), (A'), (A") or (A'");

To the ethylene copolymer composition (A), (A'), (A") or (A'"), other additives can be added in amounts not detrimental to the functions of the batch inclusion package. Examples of such additives include plasticizer, antioxidant, phosphites, cling additives, heat stabilizer, light stabilizer (e.g., Cyasorb (trade name) UV 531 benzophenone manufactured by Cyanamid, Tinubin (trade name) 622 hindered amine light stabilizer manufactured by Ciba Geigy Corp, pigment (e.g., titanium dioxide, calcium carbonate, carbon black), processing aid (e.g., polyethylene glycol, fluoropolymers, fluoroelastomers, waxes), flame retardant (e.g., Amgard (trade name) CPC 102 which is a flame retardant based on phosphorus and is manufactured by Albright and Wilson Americas), lubricant (e.g., waxes, stearates, mineral oil), slip agent (e.g., erucamide, oleamide), anti-blocking agent (e.g., talc, silicon dioxide), crosslinking agent (e.g., peroxides such as Booster (trade name) manufactured by DuPont), anti-fogging agent (e.g., Atmer (trade name) 100 sorbitan ester manufactured by ICI), impact modifier (e.g., Paxon (trade name) Pax Plus which is a rubber modified film resin and is manufactured by Allied Corp.), antistatic agent (e.g., Armostat 410 which is an ethoxylated tertiary amine and is manufactured by Akzo Chemical, Inc.), and filler (e.g., talc, calcium carbonate, clay, fumed silica). The additives listed above are only examples, and they do not include all additives or do not restrict the invention.

The film and the film structure having novel properties described herein can be produced using ordinary techniques for producing hot blown films or cast films. It is possible to use a biaxial orientation method such as a tenter film method or a double bubble method in combination with the ordinary techniques. The ordinary hot blown film method is described in, for example, "The Encyclopedia of Chemical Technology", Kirt-Othmer, Third edition, John Wiley & Sons, New York, 1981, Vol. 16, pp. 416–417 and Vol. 18, pp. 191–192. The novel film and the film structure described in this specification can be also produced by the biaxially oriented film-producing method, e.g., "double bubble" method described in U.S. Pat. No. 3,456,044 (Pahlke) and other methods described in U.S. Pat. No. 4,865,920 (Golike et al.), U.S. Pat. No. 4,352,849 (Mueller), U.S. Pat. No. 4,820,557 (Warren), U.S. Pat. No. 4,927,708 (Herran at al.), U.S. Pat. No. 4,963,419 (Lustig et al.) and U.S. Pat. No. 4,952,451 (Mueller). It is also possible to produce the film and the film structure in accordance with tenter film technique such as technique used for the orientation of polypropylene.

Although the film may be a single-layer film or a multi-layer film, at least one ethylene copolymer composition (A), (A'), (A") or (A'") is used as at least one layer of the film structure, preferably an inner layer. The inner layer is brought into contact with the material to be contained in the package. The inner layer may be coextruded with other layer(s) or laminated onto aother layer(s) is the secondary operation, as described by W. J. Schrenk and C. R. Finch in "Coextrusion for Barrier Packaging" of "Society of Plastics Engineers RETEC Proceedings", Jun. 15–17, 1981, pp. 211–229. As described by K. R. Osborn and W. A. Jenkins in "Plastic Films, Technology and Packaging Applications" (Technnomic Publishing Co., Inc. (1992)), it is feasible to produce a single-layer film using a tubular film (i.e., blown film technique) or a flat die (i.e., cast film), and this film may be optionally subjected to an additional post-extrusion process for forming a multi-layer structure, such as adhesion or extrusion laminating of the film to other layers of the packaging material. Even if the film is a coextruded film of two or more layers (described by Osborn and Jenkins), the film may be laminated to other additional layers of the packaging material according to other physical requirements for the final packaging film. The comparison between the coextrusion and the laminating is considered also in D. Dumbleton "Laminations Vs. Coextrusion" (Converting Magazine, Sep. 1992). The single-layer film or the coextruded film can be further subjected to another post-extrusion process such as biaxial orientation.

Another technique to produce a multi-layer package material is extrusion coating. Similarly to the cast film process, the extrusion coating process utilizes flat die technology. A film layer in the form of a single layer or a coextrudate can be subjected to extrusion coating onto the substrate.

For a polymer blend and/or a multi-layer film structure, the ethylene copolymer composition (A), (A'), (A") or (A'") is preferably used to comprise at least one layer, preferably the inner layer. Examples of other layers of the multi-layer structure include barrier layers and/or tie layers and/or structural layers, without limiting thereto. Various materials are employable for such layers, with some of them being used as two or more layers in the same film structure.

Examples of the materials include ethylene/vinyl alcohol (EVOH) copolymers, polyvinylidene chloride (PVDC), polyethylene terephthalate (PET), oriented polypropylene (OPP), high-density polyethylene (HDPE), ethylene/vinyl acetate (EVA) copolymers, ethylene/acrylic acid (EAA) copolymers, ethylene/methacrylic acid (EMAA) copolymers, LLDPE, HDPE, LDPE, nylon, adhesive graft polymers (e.g., polyethylene grafted with maleic anhydride) and paper. The multi-layer structure generally comprises 2 to 7 layers.

The (total) thickness of the single-layer film or the multi-layer film structure is in the range of typically 0.2 mil ($5\mu$) to 15 mil ($381\mu$), preferably 1 mil ($25.4\mu$) to 5 mil ($127\mu$). In case of the coextrusion process (or multi-layer extrusion process), the inside layer comprising the substantially linear ethylene/α-olefin polymer is made to have a thickness of typically 0.2 mil ($5\mu$) to 15 mil ($381\mu$), preferably 1 mil ($25.4\mu$) to 5 mil ($127\mu$).

The film or the film structure produced from the ethylene copolymer composition (A), (A'), (A") or (A"') is formed into a bag, a liner or a packaging material according to the final use requirements. By the use of, for example, a tub liner, various materials can be successively blended. In detail, the contents and a liner are transferred from one tub into another tub and blended with other components, followed by optionally feeding the blend to an intensive mixer. Otherwise, additives for use in the rubber production may be packaged in the bag, and the whole bag including the contents is added to a certain step of the rubber production process without opening the bag. Uses and production technology of the batch inclusion bag are well known in the industry of this art, as described in U.S. Pat. Nos. 4,394,473, 5,120,787, 4,248,348, European Patent Laid-Open Publication No. 0270902 and Canadian Patent No. 2,053,051.

When the ethylene copolymer composition (A), (A'), (A") or (A"') is used for the batch inclusion bag and film, a number of advantages are obtained. The ethylene copolymer composition (A), (A'), (A") or (A"') exhibits excellent processability in the production of blown films and has melting point and softening ranges lower than those of polyethylene prepared by the use of a conventional Ziegler catalyst. Since the ethylene copolymer composition (A), (A'), (A") or (A"') is composed of carbon and hydrogen atoms, the composition (A), (A'), (A") or (A"') is compatible with various elastomer additives particularly useful for the rubber industry, in contrast with batch inclusion films and bags produced from ethylene/acrylic acid copolymers or ethylene/methacrylic acid copolymers (as described in European patent Laid-Open Publication No. 0270902) or in comparison with films and bags produced from ethylene/vinyl acetate copolymers (as described in U.S. Pat. Nos. 5,120,787 and 4,248,348).

The materials to be included in the batch inclusion bag (or packaging material, coating material or liner) may be those exhibiting free flow (that is, they easily flow by the self weight in a state of gravitation) or those exhibiting no free flow (that is, they do not flow by the self weight in the state of gravitation). The materials include various ones, but typically are those exhibiting no free flow such as unvulcanized rubbers, uncrosslinked elastomers and tars.

Typical examples of the materials exhibiting free flow include clay, silicic acid salt, calcium carbonate, cadmium diethyldithiocarbamate, tetramethylthiuram disulfide, benzothiazyl disulfide, substituted thioesters and amine antioxidants, aniline anti-ozone derivatives, diamines, thiourea hardeners selected from sulfur, compounds imparting sulfur and peroxides, ultraviolet agents selected from substituted benzotriazole and substituted benzophenones, color pigments selected from iron oxide, titanium dioxide and organic dyes, reinforcing pigments selected from carbon black, zinc oxide and hydrated silicon compounds, processing aids such as silicon dioxide, pumice, stearate and rubber process oils, crosslinked elastomers, unvulcanized rubber compound materials, ground tires, herbicides, germicides, fungicides, and chlorinated polyethylene (CPE). The free-flow materials to be effectively included in the package of the invention include not only liquids but also solids.

In the rubber industry, a small amount (e.g., 0.5 to 10% by weight) of a rubber process oil is typically used, and the rubber process oil is mixed with at least one compounding material. The materials capable of being packaged in the novel package of the invention are not included in the above-listed ones or not limited thereto.

The package of the invention relates to the compounding materials introduced into or covered with the bag, and also relates to mixtures of the compounding materials and additives such as rubber process oil. In case of the unvulcanized rubber, the film is fitted around the rubber. Especially in covering, the rubber is firmly covered with the film under tension, and then the film is heat sealed to the rubber to complete a package. In the production of the package, heat sealing of the film is desirably conducted, but is not always necessary.

The article produced from the batch inclusion package varies depending on the type of the material to be included in the package. Some examples of the articles include asphalt, animal feed and wires. For example, in the packaging of ground tire in the asphalt manufacturing, titanium dioxide in the animal feed manufacturing and CPE in the wire coating manufacturing, the specific materials mentioned above are introduced into the batch inclusion package of the invention. Examples of other articles include various rubbers. For example, a rubber or a rubber compounding additive is packaged with the batch inclusion film described in the present specification. By packaging a waste substance (e.g., heavy tar effluent or waste plastic) and by introducing the whole package into an incinerator, energy can be yielded. If waste plastic and other substances are packaged and reused, other useful articles such as garbage bags and benches for the park can be produced.

Bag-in-box Interior Container

The bag-in-box interior container is formed from a film comprising the ethylene copolymer composition (A), (A'), (A") or (A"').

The thickness of the film for forming the bag-in-box interior container is in the range of usually 30 to 1,000 $\mu$m, preferably 50 to 700 $\mu$m, though it varies according to the contents or the production process.

The wall of the bag-in-box interior container of the invention preferably has the following properties:
(i) the blocking force is less than 1.0 g/cm,
(ii) the number of pinholes produced in an area of 20.5 cm×28.0 cm after the number of twisting times measured by a Gerbo flex tester reaches 2,000 is 2 or smaller, and
(iii) the number of flexings, as measured in accordance with JIS P-8115, is not less than 90,000.

A film whose neck-in in the molding process is not more than 20 cm on one side is more preferable.

The bag-in-box interior container may be formed from a single-layer film comprising the ethylene copolymer composition (A), (A'), (A") or (A"'), or may be formed from a multi-layer film wherein a film of the ethylene copolymer composition (A), (A'), (A") or (A"') and a film of another resin (e.g., nylon, ethylene/vinyl alcohol copolymer, polyvinyl alcohol (EVOH), adhesive resin) are laminated together.

The bag-in-box interior container is in the form of almost cube as a whole, and its top is provided with a cap. At the position corresponding to the periphery given when the cube is obliquely cut, a heat-sealed portion having a large thickness is present. The bag-in-box interior container is formed so that one half of the container is folded and inserted into the other half to overlap each other.

The bag-in-box interior container is filled with a liquid or the like, then encased in a hard exterior container such as a corrugated fiberboard box, and stored or transported. The empty container is folded in such a manner that one half of the container is inserted into the other half to overlap each other, and then stored or transported.

When the bag-in-box interior container is folded, or expanded to make a cube shape, or filled with a liquid to transport it as described above, various forces are applied to the corners of the bag-in-box interior container, so that the container is exposed to severer stress than the case of ordinary flat bags, and therefore pinholes are easily produced. For this reason, the interior container is required to have properties such as high pinhole resistance, flex resistance and blocking resistance. The bag-in-box interior container of the invention satisfies the above requirements.

The bag-in-box interior container can be produced by, for example, the following processes.

(i) A molten resin is extruded into two sheets by means of T-dies longitudinally arranged in parallel with each other, and vacuum forming is conducted using a mold having such a shape that peripheries of opposite faces of the resulting container can be jointed.

(ii) A molten resin is extruded from a circular die (parison extrusion) to give a cylindrical form, and vacuum forming is conducted using the same mold as described above.

(iii) Two or more resin films are superposed one upon another, and the four sides are heat sealed to form a bag. In this case, each of the films may be a single-layer film comprising the composition (A), (A'), (A") or (A''') or a multi-layer film wherein a film of the composition (A), (A'), (A") or (A''') and a film of another resin (e.g., nylon, ethylene/vinyl alcohol copolymer, polyvinyl alcohol (EVOH), adhesive resin) are laminated together.

The bag-in-box interior container has excellent heat stability, blocking resistance, pinhole resistance and flex resistance and is economically advantageous, so that it can be widely used as a container for various liquids such as liquors, vinegar, photographic developing solution, bleaching agent and germicide liquid.

Medical Container

The medical container is, for example, a bag formed from a multi-layer film, a bag formed from a single-layer film or a single-layer bottle. At least one layer of the multi-layer film, the single-layer film and the single-layer bottle are each made of the ethylene copolymer composition (A), (A'), (A") or (A''').

The medical container can be produced by ice-cooling or air-cooling inflation, T-die method, dry lamination, extrusion lamination, blow molding or the like. As the molding method for the medical bag, an inflation method and a coextrusion T-die method are preferable from the viewpoints of hygienic qualities and economical advantages. As the molding method for the medical bottle, blow molding is preferable.

The thickness of the medical container is in the range of usually 0.05 to 1.00 mm, preferably 0.1 to 0.7 mm, more preferably 0.15 to 0.3 mm. If the thickness of the container is not less than 0.05 mm, the container exhibits good impact resistance and has nio problem in practical use.

The medical container does not lose transparency, shows excellent heat resistance and is free from occurrence of wrinkle or deformation, even if the container is subjected to sterilization.

Heat-resistant Container

The heat-resistant container is, for example, a bag formed from a multi-layer film, a bag formed from a single-layer film, a multi-layer bottle or a single-layer bottle. At least one layer of the multi-layer film, the single-layer film, at least one layer of the multi-layer bottle and the single-layer bottle are each made of the ethylene copolymer composition (A), (A'), (A") or (A''').

For the layers other than the layer of the composition (A), (A'), (A") or (A''') in the multi-layer heat-resistant container, any materials may be used without specific limitation, and for example, polypropylene, nylon, polyester and polyvinyl alcohol may be used.

The heat-resistant container can be produced by ice-cooling or air-cooling inflation, T-die method, dry lamination, extrusion lamination, blow molding or the like.

When the heat-resistant container is a bag, an inflation method and a coextrusion T-die method are preferable from the viewpoints of hygienic qualities and economical advantages. When the heat-resistant container is a bottle, blow molding is preferable.

The thickness of the heat-resistant container is in the range of usually 0.05 to 1.00 mm, preferably 0.1 to 0.7 mm, more preferably 0.15 to 0.3 mm. If the thickness of the container is not less than 0.05 mm, the container exhibits good impact resistance and has no problem in practical use.

The heat-resistant container of the invention has a haze (ASTM D-1003-61), as measured after heat sterilization, of not more than 30%, preferably 0 to 20%.

The heat deformation starting temperature of the heat-resistant container is not lower than 115° C., and the thickness of the retort food container is in the range of usually 0.05 to 1.00 mm.

The heat deformation starting temperature is determined as follows. A sample of a bag or a bottle formed from a molded film is subjected to hot water sterilization of sterilization temperature×30 minutes in a small heat-resistant high-pressure steam sterilizer of RK-4016 model manufactured by Alps Co. The sample taken out of the sterilizer is visually observed to evaluate its change. The sterilization is started at a sterilization temperature of 110° C., and the sterilization temperature is raised by 1° C. whenever each sterilization is completed. This operation is repeated, and when deformation of the sample taken out of the sterilizer is observed for the first time, the sterilization temperature is measured. The measured temperature is taken as the deformation starting temperature.

The heat-resistant container, for example, a retort food container, does not lose transparency and shows excellent heat resistance, even if the container is subjected to sterilization.

Elastic Fiber

The elastic fiber exhibits an elastic recovery of at least 50% at a distortion of 100%, and comprises the ethylene copolymer composition (A), (A'), (A") or (A''').

The fiber is typically classified according to its diameter. The monofilament fiber is generally defined as a fiber having a diameter of about not less than 15 deniers, usually about not less than 30 deniers, based on one filament. The fine denier fiber is generally applied to a fiber having a diameter of less than about 15 deniers based on one filament. The micro denier fiber is generally defined as a fiber having a diameter of less than about 100μ. The fiber can be also classified according to the preparation process. For example, the fiber is classified as monofilament, continuous wound fine filament, staple or short cut fiber, spun bond fiber, or melt blown fiber.

The melt index of the ethylene copolymer composition (A), (A'), (A") or (A''') used for preparing the elastic fiber described in the present specification is in the range of 0.01 g/10 min to 1,000 g/10 min, preferably 0.1 g/10 min to 5 g/10 min, in case of the monofilament (fiber usually having not less than 15 denier/filament), and is in the range of preferably 5 g/10 min to 250 g/10 min in case of the fine denier fiber (fiber usually having not more than 15 denier/filament).

To the ethylene copolymer composition (A), (A'), (A") or (A''') for use in the preparation of the elastic fiber, additives, such as antioxidant, phosphites, cling additive, anti-blocking agent and pigment, may be added in amounts not detrimental to the improved properties of the fiber and the fabric found by the present applicants.

By the use of the ethylene copolymer composition (A), (A'), (A") or (A'''), various homofil fibers can be prepared. The homofil fibers are fibers having monodomains but having no other different polymer domains such as domains of two-component system fibers. The homofil fibers include staple fibers, spun bond fibers or melt blown fibers (prepared using systems disclosed in, for example, U.S. Pat. No. 4,340,563 (Appel et al.), U.S. Pat. No. 4,663,220 (Wisneski et al.), U.S. Pat. No. 4,668,566 (Braun) or U.S. Pat. No. 4,322,027 (Reba)) and gel spun fibers (prepared using a system disclosed in U.S. Pat. No. 4,413,110 (Kavesh et al.)). The staple fibers are melt spinnable, that is, these fibers can be made to have final fiber diameter by direct extrusion without performing additional drawing, or the staple fibers can be made to have desired diameter by performing melt spinning to prepare fibers having large diameter and then subjecting them to hot drawing or cold drawing using common fiber orientation technique. The novel elastic staple fibers disclosed in this specification are employable as bond fibers, and in the invention, the novel elastic fibers are made to have a melting point lower than that of matrix fibers surrounding them. In a typical use of the bond fibers, the bond fibers are blended with other matrix fibers, and a heat is applied to the whole structure, whereby the bond fibers are melted to bond the surrounding matrix fibers to one another. Typical examples of the matrix fibers benefited by the use of the novel elastic fibers include poly(ethylene terephthalate) fibers, cotton fibers, nylon fibers, polypropylene fibers, other ununiformly branched polyethylene fibers, and linear polyethylene homopolymer fibers, without limiting thereto. The diameter of the matrix fiber can be changed according to the final use application.

The elastic recovery exhibited by the melt spun fibers produced from the ethylene copolymer composition (A), (A'), (A") or (A''') is surprisingly almost equal to that of fibers which are produced by performing melt spinning to prepare fibers whose diameters are 2 or 3 times as much as the melt spun fibers and then subjecting them to cold drawing to make their diameters identical with those of the melt spun fibers. The elasticity referred to herein is not such a result of orientation as becomes ineffective by heat treatment. Therefore, articles capable of maintaining elasticity even after they are subjected to heat exposure can be obtained.

In case of the novel elastic fiber disclosed in this specification, the melt index of the ethylene copolymer composition (A), (A'), (A") or (A''') can be changed over a wide range, with exerting surprisingly small influence on the elasticity of the fiber, and thereby strength and shrinkage force of the fiber and the fabric can be changed independent of the elasticity. Therefore, it becomes feasible to more flexibly design the fabric and the final product. For example, the shrinkage force of the fiber can be changed by changing the melt index of the polymer not but the diameter of the fiber. (If the melt index is lowered, the shrinkage force is increased.) Accordingly, it becomes feasible that optimization of touch (i.e., feeling) of the fabric is more favorably carried out with maintaining elasticity/strength properties required for the fabric.

It is also possible to prepare a two-component system fiber by the use of the ethylene copolymer composition (A), (A'), (A") or (A'''). The ethylene copolymer composition (A), (A'), (A") or (A''') is used as at least a part of the two-component system fiber. For example, in case of a two-component system fiber of shell/core type in which the core is concentrically surrounded with the shell, the ethylene copolymer composition (A), (A'), (A") or (A''') can be allowed to be present in any of the shell and the core. Different types selected from the ethylene copolymer compositions (A), (A'), (A") and (A''') are independently used for the shell and the core, and in this case, designing is preferably made in such a manner that the both components show elasticity and that the melting point of the shell component is lower than that of the core component. The present invention includes a two-component system fiber of another type, such as a side-by-side fiber. The side-by-side fiber is, for example, a fiber having polymer domains different from each other, and the ethylene copolymer composition (A), (A'), (A") or (A''') is used for at least a part of the surface of the fiber.

The shape of the fiber is not specifically limited. For example, the fiber typically has a sectional shape of a circle, but the fiber may have another sectional shape such as a trilobal shape or a flat shape (i.e., ribbon-like shape). The elastic fiber disclosed in this specification is not restricted by the fiber shape.

The diameter of the fiber can be measured and reported in various ways. In general, the diameter of the fiber is measured in "denier" per fiber. The "denier" is a term relating to fabrics, which is defined as a weight (gram) of fiber per 9,000 m of a fiber length. The monofilament is generally applied to an extruded strand of not less than 15 deniers, usually not less than 30 deniers, per filament. The fine denier fiber is generally applied to a fiber of about 15 or less deniers. The microdenier fiber (known as microfiber) is generally applied to a fiber having a diameter of not more than about 100 μm. In case of the novel elastic fiber disclosed in this specification, the diameter can be widely changed with hardly exerting influence on the elasticity of the fiber. The denier of the fiber can be controlled so as to suit the functions of the finished product, and it will be preferable that the melt blown fiber has 0.5 to 30 deniers/filament, the spun bond fiber has 1 to 30 deniers/filament, and the continuous filament has 1 to 2,000 denier/filament.

The fabrics made from the above novel fibers include both of woven fabric and nonwoven fabric. The nonwoven fabric including spunlaced fabric (or fabric twined by hydraulic power) as disclosed in U.S. Pat. No. 3,485,706 (Evans) and U.S. Pat. No. 4,939,016 (Radwanski et al.) can be produced by various methods, such as a method of napping the staple fiber to bond by heat, a method of spunbonding a continuous fiber in one continuous operation, and a method of melt blowing a fiber, followed by calendering the resulting web or by thermally bonding the web. These various techniques for producing nonwoven fabrics are well known by the technologists of this art, and the disclosure of the invention is not restricted by any method. Other structures produced from the above-mentioned fiber are also included in the scope of the present invention, and examples thereof include a blend of the novel fiber and another fiber such as poly (ethylene terephthalate) (PET) or cotton.

By the term "comprising" as used in the claims in this specification is meant that the ethylene copolymer composition (A), (A'), (A") or (A'") for use in the production of the fiber and the fabric can contain additional materials which exert no substantial influence on the elasticity of the fiber or the fabric. Such useful nonrestrictive additive materials include pigment, antioxidant, stabilizer and surface active agent (as disclosed in, for example, U.S. Pat. No. 4,486,552 (Niemann), U.S. Pat. No. 4,578,414 (Sawyer et al.) or U.S. Pat. No. 4,835,194 (Bright et al.).

The articles which can be produced by the use of the novel elastic fiber and fabric disclosed in the present specification include composite fabric articles desired to have elastic parts, such as diapers. In the diapers, the elasticity is desired for a west band part to prevent slip-down of diaper and a leg band part to prevent leakage, as described in U.S. Pat. No. 4,381,781 (Sciaraffa). The parts which exhibit elasticity frequently serve to improve shape-fitting and/or shape-fixing system so as to well combine comfortableness and reliability. By the use of the novel elastic fiber and fabric disclosed in this specification, structures having a combination of elasticity and air permeability can be manufactured.

The novel elastic fiber and fabric disclosed in this specification are also employable for various structures as described in U.S. Pat. No. 2,957,512 (Wade). For example, the layer 50 (i.e., component which exhibits elasticity) of the structure described in the U.S. Pat. No. '512 can be replaced with the novel elastic fiber and fabric. In this U.S. Patent, a material exhibiting no elasticity is flattened, gathered and creped to produce a structure exhibiting elasticity. The novel elastic fiber and/or fabric can be fitted to another fiber, fabric or structure exhibiting no elasticity through melt bonding or by the use of an adhesive. By the use of the novel elastic fiber and/or fabric and another component exhibiting no elasticity, an elastic structure with gathers or shirring can be produced. Specifically, the component exhibiting no elasticity (such as the component described in U.S. Pat. No. '512) is gathered, and the component exhibiting elasticity is previously extended before fitting or the component exhibiting elasticity is heat shrunk after fitting.

It is also possible to produce a novel structure by subjecting the novel elastic fiber described in this specification to a method of spunlacing (or twining by hydraulic power). For example, the elastic sheet (12) disclosed in U.S. Pat. No. 4,801,482 (Goggans) can be produced using the novel elastic fiber/fabric described in this specification.

The continuous filament exhibiting elasticity as described in this specification is also employable for woven stuff for which high impact resilience is desired.

The toughness and shrinkage force of the novel elastic fiber and fabric disclosed in this specification are controllable, and if necessary, flexible designing relating to change of shrinkage force in the same clothes becomes feasible, as described in U.S. Pat. No. 5,196,000 (Clear et al.).

In U.S. Pat. No. 5,037,416 (Allen et al.), advantages of.a shape-fitting top sheet brought about by the use of a ribbon exhibiting elasticity are described (cf. member 19 of U.S. Pat. No. '416). The novel elastic fiber can be used in the form of a fabric capable of exerting the function shown by the member 19 of the U.S. Pat. No. '416 or capable of exhibiting the desired elasticity.

Also in a composite using linear polyethylene or ethylene copolymer having extremely high molecular weight, advantages can be obtained by the use of the novel elastic fiber disclosed in this specification. For example, the novel elastic fiber has a low melting point (there is essentially a linear relation between the melting point and the density of this polymer). Therefore, in case of a blend of this novel elastic fiber and a polyethylene fiber having an extremely high molecular weight (e.g., Spectrra (trade name) fiber, available from Allied Chemical) as described in U.S. Pat. No. 4,584,347 (Harpell et al.), this elastic fiber of low melting point serves to bond the polyethylene fiber of high molecular weight without melting it, whereby high strength of the high-molecular weight fiber and united body are retained.

In U.S. Pat. No. 4,981,747 (Norman), the elastic sheet 122 which forms a composite elastic material including a reversibly necked material can be replaced with the novel elastic fiber and/or fabric disclosed in this specification.

The novel elastic fiber may be used as an elastic component of a melt blown process, which is indicated by a reference number 6 of the drawing in U.S. Pat. No. 4,879,170 (Radwanski). In this U.S. Pat. No. '170, comolding materials generally exhibiting elasticity and their preparation process are described.

The novel elastic fiber and fabric disclosed in the present specification can be used to produce an elastic panel. This panel is employable as members 18, 20, 14 and/or 26 of U.S. Pat. No. 4,940,464 (Van Gompel). It is also possible to use the novel elastic fiber and fabric disclosed in the present specification as an elastic component (e.g., layer 86 of U.S. Pat. No. '464) of a composite side panel.

Expansion Molded Product

The expansion molded product can be made to have various shapes such as rod, tube, tape and sheet, and is used as a substrate of cushioning material, heat insulating material, poultice material or the like.

The expansion product is produced by mixing the ethylene copolymer composition (A), (A'), (A") or (A'") with a blowing agent and then heating the mixture or placing it under vacuum to gasify the blowing agent or generate a decomposition gas and thereby produce bubbles in the resin molded product.

Examples of processes for producing expansion products include the following processes.

(1) Extrusion Expansion Process

The ethylene copolymer composition (A), (A'), (A") or (A'") is introduced into a hopper of an extruder. When the resin is extruded at a temperature near the melting point of the resin, a physical blowing agent is injected through an injection hole provided midway in the extruder, and the resin is extruded from a mouthpiece of a desired shape to continuously obtain an expanded product. Examples of the physical blowing agents include volatile blowing agents, such as freon, butane, pentane, hexane and cyclohexane; and inorganic gas blowing agents, such as nitrogen, air, water and carbonic acid gas. In the extrusion expansion, a nucleating agent such as calcium carbonate, talc, clay or magnesium oxide may be added.

The physical blowing agent is added in an amount of usually 5 to 60 parts by weight, preferably 10 to 50 parts by weight, based on 100 parts by weight of the composition (A), (A'), (A") or (A'"). If the amount of the physical blowing agent added is too small, expandability of the product is lowered. If the amount thereof is too large, the strength of the expanded product is lowered.

(2) The ethylene copolymer composition (A), (A'), (A") or (A'"), an organic thermal-decomposable blowing agent such as azodicarbonamide, and if desired, other additives and thermoplastic resin are melt kneaded by a kneading device such as a single-screw extruder, a twin-screw extruder, a Banbury mixer, a kneader mixer or a roll at a temperature lower than the decomposition temperature of the thermal-decomposable blowing agent to prepare an expandable resin composition. The composition is generally molded into a sheet, and the sheet is heated at a temperature not lower than the decomposition temperature of the blowing agent to perform expanding, whereby an expanded product is obtained.

The organic thermal-decomposable blowing agent is added in an amount of usually 1 to 50 parts by weight, preferably 4 to 25 parts by weight, based on 100 parts by weight of the composition (A), (A'), (A") or (A'"). If the amount of the organic thermal-decomposable blowing agent added is too small, expandability of the product is lowered. If the amount thereof is too large, the strength of the expanded product is lowered.

(3) Expansion Process in Pressure Vessel

The ethylene copolymer composition (A), (A'), (A") or (A'") is molded into a sheet or a block by means of a press or an extruder, and the molded product is introduced into an pressure vessel. After a physical blowing agent is sufficiently melted in the resin, the pressure vessel is evacuated to obtain an expanded product. It is also possible that the pressure vessel to which the molded product has been introduced is filled with the physical blowing agent at room temperature, then the vessel is pressurized and evacuated, and thereafter the molded product is taken out and heated in an oil bath, an oven or the like to perform expanding.

If the ethylene copolymer composition (A), (A'), (A") or (A'") is previously crosslinked, a crosslinked expanded product can be obtained.

Examples of crosslinking methods include a method wherein a peroxide radical generator mixed with the resin is thermally decomposed to crosslink the resin, a method of crosslinking by irradiation with ionizing radiation, a method of crosslinking by irradiation with ionizing radiation in the presence of a polyfunctional monomer, and a silane crosslinking method.

To obtain a crosslinked expanded product by these methods, the composition (A), (A'), (A") or (A'"), an organic thermal-decomposable blowing agent, a polyfunctional monomer as a crosslinking assistant and other additives are melt kneaded at a temperature lower than the decomposition temperature of the thermal-decomposable blowing agent and molded into a sheet. The resulting expandable resin composition sheet is irradiated with ionizing radiation at a given dose to crosslink the composition (A), (A'), (A") or (A'"). Then, the crosslinked sheet is heated to a temperature not lower than the decomposition temperature of the blowing agent to expand the sheet. As the ionizing radiation, α rays, β rays, γ rays, electron rays and the like are employable. Instead of the irradiation crosslinking with the ionizing radiation, peroxide crosslinking or silane crosslinking can be carried out.

In the present invention, to the composition (A), (A'), (A") or (A'"), additives, such as weathering stabilizer, heat stabilizer, anti-slip agent, anti-blocking agent, anti-fogging agent, lubricant, pigment, dye, nucleating agent, plasticizer, anti-aging agent, hydrochloric acid absorbent and antioxidant, may be optionally added in amounts not detrimental to the objects of the invention. Further, other polymers can be blended in small amounts, without departing from the spirit of the present invention.

The expanded product has excellent flexibility and toughness.

Foam Structure

The foam structure comprises the ethylene copolymer composition (A), (A'), (A") or (A'").

A blend of the ethylene copolymer composition (A), (A'), (A") or (A'") and another suitable ethylene polymer or another natural or synthetic polymer can be employed. Examples of the other suitable ethylene polymers include low-density polyethylene (LDPE), medium-density polyethylene (MDPE), high-density polyethylene (HDPE) (prepared by the use of Ziegler catalyst as described in, for example, U.S. Pat. No. 4,076,698), ethylene/vinyl acetate copolymer, copolymers of ethylene and unsaturated carboxylic acids, and homo and copolymers of α-olefins. Other suitable polymers include polystyrene (including impact-resistant polystyrene), styrene/butadiene block copolymer, polyisoprene and other rubbers. A blend containing a resin of high melting point in a major proportion is preferable. The composition (A), (A'), (A") or (A'") or a blend containing the composition (A), (A'), (A") or (A'") is referred to as an "ethylene polymer material".

The ethylene polymer material contains ethylene monomer units in amounts of preferably not less than 50% by weight, more preferably not less than 70% by weight, independent of its composition. The ethylene polymer material may consist of ethylene monomer units completely or as a whole. A preferable blend comprises the ethylene copolymer composition (A), (A'), (A") or (A'") and another ordinary ethylene polymer, e.g., LDPE, HDPE, ethylene/acrylic acid copolymer (EAA) or LLDPE.

To the ethylene copolymer composition (A), (A'), (A") or (A'"), additives, such as antioxidant (e.g., hindered phenols (Irganox (trade name) 1010), phosphites (e.g., Irgafos (trade name) 168) and pigment, can be added in amounts not detrimental to the improved properties found by the present applicant.

Excellent teaching on the process for producing the foam structure or the method for processing the foam structure is found in "Handbook of Polymer Foams and Technology" (edited by D. Klempner and K. C. Frisch, Hanser Publishers, Munich, Vienna, New York, Barcelona (1991)) of C. P. Park "Polyolefin Foam" Chapter 9.

The foam structure can be produced by a conventional extrusion expansion method. The structure can be generally produced by a process comprising the steps of heating the ethylene polymer material to give a plasticized or molten polymer material, introducing a blowing agent into the polymer material to form a foamable gel, and extruding the gel through a die to obtain a foam product. Prior to blending with the blowing agent, the polymer material is heated to a temperature not lower than the glass transition temperature or the melting point of the polymer material. Introduction of the blowing agent into the polymer material and blending them can be carried out by any conventional means such as an extruder, a mixing machine or a blender. The blowing agent is blended with the molten polymer material under pressure high enough for inhibiting substantial foaming of the molten polymer material and for substantially homogeneously dispersing the blowing agent. If necessary, a nucleating agent may be blended with the molten polymer or may be dry blended with the polymer material prior to plasticization or melting. The foamable gel is generally cooled to a lower temperature to optimize properties of the resulting foam structure. Thereafter, the gel is extruded into a zone of lower pressure through a die of desired shape to produce a foam structure, or is transported. The pressure in the lower pressure zone is lower than the pressure which is maintained before the foamable gel is extruded through the die. This pressure may be higher than atmospheric pressure or lower than that (vacuum), but preferably is on the level with atmospheric pressure.

This structure may be processed in the form of aggregated strands by extrusion of the ethylene polymer material through a multi-orifice die. The orifices are arranged in such a manner that contact between the adjoining streams of the molten extrudate takes place during the course of foaming and that the contact surfaces have adhesion high enough for adhering to one another and for forming a united foam structure. The streams of the molten extrudate from the die are each in the form of strand or profile, and it is desirable that they are foamed, aggregated and bonded to one another to form a united one structure. The strands or the profiles should be in the form of a united one body so that the strands are not separated by the stress given when a foam is produced, shaped and used. A process and an apparatus for producing a foam structure in the form of aggregated strands are found in U.S. Pat. Nos. 3,573,152 and No. 4,824,720.

The foam structure may be produced by a cumulative extrusion process as shown in U.S. Pat. No. 4,323,528. In this process, the low-density foam structure having a large side sectional area is produced in the following manner. (1) A gel of the ethylene polymer material and the blowing agent is formed under pressure. The formation of the gel is carried out at such a temperature that the gel has a viscosity enough for holding the blowing agent during the foaming. (2) The gel is extruded to a holding zone whose pressure and temperature are maintained so that the gel is not foamed. The holding zone has an outlet die surrounding an orifice to feed the gel to a zone of lower pressure for foaming of the gel, and has a gate which closes the die orifice and can be opened. (3) The gate is periodically opened. (4) A mechanical pressure is applied to the gel substantially at the same time by means of a movable ram, and the gel is discharged from the holding zone to a zone of lower pressure through die orifice. The discharge of gel is carried out at a rate higher than the rate at which substantial foaming takes place in the die orifice and lower than the rate at which substantial irregularity in the sectional area or the shape is produced. (5) The gel discharged is foamed without restricting to one-directional foaming, to produce a foam structure.

The foam structure can be processed into uncrosslinked foam beads suitable for producing an article. In order to produce foam beads, the resin particles separated from one another, such as particulate resin pellets, are suspended in a liquid medium in which the resin is substantially insoluble, such as water. Then, a blowing agent is introduced into the liquid medium in an autoclave or another pressure vessel at high temperature and high pressure to impregnate the resin particles with the blowing agent, and the resin particles are rapidly discharged into the air or a vacuum zone to produce foam beads. The process is sufficiently taught in U.S. Pat. Nos. 4,379,859 and 4,464,484.

In a process derived from the above process, prior to impregnation with the blowing agent, the suspended pellets may be impregnated with a styrene monomer so as to produce a graft copolymer together with the ethylene polymer material. The polyethylene/polystyrene copolymer beads are cooled and discharged from the container without being substantially foamed. The beads are then foamed and molded in accordance with a conventional process for the production of foam polystyrene. The process for the production of polyethylene/polystyrene copolymer beads is described in U.S. Pat. No. 4,168,353.

The foam beads may be molded by any means known in this technical field. For example, the foam beads are filled in a mold and then heated with steam or the like to aggregate and melt them so as to produce an article. If necessary, the beads may be impregnated with air or another blowing agent at high temperature and high pressure before they are filled in the mold. Further, the beads can be heated before they are filled in the mold. Then, the foam beads can be formed into a block or a shaped article by an appropriate method known in this technical field. Some of the methods are described in U.S. Pat. Nos. 3,504,068 and No. 3,953,558. Excellent teaching on the above process and the forming method can be found in the aforesaid publication by C. P. Park, p. 191, pp. 197–198 and pp. 227–229.

The blowing agents useful for the production of the foam structure include inorganic blowing agents, organic blowing agents and decomposable chemical agents. Suitable examples of the inorganic blowing agents include carbon dioxide, nitrogen, argon, water, air, nitrogen and helium. Examples of the organic blowing agents include aliphatic hydrocarbons having 1 to 6 carbon atoms, fatty alcohols having 1 to 3 carbon atoms and completely or partially halogenated aliphatic hydrocarbons having 1 to 4 carbon atoms. Examples of the aliphatic hydrocarbons include methane, ethane, propane, n-butane, isobutane, n-pentane, isopentane and neopentane. Examples of the fatty alcohols include methanol, ethanol, n-propanol and isopropanol. Examples of the completely or partially halogenated aliphatic hydrocarbons include fluorocarbons, chlorocarbons and chlorofluorocarbons. Examples of the fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane, 2,2-difluoropropane, 1,1,1-trifluoropropane, perfluoropropane, dichloropropane, difluoropropane, perfluorobutane and perfluorocyclobutane. Examples of the partially halogenated chlorocarbons and chlorofluorocarbons for use in the invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Examples of the completely halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane and dichlorohexafluoropropane. Examples of the chemical blowing agents include azodicarbonamide, azodiisobutyronitrile, benzenesulfonhydrazide, 4,4-oxybenzenesulfonylsemicarbazide, p-toluenesulfonylsemicarbazide, barium azodicarboxylate, N,N'-dimethyl-dinitrosoterephthalamide and trihydrazinotriazine. Preferable blowing agents include isobutane, HFC-152a and mixtures thereof.

The amount of the blowing agent introduced into the molten polymer material to produce the foam-forming gel is in the range of 0.2 to 5.0 g.mol/kg-polymer, preferably 0.5 to 3.0 g.mol/kg-polymer, more preferably 1.0 to 2.50 g.mol/kg-polymer.

Various additives, such as stability controlling agent, nucleating agent, inorganic filler, pigment, antioxidant, acid scavenger, ultraviolet light absorber, flame retardant, processing aid and extrusion aid, may be incorporated into the foam structure.

The stability controlling agent may be added to the foam structure to improve dimensional stability. Preferred stability controlling agents include amides and esters of C10–C24 fatty acids. Such stability controlling agents are found in U.S. Pat. Nos. 3,644,230 and 4,214,054. Most preferred stability controlling agents include stearyl stearamide, glycerol monostearate, glycerol monobehenate and sorbitol monostearate. The stability controlling agent is generally used in an amount of about 0.1 to 10 parts based on 100 parts of the polymer.

The foam structure exhibits excellent dimensional stability. The preferred foam has a recovery of up to 80% or more based on the initial volume. The initial volume is measured in 30 seconds after foaming. The volume is measured by an appropriate method such as water volume displacement.

The nucleating agent may be added to control bubble size in the foam. Preferred nucleating agents include inorganic materials, such as calcium carbonate, talc, clay, titanium dioxide, silica, barium sulfate, diatomaceous earth, a mixture of citric acid and sodium bicarbonate. The amount of the nucleating agent used may be in the range of about 0.01 to 5 parts by weight based on 100 parts by weight of the polymer resin.

The foam structure is substantially uncrosslinked or non-crosslinked. The alkenyl aromatic polymer material contained in the foam structure is not crosslinked substantially. The foam structure contains a gel of not more than 5% measured by the method A of ASTM D-2765-84. Some degree of crosslinking which spontaneously occurs without using any crosslinking agent or radiation is permissible.

The foam structure has a density of less than 250 kg/cm$^3$, more preferably less than 100 kg/cm$^3$, most preferably 10 to less than 70 kg/cm$^3$. The foam has an average bubble size, as measured by ASTM D3576, of 0.05 to 5.0 mm, more preferably 0.2 to 2.0 mm, most preferably 0.3 to 1.8 mm.

The foam structure may be in any physical shape known in this art, such as extruded sheet, rod, board and profile. The foam structure may be produced by molding the foamable beads into any of the above shapes or other shapes.

The foam structure may be a closed-cell foam structure or an open-cell foam structure. The foam structure preferably contains closed cells in amounts of not less than 80% when measured by ASTM D2856-A.

The foam structure that is more tough and more elastic is very useful for sporting goods, goods for leisure time amusement, and cushioning packaging.

Expanded Structure

The expanded structure comprises the ethylene copolymer composition (A), (A'), (A") or (A'"), and has toughness, elasticity and low density.

The structure of the invention has heat stability higher than that of EVA expanded structure, and generates no offensive odor during the expansion process, production process and uses. The crosslinked expanded structure having softness and toughness is useful for sporting goods, medical devices and cushioning goods.

For producing the expanded structure, a blend of the ethylene copolymer composition (A), (A'), (A") or (A'") and a suitable, different ethylene polymer or another natural or synthetic polymer can be employed. Examples of the suitable, different ethylene polymers include low-density polyethylene (LDPE, e.g., polyethylene prepared by high-pressure, free radical polymerization technique), medium-density polyethylene (MDPE), high-density polyethylene (HDPE, e.g., polyethylene prepared by the use of such a Ziegler catalyst as described in U.S. Pat. No. 4,076,698), ethylene/ester copolymers, ethylene/vinyl acetate copolymer, copolymers of ethylene and ethylenically unsaturated carboxylic acids, and homopolymers or copolymers of α-ethylenic substances. Other suitable polymers include polystyrene (including high-impact polystyrene), styrene/butadiene block copolymer, polyisoprene and other rubbers. A blend containing a resin of high melting point in a major proportion is preferable. The ethylene polymer material contains ethylene monomer units in amounts of preferably not less than 50% by weight, more preferably not less than 70% by weight, independent of its composition. The ethylene polymer material may consist of ethylenic monomer units completely. A preferable blend is a blend of the ethylene copolymer composition (A), (A'), (A") or (A'") and another ordinary ethylene polymer, e.g., LDPE, HDPE, ethylene/acrylic acid copolymer (EAA) or LLDPE.

The expanded structure may take any physical form known in this technical field. For example, the structure can be in the form of a sheet, a plank or a burn stock. Other useful expanded structures are expandable or foamable particles, moldable expandable particles, beads and products produced by expanding and/or bonding and welding of the beads.

Excellent teaching on the process for producing the expanded structure or the method for processing the expanded structure is found in "Handbook of Polymer Foams and Technology" (edited by D. Klempner and K. C. Frisch, Hanser Publishers, Munich, Vienna, New York, Barcelona (1991)) of C. P. Park "Polyolefin Foam" Chapter 9.

The expanded structure of the invention can be produced by a process comprising the steps of blending the ethylene copolymer composition (A), (A'), (A") or (A'") with a decomposable chemical blowing agent, heating them to prepare a plasticized or molten expandable polymer material, extruding the expandable molten polymer material which contains a crosslinking agent, and exposing the polymer material to temperature rise to release the blowing agent and thereby produce an expanded structure. The polymer material and the chemical blowing agent can be mixed and melt blended by a means known in the art, such as an extruder, a mixer or a blender. The chemical blowing agent is preferably dry blended with the polymer material before heating of the polymer material to melt it, but the blowing agent can be added when the polymer material is in a molten phase. The crosslinking can be induced by addition of a crosslinking agent or irradiation with radiation. The inducement of the crosslinking and the exposure to temperature rise for expansion or foaming can be carried out simultaneously or successively. When the crosslinking agent is used, it is added to the polymer material similarly to the chemical blowing agent. When the crosslinking agent is used, the expandable molten polymer material is heated or exposed to a temperature of preferably lower than 150° C. to prevent decomposition of the crosslinking agent or the blowing agent and to inhibit too early crosslinking. In case of the radiation crosslinking, the expandable polymer material is heated or exposed to a temperature of preferably lower than 160° C. to prevent decomposition of the blowing agent. The expandable molten polymer material is extruded through a die of desired shape to prepare an expandable structure. The expandable structure is then crosslinked at a high temperature (typically 150 to 250° C.) such as a temperature in an oven to expand the structure. In case of the radiation crosslinking, the expandable structure is irradiated with radiation to crosslink the polymer and then expanded by the above-mentioned temperature rise. The structure of the invention can be advantageously processed into a sheet or a thin plate by the use of any of the above-mentioned crosslinking agent or radiation.

The expanded structure of the invention can be in the form of a continuous thin plate prepared by an extrusion process using such a long land die as described in GB2,145,961A. In this process, the polymer, the crosslinking agent and the blowing agent are mixed in an extruder, the mixture is heated to crosslink the polymer and to foam the blowing agent in the long land die, and the mixture is passed through the die to produce an expanded structure. The contact between the expanded structure and the die is carried out by the use of an appropriate lubricant.

The expanded structure of the invention can be in the form of crosslinked expanded beads suitable for producing an article. The expanded beads can be prepared in the following manner. The resin particles separated from one another, such as particulate resin pellets, are suspended in a liquid in which the resin pellets are substantially insoluble, such as water. Then, the pellets are impregnated with a crosslinking agent and a blowing agent in an autoclave or another pressure vessel at high temperature and high pressure, and the resin particles are rapidly discharged into the air or a vacuum zone to produce expanded beads. The polymer beads are impregnated with the blowing agent, then cooled, discharged from the container and expanded by heating or using steam. In a process induced from the above process, the suspended pellets may be impregnated with a styrene monomer so as to produce a graft copolymer together with the ethylene polymer material. The resin pellets in the suspended state or non-aqueous state may be impregnated with a blowing agent. The expandable beads are then expanded by heating with steam and molded into expanded polystyrene beads in accordance with a conventional process.

The expanded beads may be molded by any means known in the art. For example, the expanded beads are filled in a mold, compressed by compression molding, and then heated with steam or the like to aggregate and weld them so as to produce an article. The beads may be optionally preheated with air or another blowing agent before they are filled in the mold. Excellent teaching on the above process and the molding method can be found in the aforesaid publication by C. P. Park, pp. 227–233, U.S. Pat. Nos. 3,886,100, 3,959, 189, 4,168,353 and 4,429,059. The expanded beads can be also produced by preparing a mixture of the polymer, a crosslinking agent and a decomposable blowing agent by an appropriate mixing device or an extruder, then molding the mixture into pellets and heating the pellets to crosslink and expand them.

There is another process for producing crosslinked, expanded beads suitable for producing an article. The ethylene polymer material is melted and mixed with a physical blowing agent by an ordinary extruder to prepare substantially continuous expanded strands. The expanded strands are granulated or pelletized to give expanded beads. The expanded beads are then crosslinked by irradiation with radiation. The crosslinked, expanded beads are then bonded and molded into various articles as previously described with respect to other methods. Additional teaching can be found in U.S. Pat. No. 3,616,365 and the aforesaid publication by C. P. Park, pp. 224–228.

The expanded structure of the invention can be produced in the form of a burn stock by different two processes. One process uses a crosslinking agent, and the other process uses radiation.

The expanded structure of the invention can be produced in the form of a burn stock by a process comprising mixing the ethylene copolymer composition (A), (A'), (A") or (A''') with a crosslinking agent and a chemical blowing agent to prepare a slab, heating the slab of the mixture to crosslink the polymer material by the crosslinking agent and to decompose the blowing agent, and releasing the pressure from the mold to expand the slab. The burn stock produced by the release of pressure may be optionally heated again to perform further expansion.

A crosslinked polymer sheet can be produced by irradiating a polymer sheet with high-energy beam or by heating a polymer sheet containing a chemical crosslinking agent. The crosslinked polymer sheet is cut into a desired shape and impregnated with nitrogen of high pressure at a temperature of not lower than the softening point of the polymer. Then, the pressure is released to form nuclei of bubbles in the sheet and to perform some degree of expanding. The sheet is heated again at low pressure and a temperature not lower than the softening point of the polymer. Then, the pressure is released to expand the sheet and thereby produce an expanded product.

The blowing agent useful for producing the expanded structure of the invention is, for example, a decomposable chemical blowing agent. The chemical blowing agent is decomposed at a high temperature to generate gas or steam, and thereby the polymer is expanded to produce an expanded product. The chemical blowing agent is preferably in the form of a solid so as be easily dry blended with the polymer material.

Examples of the chemical blowing agents include azodicarbonamide, azodiisobutyronitrile, benzenesulfohydrazide, 4,4-oxybenzenesulfonylsemicarbazide, p-toluenesulfonylsemicarbazide, barium azodicarboxylate, N,N'-dimethyl-N,N'-dinitrosoterephthalamide, N,N'-dinitrosopentamethylenetetramine, 4,4-oxybis (benzenesulfonylhydrazide) and trihydrazinotriazine. Preferable is azodicarbonamide.

Additional teaching on the chemical blowing agents is found in the aforesaid publication (pp. 205–208) by C. P. Park, "Polyolefin Foam" by F. A. Shutob, and "Handbook of Polymer Foams and Technology" (by D. Klempner and K. C. Frisch, Hanser Publishers, Munich, Vienna, New York, Barcelona (1991)).

In the blending with the polymer material, the chemical blowing agent is used in an amount enough for generating gas or steam of 0.2 to 5.0 mol, preferably 0.5 to 3.0 mol, most preferably 1.2 to 2.50 mol.

The crosslinking agent useful for the production of the expanded structure of the invention is a peroxide. Examples of the peroxides include 1,1-di-t-butylperoxy-3,3,5-trimethylcyclohexane, dicumyl peroxide, 2,5-dimethyl-2,5-di(t-butylperoxy)hexane, 1-butylcunyl peroxide, α,α'-di (butylperoxy)disopropylbenzene, di-t-butyl peroxide and 2,5-dimethyl-2,5-di-(t-butylperoxy)hexane. Preferable is dicumyl peroxide. Additional teaching on the organic peroxide crosslinking agents is found in the aforesaid publication (pp. 198–204) by C. P. Park.

The crosslinking with the radiation can be carried out by the use of any of conventional radiations. Examples of useful radiations include electron beam, β rays, γ rays, X rays and neutron. In the radiation crosslinking, it is believed that polymer groups are produced by irradiation with radiation and the groups are crosslinked to one another. Additional teaching on the radiation crosslinking is found in the aforesaid publication (pp. 198–204) by C. P. Park.

In some processes for producing expanded structures of the invention, physical blowing agents can be employed. The physical blowing agents include organic blowing agents and inorganic blowing agents. Preferred examples of the inorganic blowing agents include carbon dioxide, nitrogen, argon, water, air and helium. Examples of the organic blowing agents include aliphatic hydrocarbons having 1 to 9 carbon atoms, fatty alcohols having 1 to 3 carbon atoms and completely or partially halogenated hydrocarbons having 1 to 4 carbon atoms. Examples of the aliphatic hydrocarbons include methane, ethane, propane, n-butane, isobutane, n-pentane, isopentane and neopentane. Examples of the fatty alcohols include methanol, ethanol, n-propanol and isopropanol. Examples of the completely or partially halogenated aliphatic hydrocarbons include fluorocarbons, chlorocarbons and chlorofluorocarbons. Examples of the fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane and perfluorocyclobutane. Examples of the partially halogenated chlorocarbons and chlorofluorocarbons for use in the invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Examples of the completely halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane and dichlorohexafluoropropane.

The amount of the blowing agent added to the molten polymer material for preparing the expandable polymer gel is in the range of 0.2 to 5.0 mol/kg-polymer, preferably 0.5 to 3.0 mol/kg-polymer, more preferably 1.0 to 2.50 mol/kg-polymer.

The expanded structure of the invention has a crosslink density, as measured by the method A of ASTM D-2765-84, of 5 to 90%, more preferably 30 to 70%.

The expanded structure of the invention has a density of less than 500 kg/m$^3$, more preferably less than 250 kg/m$^3$, most preferably less than 150 kg/m$^3$. The expanded structure has an average pore diameter, as measured by ASTM D3576, of 0.05 to 5.0 ml, more preferably 1.0 to 2.0 ml, most preferably 0.2 to 1.0 ml.

The expanded structure of the invention can be a closed-cell structure or an open-cell structure. The expanded structure of the invention preferably contains closed cells in amounts of more than 90% when measured by ASTM D 2856-A.

Into the expanded structure of the invention, various additives can be incorporated. Examples of the additives include inorganic filler, stability controlling agent, nucleating agent, colorant, antioxidant, acid scavenger, ultraviolet light absorber, flame retardant, processing aid and extrusion aid.

Gasket

The gasket comprises the ethylene copolymer composition (A), (A'), (A") or (A'''). The gasket has an ability of compression sealing of various containers without contaminating the contents. The novel gasket material disclosed in this specification is of benefit particularly to containers for liquids.

Some gaskets need to resist temperatures higher than room temperature (about 25° C.), though for a short period of time, especially when they are used for "hot fill". For example, if an article is required to be subjected to sterilization, a gasket having a melting point of not lower than 100° C. must be fit to the article. Therefore, a polymer suitable for the use application can be selected by selecting a density appropriate for the environment where the gasket is used.

The gasket can be produced by combining other polymers with a useful amount of the ethylene copolymer composition (A), (A'), (A") or (A''') according to the final use properties required. The other polymers are thermoplastic polymers (i.e., melt-processable polymers), and examples thereof include polymers such as highly branched low-density polyethylene, ununiformly branched linear low-density polyethylene, ethylene vinyl acetate copolymers and ethylene/acrylic acid copolymers.

Although the gasket produced from the ethylene copolymer composition (A), (A'), (A") or (A''') must have hardness high enough for resisting compression, it must have softness high enough for forming an appropriate seal. Therefore, if the polymer is made to have hardness suitable for the use, various gaskets can be produced. In the present specification, the hardness is measured as "Shore A hardness" or "Shore D hardness" (measured in accordance with ASTM D-2240). The Shore A harness of the ethylene copolymer composition (A), (A'), (A") or (A''') for producing the gasket is in the range of 70 to 100, even when a petroleum oil, which is generally added for the purpose of lowering the hardness of the used polymer and the resulting gasket, is not used.

To the ethylene copolymer composition (A), (A'), (A") or (A'''), additives, such as antioxidant, phosphites, cling additives (e.g., PIB), slip agent (e.g., erucamide), anti-blocking agent and pigment, can be added in amounts not detrimental to the improved properties found by the present applicants.

The gaskets may be in various shapes including "o-ring" and flat seal (e.g., "film-like" gasket having a thickness suitable for the intended use).

Examples of suitable final uses include cap liner for beverage, cap liner for hot fill juice, polypropylene cap liner, metal cap liner, high-density polyethylene cap liner, gasket for window glass, sealed container, sealing cap, gasket for medical device, filter element, gasket for pressure exhaust, hot melt gasket, easy twist off cap, gasket for electrochemical battery, gasket for refrigerator, gasket of galvanic cell, gasket for leakproof cell, water-proof sheet, reusable gasket, synthetic cork-like material, thin cell electronic membrane separator, magnetic rubber material, disc gasket for alcohol beverage bottle cap, freeze-resistant seal ring, gasket for plastic molding, expansion joint, water st op, corrosion-resistant pipe joint, soft magnetic plastic, pipe joint seal, integral weather-resistant plastic cap, electric power hinge, magnetic faced foamed article, jar ring, soft gasket, glass seal, sealing liner for tamper proof, pressure applicator, integral structure of bottle cap and straw, large-sized seasoning bottle liner, metal cap for apple sauce or salsa jar, jar for home use can, and crown cap.

The gasket produced from the ethylene copolymer composition (A), (A'), (A") or (A''') has a number of advantages especially when it is used for foods. For example, there can be mentioned the following advantages: taste and odor are more improved as compared with the case of polymer gaskets generally used at present, such as gaskets of ethylene/vinyl acetate copolymers; adhesion to polar substrates such as polyethylene terephthalate and glass is low, and this is effective for lowering torque to remove the cap from the sealed container; the amount of the extrudate is small, and this is effective for foods from the viewpoint of observance of rules; adhesion to non-polar substrates such as polypropylene and high-density polyethylene (e.g., polyethylene (linear homopolymer) or linear ununiformed high-density polyethylene) is good; barrier properties to oxygen, carbon dioxide and water are satisfactory; the melting point is higher as compared with the polymers generally used at present, such as ethylene/vinyl acetate copolymers; stress crack resistance is good; chemical resistance is good; and hardness can be changed, and this is effective for such a case that the hardness of the gasket needs to be raised or lowered depending upon the torque required for sealing of the container and the internal pressure of the container.

Various techniques for producing the gaskets include those disclosed in U.S. Pat. No. 5,215,587 (McConnellogue et al.), U.S. Pat. No. 4.085,186 (Rainer), U.S. Pat. No. 4,619,848 (Kinght et al.), U.S. Pat. No. 5,104,710 (Kinght), U.S. Pat. No. 4,981,231 (Kinght), U.S. Pat. No. 4,717,034 (Mumford), U.S. Pat. No. 3,786,954 (Shull), U.S. Pat. No. 3,779,965 (Lefforge et al.), U.S. Pat. No. 3,493,453 (Ceresa et al.), U.S. Pat. No. 3,183,144 (Caviglia), U.S. Pat. No. 3,300,072 (Caviglia), U.S. Pat. No. 4,984,703 (Burzynski), U.S. Pat. No. 3,414,938 (Caviglia), U.S. Pat. No. 4,939,859 (Bayer), U.S. Pat. No. 5,137,164 (Bayer) and U.S. Pat. No. 5,000,992 (Kelch).

The gasket claimed in the present specification can be also produced by pouching or cutting an extruded sheet or film (e.g., blown film, cast film and extrusion coated film) using ordinary technique. A multi-layer film structure is also suitable for producing the gasket disclosed herein, and the ethylene copolymer composition (A), (A'), (A") or (A''') is contained in at least one layer (preferably inside layer to be brought into contact with the article) of the multi-layer structure. A foam multi-layer gasket containing the ethylene copolymer composition (A), (A'), (A") or (A''') is also useful in the present invention.

Extruded Article

The extruded articles include extrusion coated articles, articles in the form of extruded profile and extrusion cast films, and they comprise the ethylene copolymer composition (A), (A'), (A") or (A''').

It is possible to blend the ethylene copolymer composition (A), (A'), (A") or (A''') with other polymer materials. By the use of the blend, a single-layer or multi-layer article can be produced. Further, a structure (e.g., a sealant), an adhesive layer or a tie layer can be formed. For the purpose of modifying processability, film strength, heat sealing properties or adhesion properties, the ethylene copolymer composition (A), (A'), (A") or (A''') can be blended with other polymers.

The ethylene copolymer composition (A), (A'), (A") or (A''') can be used after chemically and/or physically modified. The modification can be achieved by any known technique, for example, ionomerization and extrusion graft modification.

In the present specification, the term "drawdown" is defined to have a meaning that the molten polymer extrudate (web or filament) is drawn or stretched in the machine direction or sometimes in the transverse direction (at the same time, though at a low level).

In the present specification, the term "neck-in" is defined as a difference between the die width and the width of the extrudate at the take-off position or the final width of the article. The neck-in is influenced by the expansion of the extruded article and the surface tension thereof, though the influence of the surface tension is small. It is well known that the measured neck-in value (at constant output) is constant even if the drawdown rate is increased or the neck-in value is lowered with increase of the drawdown rate, and that the neck-in value of ordinary ethylene polymers is generally increased as the molecular weight is lowered and/or as the molecular weight distribution is narrowed.

To the ethylene copolymer composition (A), (A'), (A") or (A'''), additives, such as antioxidant, phosphites, cling additives (e.g., PIB), Standostab PEPQ (trade name, available from Sandoz), pigment, colorant and filler, can be added in amounts not detrimental to the high drawdown and the substantially lowered neck-in found by the present applicants. Further, additives to improve anti-blocking properties and friction coefficient characteristics can be added to the ethylene copolymer composition (A), (A'), (A") or (A'''). Examples of such additives include untreated or treated silicon dioxide, talc, calcium carbonate and clay, as well as primary, secondary or substituted fatty acid amides, without limiting thereto. It is also possible to add release agents for cooling rolls and silicone coating agents. Furthermore, other additives to improve anti-fogging properties of transparent cast films can be also added, as described by, for example, Niemann in U.S. Pat. No. 4,486,552. Moreover, other additives such as quaternary ammonium compounds, which improve antistatic properties of the layer, profile and film of the invention and make it possible to package articles sensitive to electrons or to produce them, can be added singly or in combination with ethylene/acrylic acid (EAA) copolymers or other functional polymers.

The multi-layer structure containing the ethylene copolymer composition (A), (A'), (A") or (A''') may be produced by any known means such as extrusion, laminating and a combination thereof. The ethylene copolymer composition (A), (A'), (A") or (A''') is employable also in a coextrusion process, and in this case, a material exhibiting higher drawdown is allowed to substantially "support" one or more materials exhibiting lower drawdown.

The ethylene copolymer composition (A), (A'), (A") or (A''') can be used for the production of extruded films, extruded profiles and extrusion cast films independent of the single-layer structure or the multi-layer structure. When the ethylene copolymer composition (A), (A'), (A") or (A''') is used for the coating purpose or the purpose of forming a multi-layer structure, the substrate or the adjoining layer may be polar or non-polar. Examples of the substrates include paper products, metals, ceramics, glass, various polymers (particularly, different polyolefins) and combinations thereof, without limiting thereto. The extruded profiles can be processed into various articles, and examples of the articles include gasket for refrigerator, jacket for wire and cable, wire coating, tubular material for medical use and water pipe, without limiting thereto. The extrusion cast films produced by the use of the ethylene copolymer composition (A), (A'), (A") or (A''') are employable for food wrapping and industrial stretch wrapping.

Pipe

The pipe comprises a silane-modified product of the ethylene copolymer composition (A), (A'), (A") or (A''').

The silane-modified product can be prepared by adding a radical generator and a silane compound to the composition (A), (A'), (A") or (A'''), mixing them by an appropriate mixing machine such as Henschel mixer, and kneading the mixture under heating at about 140 to 250° C. to perform thermal grafting.

The radical generator for use in the silane modification is preferably 2,5-dimethyl-2,5-bis(t-butylperoxy)hexane, 2,5-dimethyl-2,5-di(t-butylperoxy)hexyne-3 or the like.

The silane compound for use in the silane modification is preferably a silane compound having organic groups capable of being hydrolyzed, such as a terminal vinyl group and an alkoxy group, and the silane compound is particularly preferably vinyltrimethoxysilane, vinyltriethoxysilane or the like.

The pipe is obtained by crosslinking a molded product of the silane-modified product of the composition (A), (A'), (A") or (A'"). To the molded product, a silanol condensation catalyst is added, and the molded product is formed into a pipe generally using a pipe forming machine.

As the silanol condensation catalyst, a conventional compound generally used as a catalyst for accelerating dehydration condensation between silanol groups is employable. It is possible that the silanol condensation catalyst and an unmodified linear polyethylene are used to prepare a master batch, then the master batch is dry blended with a silane-modified linear polyethylene by a mixing machine such as Henschel mixer or V-type blender, and the blend is molded into a pipe.

The pipe produced as above is generally brought into contact with moisture in water, water vapor or an atmosphere of high humidity at about room temperature to 130° C. for about 1 minute to 1 week, whereby silane crosslinking reaction proceeds owing to the silanol catalyst, and a crosslinked pipe is obtained.

To the pipe, additives, such as heat stabilizer, anti-aging agent, weathering stabilizer, hydrochloric acid absorbent, lubricant including internal and external lubricants, organic or inorganic pigment, carbon black, flame retardant, antistatic agent and filler, can be added.

Injection Molded Product

The injection molded product is obtained by injection molding the ethylene copolymer composition (A), (A'), (A") or (A'"). The injection molded product can be produced by the use of a conventional injection molding machine. As the molding conditions, those hitherto known are adoptable.

The injection molded product is excellent in heat resistance and resistance to environmental stress rupture.

Electric Wire Sheath

The electric wire sheath is a sheath (sheath of outermost layer) to protect wire or cable.

The electric wire sheath is produced from the ethylene copolymer composition (A), (A'), (A") or (A'"), and if necessary, hitherto known additives such as heat stabilizer, weathering stabilizer, carbon black, pigment, flame retardant and anti-aging agent.

The electric wire sheath has a 50% crack initiation time ($F_{50}$, ASTM D 1698) of not less than 600 hours, an abrasion wear, as measured by a Taber abrasion test (JIS K 7204, load of 1 kg, truck wheel of CS-17, 60 rpm, 1,000 times), of not more than 10 mg, and an Izod impact strength (ASTM D 256, notched, measured at −40° C.) of not less than 40 $J/m^2$.

The electric wire sheath can be produced by a conventional extrusion coating process using the ethylene copolymer composition (A), (A'), (A") or (A'").

The electric wire sheath has stress crack resistance, abrasion resistance and low-temperature impact resistance.

The ethylene copolymer composition (A), (A'), (A") or (A'") can be used in the below-described high drawdown extrusion process.

The high drawdown extrusion process is a process in which the ethylene copolymer composition (A), (A'), (A") or (A'"), or a composition containing the composition (A), (A'), (A") or (A'") (sometimes referred to as "thermoplastic composition" hereinafter) is subjected to extrusion coating on a substrate or to cast film extrusion. The process comprises the steps of:

(i) feeding a thermoplastic composition to at least one extruder, (ii) melt mixing the thermoplastic composition to form at least one polymer flow, and (iii) extruding the molten polymer flow through a die to produce a major web.

The improvements of the above process reside in that:

(i) the extruder is operated at a line rate of not less than 152 m/min, whereby (a) the web is drawn down on the substrate to coat the substrate with at least one layer of the thermoplastic composition, or (b) the web is cooled and drawn down on a take-off device to form at least one layer of the thermoplastic composition and thereby produce the film; and (ii) in the subsequent use, the substrate thus coated or the film is transported or put together.

By the use of the present invention, lower neck-in, higher drawdown and higher resistance to draw resonance (phenomenon of unstable melt flow) than those obtained by the use of ethylene polymers prepared using conventional Ziegler catalyst can be obtained.

In the present specification, the term "drawdown" is defined to have a meaning that the molten polymer extrudate (web or filament) is drawn or stretched in the machine direction or sometimes in the transverse direction (at the same time, though at a low level).

In the present specification, the term "neck-in" is defined as a difference between the die width and the web width at the take-off position. The neck-in is influenced by the expansion of the extrudate and the surface tension thereof, though the influence of the surface tension is small. It is well known that the measured neck-in value (at constant output) is constant even if the drawdown rate is increased or the neck-in value is lowered with increase of the drawdown rate, and that the neck-in value of ordinary ethylene polymers is generally increased as the molecular weight is lowered and/or as the molecular weight distribution is narrowed.

In the present invention, to the composition (A), (A'), (A") or (A'"), additives, such as antioxidant, phosphites, cling additives (e.g., PIB), Standostab PEPQ (trade name, available from Sandoz), pigment, colorant and filler, can be added. Further, additives to improve anti-blocking properties and friction coefficient characteristics can be incorporated into the extrusion coated layer or the film. Examples of such additives include untreated or treated silicon dioxide, talc, calcium carbonate and clay as well as primary, secondary or substituted fatty acid amides, release agents for cooling rolls and silicone coating agents, without limiting thereto. Further, other additives to improve anti-fogging properties of transparent cast films can be also added, as described by, for example, Niemann in U.S. Pat. No. 4,486,552. Furthermore, other additives such as quaternary ammonium compounds, which improve antistatic properties of the coated layer and the film of the invention thereby to make it possible to package articles sensitive to electrons, can be added singly or in combination with ethylene/acrylic acid (EAA) copolymers or other functional polymers.

The ethylene copolymer composition (A), (A'), (A") or (A'") used for preparing the composition or the article of the invention is blendable with linear ethylene polymers and/or high-pressure ethylene polymers or is employable as only one resinous polymer component, independent of a single-layer structure or a multi-layer structure of the resulting film or the resulting coated layer. By blending the composition (A), (A'), (A") or (A'") with homopolymers or with homopolymers and other polymers, processability, film strength, heat sealing properties or adhesion properties can be improved.

Some suitable examples of the materials which may be blended with the composition (A), (A'), (A") or (A'") include low-density ethylene polymers such as high-pressure low-density ethylene homopolymer (LDPE), ethylene/vinyl acetate copolymers (EVA), ethylene/carboxylic acid copolymers, ethylene/acrylate copolymers, olefin polymers prepared at low to medium pressure, such as polybutylene (PB) and ethylene/α-olefin polymers (including high-density polyethylene, medium-density polyethylene, polypropylene, ethylene/propylene copolymers, linear low-density polyethylene (LLDPE) and ultra low-density polyethylene), as well as graft modified polymers, and combinations thereof.

Suitable high-pressure ethylene copolymers include copolymers prepared by copolymerizing ethylene and at least one α,β-ethylene unsaturated comonomer (e.g., acrylic acid, methacrylic acid or vinyl acetate), as described by McKinney in U.S. Pat. No. 4,599,392. In the suitable high-pressure ethylene copolymers, comonomers are contained in the total amounts of 0.1 to 55% by weight, more preferably 1 to 35% by weight, most preferably 2 to 28% by weight. The high-pressure ethylene copolymers may be those having been subjected to chemical and/or physical modification such as ionomerization or extrusion graft modification.

In a preferred polymer blend, at least one ethylene copolymer composition (A), (A'), (A") or (A'") is contained, and the composition (A), (A'), (A") or (A'") comprises preferably at least about 5%, more preferably at least about 10% of the polymer blend.

In the multi-layer coating or film of the invention, at least one composition (A), (A'), (A") or (A'") may be contained in any layer or in layers of any number. In the multi-layer film or film structure, however, it is preferable that the composition (A), (A'), (A") or (A'") is contained in the outside layer (sometimes referred to as "skin layer" or "surface layer" in the art) and the sealant layer.

The blend composition of the invention can be prepared by any suitable means known in the art, and examples of such means include tumble dry blending, melt blending by compound extrusion or side arm extrusion, multiple-reactor polymerization and combinations thereof. The multi-layer structure of the invention can be produced by any known means, and examples of such means include coextrusion, laminating and a combination thereof. The composition of the invention is employable also in a coextrusion process wherein a material exhibiting higher drawdown is allowed to substantially "support" one or more materials exhibiting lower drawdown.

Various polar and non-polar substrates can be coated with the blend composition or the non-blend composition of the invention independent of the single-layer structure or the multi-layer structure. Examples of the substrates include paper products, metals, ceramics, glass, various polymers (particularly, different polyolefins) and combinations thereof, without limiting thereto.

EXAMPLE

The present invention is further described with reference to the following examples, but it should be construed that the invention is in no way limited to those examples.

Properties of the films were evaluated in the following manner.

Haze

The haze was measured in accordance with ASTM-D-1003-61.

Gloss

The gloss was measured in accordance with JIS Z8741.

Dart Impact Strength

The dart impact strength was measured in accordance with the method A of ASTM D 1709.

Preparation Example 1

Preparation of Catalyst Component

In 80 liters of toluene, 5.0 kg of silica having been dried at 250° C. for 10 hours was suspended, and the suspension was cooled to 0° C. Then, to the suspension was dropwise added 28.7 liters of a toluene solution of methylaluminoxane (Al: 1.33 mol/liter) over a period of 1 hour. During the addition, the temperature of the system was maintained at 0° C. The reaction was successively conducted at 0° C. for 30 minutes. Then, the temperature was raised to 95° C. over a period of 1.5 hours, and at that temperature the reaction was conducted for 20 hours. The temperature was then lowered to 60° C., and the supernatant liquid was removed by decantation.

The resulting solid was washed twice with toluene and then resuspended in 80 liters of toluene. To the system, 20.0 liters of a toluene solution of bis(methylcyclopentadienyl) zirconium dichloride (Zr: 14.0 mmol/liter) was dropwise added at 80° C. over a period of 30 minutes, and the reaction was further conducted at 80° C. for 2 hours. Then, the supernatant liquid was removed, and the remainder was washed twice with hexane to obtain a solid catalyst containing 3.6 mg of zirconium per 1 g of the catalyst.

Preparation of Prepolymerized Catalyst

To 85 liters of hexane containing 1.7 mol of triisobutylaluminum, 0.85 kg of the solid catalyst obtained above and 77 g of 1-hexene were added, and prepolymerization of ethylene was conducted at 35° C. for 3.5 hours, whereby a prepolymerized catalyst containing 3 g of polyethylene per 1 g of the solid catalyst was obtained.

Polymerization

In a continuous type fluidized bed gas phase polymerization apparatus, copolymerization of ethylene and 1-hexene was carried out at the total pressure of 20 kg/cm$^2$-G and a polymerization temperature of 80° C. To the system were continuously fed the prepolymerized catalyst prepared above at a rate of 0.05 mmol/hr in terms of zirconium atom and triisobutylaluminum at a rate of 10 mmol/hr. During the polymerization, ethylene, 1-hexene, hydrogen and nitrogen were continuously fed to maintain the gas composition constant (gas composition: 1-hexene/ethylene=0.020, hydrogen/ethylene=9.5×10$^{-4}$, ethylene concentration= 50%). The yield of the polymer was 4.1 kg/hr.

Reference Example 1

Production of Film

Using pellets of the ethylene/α-olefin copolymer (A-1) prepared in Preparation Example 1, an inflation film was produced under the following conditions. A film having a thickness of 30 μm was obtained by inflation molding by the use of a single-screw extruder (diameter: 20 mm φ, L/D=26) and a single-slit air ring under the conditions of a die diameter of 25 mm, a lip width of 0.7 mm, an air flow rate of 90 l/min, an extrusion rate of 9 g/min, a blow ratio of 1.8, a take-off rate of 2.4 m/min and a molding temperature of 200° C. The results are set forth in Tables 1 and 3.

Example 1

The ethylene/α-olefin copolymer (A-1) and high-pressure low-density polyethylene (D-1) shown in Table 2 were melt kneaded in a weight ratio of 96/4 ((A-1)/(D-1)) and pelletized. Using the pellets, an inflation film was obtained in the same manner as in Reference Example 1. The results are set forth in Table 3.

Preparation Example 2

Preparation of Catalyst Component

In 80 liters of toluene, 5.0 kg of silica having been dried at 250° C. for 10 hours was suspended, and the suspension was cooled to 0° C. Then, to the suspension was dropwise added 28.7 liters of a toluene solution of methylaluminoxane (Al: 1.33 mol/liter) over a period of 1 hour. During the addition, the temperature of the system was maintained at 0° C. The reaction was successively conducted at 0° C. for 30 minutes. Then, the temperature was raised to 95° C. over a period of 1.5 hours, and at that temperature the reaction was conducted for 20 hours. The temperature was then lowered to 60° C., and the supernatant liquid was removed by decantation.

The resulting solid was washed twice with toluene and then resuspended in 80 liters of toluene. To the system, 5.8 liters of a toluene solution of bis(1,3-n-butylmethylcyclopentadienyl)zirconium dichloride (Zr: 34.0 mmol/liter) and 6.0 liters of a toluene solution of bis(methylcyclopentadienyl)zirconium dichloride (Zr: 14.0 mmol/liter) were dropwise added at 80° C. over a period of 30 minutes, and the reaction was further conducted at 80° C. for 2 hours. Then, the supernatant liquid was removed, and the remainder was washed twice with hexane to obtain a solid catalyst containing 3.6 mg of zirconium per 1 g of the catalyst.

Preparation of Prepolymerized Catalyst

To 85 liters of hexane containing 1.7 mol of triisobutylaluminum, 0.85 kg of the solid catalyst obtained above and 77 g of 1-hexene were added, and prepolymerization of ethylene was conducted at 35° C. for 3.5 hours, whereby a prepolymerized catalyst containing 3 g of polyethylene per 1 g of the solid catalyst was obtained.

Polymerization

In a continuous type fluidized bed gas phase polymerization apparatus, copolymerization of ethylene and 1-hexene was carried out at the total pressure of 20 kg/cm$^2$-G and a polymerization temperature of 80° C. To the system were continuously fed the prepolymerized catalyst prepared above at a rate of 0.05 mmol/hr in terms of zirconium atom and triisobutylaluminum at a rate of 10 mmol/hr. During the polymerization, ethylene, 1-hexene, hydrogen and nitrogen were continuously fed to maintain the gas composition constant (gas composition: 1-hexene/ethylene=0.020, hydrogen/ethylene=9.5×10$^{-4}$, ethylene concentration= 50%), to obtain an ethylene/α-olefin copolymer (C-1).

Reference Example 2

The ethylene/α-olefin copolymer (C-1) was melt kneaded and pelletized. Using the pellets, an inflation film was obtained in the same manner as in Reference Example 1. The results are set forth in Tables 1 and 3.

Example 2

The ethylene/α-olefin copolymer (C-1) and high-pressure low-density polyethylene (D-1) shown in Table,2 were melt kneaded in a weight ratio of 96/4 ((C-1)/(D-1)) and pelletized. Using the pellets, an inflation film was obtained in the same manner as in Reference Example 1. The results are set forth in Table 3.

Reference Example 3

An ethylene/α-olefin copolymer (C-2) was obtained in the same manner as in Preparation Example 1, except that the gas composition was controlled so that the resulting ethylene/α-olefin copolymer (C-2) had a density and MFR shown in Table 1. The ethylene/α-olefin copolymer (C-2) was melt kneaded and pelletized. Using the pellets, an inflation film was obtained in the same manner as in Reference Example 1. The results are set forth in Table 3.

Example 3

The ethylene/α-olefin copolymer (C-2) and high-pressure low-density polyethylene (D-1) shown in Table 2 were melt kneaded in a weight ratio of 96/4 ((C-2)/(D-1)) and pelletized. Using the pellets, an inflation film was obtained in the same manner as in Reference Example 1. The results are set forth in Table 3.

Reference Example 4

An ethylene/α-olefin copolymer (C-3) was obtained in the same manner as in Preparation Example 1, except that the gas composition was controlled so that the resulting ethylene/α-olefin copolymer (C-3) had a density and MFR shown in Table 1. The ethylene/α-olefin copolymer (C-3) was melt kneaded and pelletized. Using the pellets, an inflation film was obtained in the same manner as in Reference Example 1. The results are set forth in Table 3.

Example 4

The ethylene/α-olefin copolymer (C-3) and high-pressure low-density polyethylene (D-1) shown in Table 2 were melt kneaded in a weight ratio of 96/4 ((C-3)/(D-1)) and pelletized. Using the pellets, an inflation film was obtained in the same manner as in Reference Example 1. The results are set forth in Table 3.

Comparative Example 1

Preparation of Catalyst Component

A solid catalyst component was prepared in the same manner as in the "preparation of catalyst component" of Preparation Example 1, except that 8.2 liters of a toluene solution of bis(1,3-n-butylmethylcyclopentadienyl) zirconium dichloride (Zr: 34.0 mmol/liter) was used in place of 20.0 liters of the toluene solution of bis (methylcyclopentadienyl)zirconium dichloride (Zr: 14.0 mmol/liter).

Preparation of Prepolymerized Catalyst

A prepolymerized catalyst was obtained in the same manner as in Preparation Example 1, except that the solid catalyst component obtained in the "preparation of catalyst component" mentioned above was used.

Polymerization

An ethylene/1-hexene copolymer was prepared in the same manner as in Preparation Example 1, except that the prepolymerized catalyst obtained in the "preparation of prepolymerized catalyst" mentioned above was used and the gas composition was controlled so that the resulting ethylene/α-olefin copolymer (A-2) had a density and MFR shown in Table 1. The melt properties, etc. of the obtained copolymer are set forth in Table 1. The ethylene/α-olefin copolymer (A-2) was melt kneaded and pelletized. Using the pellets, an inflation film was obtained in the same manner as in Reference Example 1. The results are set forth in Table 3.

Comparative Example 2

The ethylene/α-olefin copolymer (A-2) and high-pressure low-density polyethylene (D-1) shown in Table 2 were melt kneaded in a weight ratio of 96/4 ((A-2)/(D-1)) and pelletized. Using the pellets, an inflation film was obtained in the same manner as in Reference Example 1. The results are set forth in Table 3.

Comparative Example 3

A solid catalyst component was prepared in the same manner as in the "preparation of catalyst component" of Preparation Example 1, except that 10.0 liters of a toluene solution of bis(1,3-dimethylcyclopentadienyl)zirconium dichloride (Zr: 28.0 mmol/liter) was used in place of 20.0 liters of the toluene solution of bis(methylcyclopentadienyl)zirconium dichloride (Zr: 14.0 mmol/liter).

Preparation of Prepolymerized Catalyst

A prepolymerized catalyst was obtained in the same manner as in Preparation Example 1, except that the solid catalyst component obtained in the "preparation of catalyst component" mentioned above was used.

Polymerization

An ethylene/1-hexene copolymer was prepared in the same manner as in Preparation Example 1, except that the prepolymerized catalyst obtained in the "preparation of prepolymerized catalyst" mentioned above was used and the gas composition was controlled so that the resulting ethylene/α-olefin copolymer (A-3) had a density and MFR shown in Table 1. The melt properties, etc. of the obtained copolymer are set forth in Table 1. The ethylene/α-olefin copolymer (A-3) was melt kneaded and pelletized. Using the pellets, an inflation film was obtained in the same manner as in Reference Example 1. The results are set forth in Table 3.

Comparative Example 4

The ethylene/α-olefin copolymer (A-3) and high-pressure low-density polyethylene (D-1) shown in Table 2 were melt kneaded in a weight ratio of 96/4 ((A-3)/(D-1)) and pelletized. Using the pellets, an inflation film was obtained in the same manner as in Reference Example 1. The results are set forth in Table 3.

Reference Example 5

Ethylene/α-olefin copolymers (C-5) and (C-6) were each obtained in the same manner as in Reference Example 4, except that the gas composition was controlled so that each of the resulting ethylene/α-olefin copolymers (C-5) and (C-6) had a density and MFR shown in Table 4. The ethylene/α-olefin copolymers (C-5) and (C-6) were melt kneaded in a weight ratio of 60/40 ((C-5)/(C-6)) and pelletized. Using the pellets (L-1), an inflation film was obtained in the same manner as in Reference Example 1. The results are set forth in Tables 5 and 6.

Example 5

The ethylene/α-olefin copolymer composition (L-1) and high-pressure low-density polyethylene (D-1) shown in Table 2 were melt kneaded in a weight ratio of 97/3 ((L-1)/(D-1)) and pelletized. Using the pellets, an inflation film was obtained in the same manner as in Reference Example 1. The results are set forth in Table 6.

Reference Example 6

An ethylene/α-olefin copolymer (C-7) was obtained in the same manner as in Preparation Example 2, except that the gas composition was controlled so that the resulting ethylene/α-olefin copolymer (C-7) had a density and MFR shown in Table 4. The ethylene/α-olefin copolymers (C-7) and (C-6) were melt kneaded in a weight ratio of 60/40 ((C-7)/(C-6)) and pelletized. Using the pellets (L-2), an inflation film was obtained in the same manner as in Reference Example 1. The results are set forth in Tables 5 and 6.

Example 6

The ethylene/α-olefin copolymer composition (L-2) and high-pressure low-density polyethylene (D-1) shown in Table 2 were melt kneaded in a weight ratio of 97/3 ((L-2)/(D-1)) and pelletized. Using the pellets, an inflation film was obtained in the same manner as in Reference Example 1. The results are set forth in Table 6.

Reference Example 7

Ethylene/α-olefin copolymers (C-8) and (C-9) were each obtained in the same manner as in Reference Example 2, except that the gas composition was controlled so that each of the resulting ethylene/α-olefin copolymers (C-8) and (C-9) had a density and MFR shown in Table 4. The ethylene/α-olefin copolymers (C-8) and (C-9) were melt kneaded in a weight ratio of 60/40 ((C-8)/(C-9)) and pelletized. Using the pellets (L-3), an inflation film was obtained in the same manner as in Reference Example 1. The results are set forth in Tables 5 and 6.

Example 7

The ethylene/α-olefin copolymer composition (L-3) and high-pressure low-density polyethylene (D-1) shown in Table 2 were melt kneaded in a weight ratio of 97/3 ((L-3)/(D-1)) and pelletized. Using the pellets, an inflation film was obtained in the same manner as in Reference Example 1. The results are set forth in Table 6.

TABLE 1

|  |  | Co-monomer Type | X mol | MFR g/10 min. | Density g/cm$^3$ | Decane-soluble component fraction W (wt %) | *I | Melting point Tm (° C.) |
|---|---|---|---|---|---|---|---|---|
| Ref. Ex. 1 | A-1 | 1-hexene | 2.30 | 1.40 | 0.925 | 0.16 | 0.99 | 116.80 |
| Ref. Ex. 2 | C-1 | 1-hexene | 2.60 | 1.10 | 0.924 | 0.20 | 1.08 | 117.10 |
| Ref. Ex. 3 | C-2 | 1-hexene | 2.10 | 1.50 | 0.928 | 0.12 | 0.76 | 118.30 |
| Ref. Ex. 4 | C-3 | 1-hexene | 3.50 | 1.90 | 0.915 | 0.29 | 2.52 | 114.40 |
| Comp. Ex. 1 | A-2 | 1-hexene | 2.60 | 1.10 | 0.925 | 0.19 | 0.99 | 116.60 |
| Comp. | A-3 | 1-hexene | 2.50 | 1.00 | 0.923 | 0.21 | 1.19 | 115.40 |

TABLE 1-continued

Ex. 3

|  |  | *2 | MT g | *3 | *4 | Ea × 10⁴ J/molK | *5 | *6 | Mw/Mn |
|---|---|---|---|---|---|---|---|---|---|
| Ref. Ex. 1 | A-1 | 122.00 | 6.30 | 7.20 | 1.70 | 3.10 | 3.02 | 3.38 | 2.50 |
| Ref. Ex. 2 | C-1 | 121.60 | 3.70 | 8.40 | 2.00 | — | 3.04 | 3.44 | 2.20 |
| Ref. Ex. 3 | C-2 | 123.20 | 3.30 | 7.00 | 1.60 | — | 3.00 | 3.33 | 2.20 |
| Ref. Ex. 4 | C-3 | 118.00 | 3.00 | 5.90 | 1.30 | — | 3.09 | 3.64 | 2.30 |
| Comp Ex. 1 | A-2 | 122.0 | 1.60 | 8.40 | 2.00 | 3.05 | 3.04 | 3.44 | 2.00 |
| Comp Ex. 3 | A-3 | 121.20 | 3.50 | 9.00 | 2.20 | 3.51 | 3.03 | 3.42 | 2.80 |

*1: MFR ≦ 10 g/10 min: value of 80 × exp (−100(d−0.88)) + 0.1
    MFR < 10 g/10 min: value of 80 × (MFR−9)$^{0.26}$ × exp(−100(d−0.88)) + 0.1
*2: value of 400 × d−248
*3: value of 9.0 × MFR$^{-0.65}$
*4: value of 2.2 × MFR$^{-0.64}$
*5: value of (0.039Ln(C−2) + 0.0096)X × + 2.87
C = carbon atom number of comonomer (in case of 1-hexene: c = 6)
X = mol % of comonomer
*6: value of (0.039Ln(C−2) + 0.1660)X × + 2.87
C = carbon atom number of comonomer (in case of 1-hexene: c = 6)
X = mol % of comonomer

TABLE 2

|  | MFR g/10 min | Mw/Mn | *7 | *8 | Desnsity g/cm³ | Film properties Haze | Film properties Gloss |
|---|---|---|---|---|---|---|---|
| D-1 | 0.50 | 4.4 | 10.2 | <0 | 0.924 | 7.4 | 51 |

*7: value of 7.5 × log(MFR) + 12.5
*8: value of 7.5 × log(MFR) − 1.2

TABLE 3

|  | MT | FI 1/sec | Haze % | Gloss % | Dart impact N | Mold-ability *9 | Ea × 10⁴ J/molK |
|---|---|---|---|---|---|---|---|
| Ref. Ex. 1 | 6.30 | 210 | 13.6 | 55 | 2.90 | AA | 3.10 |
| Ex. 1 | 6.70 | 210 | 13.3 | 58 | 2.85 | AA | 3.13 |
| Ref. Ex. 2 | 3.70 | 90 | 3.90 | 93 | 3.77 | AA | 3.01 |
| Ex. 2 | 4.20 | 90 | 3.50 | 96 | 3.70 | AA | 3.02 |
| Ref. Ex. 3 | 3.30 | 90 | 4.20 | 92 | 3.21 | AA | 3.00 |
| Ex. 3 | 3.80 | 90 | 3.80 | 94 | 3.17 | AA | 3.01 |
| Ref. Ex. 4 | 3.00 | 120 | 3.4 | 98 | >10 | AA | 3.12 |
| Ex. 4 | 3.60 | 120 | 3.0 | 100 | >10 | AA | 3.14 |
| Comp. Ex. 1 | 1.60 | 70 | 11.1 | 60 | 3.68 | CC | 3.05 |
| Comp. Ex. 2 | 1.80 | 70 | 9.8 | 68 | 3.50 | CC | 3.09 |
| Comp. Ex. 3 | 3.50 | 350 | 8.9 | 56 | 2.30 | AA | 3.51 |
| Comp. Ex. 4 | 3.70 | 350 | 8.6 | 56 | 2.28 | AA | 3.53 |

*9: Moldability    AA: MT >3, BB: 2 ≦ MT < 3, CC: MT < 2

TABLE 4

|  | Co-monomer Type | X mol % | MFR g/10 min. | Density g/cm³ | Decane-soluble component fraction W (wt %) | *1 | Melting point Tm (° C.) |
|---|---|---|---|---|---|---|---|
| C-5 | 1-hexene | 3.20 | 0.39 | 0.912 | 0.32 | 3.36 | 109.80 |
| C-6 | 1-hexene | 0.80 | 30 | 0.945 | 0.03 | 0.37 | 128.60 |
| C-7 | 1-hexene | 3.00 | 0.48 | 0.915 | 0.29 | 2.52 | 111.60 |
| C-8 | 1-hexene | 2.80 | 0.32 | 0.921 | 0.21 | 1.43 | 113.50 |
| C-9 | 1-hexene | 1.80 | 48 | 0.932 | 0.38 | 1.24 | 119.80 |

|  | *2 | MT g | *3 | *4 | Mw/Mn |
|---|---|---|---|---|---|
| C-5 | 116.80 | 10.8 | 16.6 | 4.90 | 2.20 |
| C-6 | 130.00 | — | — | — | 2.10 |
| C-7 | 118.00 | 10.1 | 14.5 | 4.10 | 2.30 |
| C-8 | 120.40 | 11.5 | 18.9 | 5.70 | 2.20 |
| C-9 | 124.80 | — | — | — | 2.00 |

*1: MFR ≦ 10 g/10 min: value of 80 × exp(−100(d−0.88)) + 0.1
MFR >10 g/10 min: value of 80 × (MFR−9)$^{0.26}$ × exp(−100(d−0.88)) + 0.1
*2: value of 400 × d−248
*3: value of 9.0 × MFR$^{-0.65}$
*4: value of 2.2 × MFR$^{-0.84}$

TABLE 5

| | | C-I | C-II | C-I/C-III | MFR g/10 min | Density g/cm³ | MT g | *10 | *11 | FI 1/sec | *12 |
|---|---|---|---|---|---|---|---|---|---|---|---|
| Ref. Ex. 5 | L-1 | C-5 | C-6 | 60/40 | 1.52 | 0.925 | 4.1 | 6.9 | 1.5 | 270 | 150 |
| Ref. Ex. 6 | L-2 | C-7 | C-6 | 60/40 | 1.63 | 0.928 | 2.7 | 6.6 | 1.5 | 290 | 160 |
| Ref. Ex. 7 | L-3 | C-8 | C-9 | 60/40 | 1.48 | 0.926 | 3.8 | 7.0 | 1.6 | 260 | 150 |

*10: value of $9.0 \times MFR^{-0.65}$
*11: value of $2.2 \times MFR^{-0.84}$
*12: value of $100 \times MFR$

TABLE 6

| | haze % | *13 | Fi 1/sec | *14 | Gloss % | Dart impact N | Mold-ability *15 | MFR g/10 min | MT | Density g/cm³ | Ea × 10⁴ J/molK |
|---|---|---|---|---|---|---|---|---|---|---|---|
| Ref. Ex. 5 | 7.7 | 9.9 | 270 | 152 | 74 | 3.89 | AA | 1.52 | 4.10 | 0.925 | 3.11 |
| Ex. 5 | 7.0 | — | 270 | — | 80 | — | AA | 1.50 | 4.80 | — | 3.13 |
| Ref. Ex. 6 | 6.5 | 8.4 | 290 | 163 | 85 | 3.33 | BB | 1.63 | 2.70 | 0.928 | 3.05 |
| Ex. 6 | 5.8 | — | 290 | — | 89 | — | AA | 1.59 | 3.50 | — | 3.06 |
| Ref. Ex. 7 | 7.0 | 9.7 | 260 | 148 | 79 | 3.91 | AA | 1.48 | 3.80 | 0.926 | 3.09 |
| Ex. 7 | 6.3 | — | 260 | — | 84 | — | AA | 1.46 | 4.50 | — | 3.11 |

*13: FI > 100 × MFR (FI: flow index, MFR: melt flow rate)
Carbon atom number (C) of α-olefin = 4–6: value of $0.45/(1-d) \times \log(3 \times MT^{1.4}) \times (C-3)^{0.1}$
Carbon atom number (C) of α-olefin = 7–20: value of $0.56/(1-d) \times \log(3 \times MT^{1.4})$
FI < 100 × MFR (FI: flow index, MFR: melt flow rate)
Carbon atom number (C) of α-olefin = 4–6: value of $0.25/(1-d) \times \log(3 \times MT^{1.4}) \times (C-3)^{0.1}$
Carbon atom number (C) of α-olefin = 7–20: value of $0.50/(1-d) \times \log(3 \times MT^{1.4})$
(d: density (g/cm³), MT, melt tension (g))
*4: value of 100 × MFR
*5: Moldability
  AA: MT ≧ 3, BB: 2 ≦ MT < 3, CC: MT < 2

What is claimed is:

1. An ethylene copolymer composition comprising (A) an ethylene/α-olefin copolymer and (E) high-pressure radical process low-density polyethylene,
wherein the ethylene/α-olefin copolymer (A) is a copolymer of ethylene and an α-olefin of 6 to 8 carbon atoms and has the following properties:
(A-i) the melt tension (MT) at 190° C. and the melt flow rate (MFR) satisfy the following relation $$9.0 \times MFR^{-0.65} > MT > 2.2 \times MFR^{-0.84},$$

(A-ii) the activation energy ((Ea)×10⁻⁴J/molK) of flow determined from a shift factor of time-temperature superposition of the flow curve, the carbon atom number (C) and the α-olefin content (x mol %) in the copolymer satisfy the following relation $$(0.039 \ln (C-2)+0.0096)\times(x+2.87) < Ea\times10^{-4} \leq (0.039 \ln (C-2)+0.1660)\times(x+2.87),$$

and
(A-iii) the haze of a film having a thickness of 30 μm produced by inflation molding of said copolymer satisfies the following relation,
when the flow index (FI), which is defined as a shear rate at which the shear stress at 190° C. reaches 2.4×10⁶ dyne/cm², and the melt flow rate (MFR) satisfy the relation FI≧100×MFR,
in the case of the carbon atom number (C) of the α-olefin being 6, Haze<$0.45/(1-d)\times\log(3\times MT^{1.4})\times(C-3)^{0.1}$, in the case of the carbon atom number (C) of the α-olefin being 7 or 8, Haze<$0.50/(1-d)\times\log(3\times MT^{1.4})$, and when the flow rate (FI), which is defined as a shear rate at which the shear stress at 190° C. reaches 2.4×10⁶ dyne/cm², and the melt flow rate (MFR) satisfy the relation FI<100×MFR,
in the case of the carbon atom number (C) of the α-olefin being 6, Haze<$0.25/(1-d)\times\log(3\times MT^{1.4})\times(C-3)^{0.1}$, in the case of the carbon atom number (C) of the α-olefin being 7 or 8, Haze<$0.50/(1-d)\times\log(3\times MT^{1.4})$;

wherein d represents a density (g/cm³) and MT represents a melt tension (g), and the high-pressure radical process low-density polyethylene (E) has the following properties:
(E-i) the melt flow rate, as measured at 190° C. under a load of 2.16 kg, is in the range of 0.1 to 50 g/10 min, and
(E-ii) the molecular weight distribution (Mw/Mn, Mw: weight-average molecular weight, Mn: number-average molecular weight), as measured by gel permeation chromatography, and the melt flow rate (MFR) satisfy the following relation $$7.5 \times \log(MFR) - 1.2 \leq Mw/Mn \leq 7.5 \times \log(MFR) + 1.25,$$

wherein the ethylene/α-olefin copolymer (A) is obtained by copolymerizing ethylene and an α-olefin of 6 to 8 carbon atoms in the presence of an olefin polymerization catalyst comprising:
(a) an organoaluminum oxy-compound,
(b-1) at least one transition metal compound selected from transition metal compounds represented by the following formula (I):

 (I)

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms, and the ligand $L^1$ other than the substituted cyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M, and (b-II) at least one transition metal compound selected from transition metal compounds represented by the following formula (II):

 (II)

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group, and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

2. The ethylene copolymer composition according to claim 1, wherein the organoaluminum oxy-compound (a), the transition metal compound (b-I) and the transition metal compound (b-II) are supported on a carrier (c).

3. The ethylene copolymer composition according to claim 2, wherein at least two ligands $L^1$ are each a substituted cyclopentadienyl group having at least one group selected from hydrocarbon groups of 3 to 5 carbon atoms.

4. The ethylene copolymer composition according to claim 1, at least two ligands $L^1$ are each a substituted cyclopentadienyl group having at least one group selected from hydrocarbon groups of 3 to 5 carbon atoms.

5. A molded product comprising the ethylene copolymer composition according to claim 1.

6. The molded product as claimed in claim 5, which is a single-layer film or sheet.

7. The molded product as claimed in claim 5, which is a multi-layer film or sheet.

8. The molded product as claimed in claim 5, which is an injection molded product.

9. The molded product as claimed in claim 5, which is an extrusion molded product.

10. The molded product as claimed in claim 5, which is a fiber.

11. The molded product as claimed in claim 5, which is an expansion molded product.

12. The molded product as claimed in claim 5, which is an electric wire sheath.

* * * * *